(12) United States Patent
Miyazawa et al.

(10) Patent No.: US 10,300,706 B2
(45) Date of Patent: May 28, 2019

(54) INK INCLUDING SILVER PARTICLE AND WATER, INKJET PRINTING DEVICE INCLUDING INK, AND INKJET PRINTING METHOD USING INK

(71) Applicants: Yoshimasa Miyazawa, Kanagawa (JP); Tatsuya Tomura, Tokyo (JP); Takuya Fujita, Kanagawa (JP); Hisashi Habashi, Kanagawa (JP); Takahiro Yoshida, Ibaraki (JP)

(72) Inventors: Yoshimasa Miyazawa, Kanagawa (JP); Tatsuya Tomura, Tokyo (JP); Takuya Fujita, Kanagawa (JP); Hisashi Habashi, Kanagawa (JP); Takahiro Yoshida, Ibaraki (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/852,062

(22) Filed: Dec. 22, 2017

(65) Prior Publication Data
US 2018/0178538 A1 Jun. 28, 2018

(30) Foreign Application Priority Data

Dec. 22, 2016 (JP) .................................. 2016-249702
Nov. 28, 2017 (JP) .................................. 2017-227928

(51) Int. Cl.
*B41J 2/14* (2006.01)
*B41J 2/18* (2006.01)
(Continued)

(52) U.S. Cl.
CPC ............. *B41J 2/18* (2013.01); *B41J 2/04581* (2013.01); *B41J 2/04588* (2013.01);
(Continued)

(58) Field of Classification Search
CPC ...... B41J 2/18; B41J 2/04581; B41J 2/04588; B41J 2/04593; B41J 2/14274; B41J 2/175; B41J 2/17509; C09D 11/32
See application file for complete search history.

(56) References Cited

U.S. PATENT DOCUMENTS 8,492,456 B2 * 7/2013 Chen ..................... C09D 11/30
106/31.6
2007/0076069 A1 * 4/2007 Edwards ................ B41J 2/2114
347/100

(Continued)

FOREIGN PATENT DOCUMENTS

| JP | 2003-306625 | 10/2003 |
|---|---|---|
| JP | 2005-036079 | 2/2005 |
| JP | 2011-190353 | 9/2011 |
| JP | 2016-016614 | 2/2016 |

OTHER PUBLICATIONS

U.S. Appl. No. 15/674,654, filed Aug. 11, 2017, Tatsuya Tomura, et al.

(Continued)

*Primary Examiner* — Juanita D Jackson
(74) *Attorney, Agent, or Firm* — Oblon, McClelland, Maier & Neustadt, L.L.P.

(57) ABSTRACT

An inkjet printing device includes an ink containing a silver particle and water; and an ink discharging head including multiple nozzles to discharge the ink, individual liquid chambers communicating with the multiple nozzles, a common liquid chamber to supply the ink to the individual liquid chambers, a circulating flow path communicating with the individual liquid chambers, a common circulating liquid chamber communicating with the circulating flow path, and a pressure generator to apply a pressure to the ink in the individual liquid chambers, wherein the proportion of the silver particle to the ink is from 1 to 15 percent by mass.

15 Claims, 16 Drawing Sheets

(51) Int. Cl.
*B41J 2/21* (2006.01)
*B41J 2/045* (2006.01)
*B41J 2/175* (2006.01)
*C09D 11/32* (2014.01)
*C09D 11/40* (2014.01)
*C09D 11/322* (2014.01)

(52) U.S. Cl.
CPC ....... *B41J 2/04593* (2013.01); *B41J 2/14274* (2013.01); *B41J 2/175* (2013.01); *B41J 2/17509* (2013.01); *B41J 2/2107* (2013.01); *C09D 11/32* (2013.01); *C09D 11/322* (2013.01); *C09D 11/40* (2013.01); *B41J 2002/14403* (2013.01); *B41J 2202/04* (2013.01); *B41J 2202/12* (2013.01)

(56) References Cited

U.S. PATENT DOCUMENTS

2010/0327025 A1* 12/2010 Yokoyama ............... B41J 2/175
　　　　　　　　　　　　　　　　　　　　　　　　347/89
2014/0292962 A1* 10/2014 Nakano .................... B41J 2/175
　　　　　　　　　　　　　　　　　　　　　　　　347/89

OTHER PUBLICATIONS

U.S. Appl. No. 15/723,417, filed Oct. 3, 2017, Takuya Fujita, et al.
U.S. Appl. No. 15/784,583, filed Oct. 16, 2017, Tatsuya Tomura, et al.

* cited by examiner

INK INCLUDING SILVER PARTICLE AND WATER, INKJET PRINTING DEVICE INCLUDING INK, AND INKJET PRINTING METHOD USING INK

CROSS-REFERENCE TO RELATED APPLICATIONS

This patent application is based on and claims priority pursuant to 35 U.S.C. § 119 to Japanese Patent Application Nos. 2016-249702 and 2017-227928, filed on Dec. 22, 2016, and Nov. 28, 2017, respectively, in the Japan Patent Office, the entire disclosures of which are hereby incorporated by reference herein.

BACKGROUND

Technical Field

The present invention relates to an ink jet printing device, an inkjet printing method, and an ink.

Description of the Related Art

Articles having metallic luster provide gorgeous impression to people. Therefore, there are many chances to see such articles in every day life. Occasionally, metal itself is used to impart designing property of metallic luster. In many cases, colored compositions having metallic luster are used to coat substrates for such designing property.

To coat such substrates with colored compositions having metallic luster, various printing methods using ink for printing containing gloss pigments and methods of transferring with adhesives and heat adhesion have been used.

Of metallic luster, color of gold is a symbol of wealth and has been a favorite of people since ancient days and indispensable to festive events celebrating happy new year, etc. On the other hand, color of silver, which gives people composed feeling, is popular and seen in various occasions. In addition, unlike the color of gold, the color of silver can be mixed with other colored compositions, which enables representing various metallic luster colors including the color of gold. That is, the color of silver is suitable for general purposes and has a high value in terms of industrial use in comparison with the color of gold. Moreover, with the development of inkjet printing technologies, a demand for printer matter having metallic luster is increasing.

SUMMARY

According to the present invention, provided is an improved inkjet printing device which includes an ink containing a silver particle and water and an ink discharging head including multiple nozzles to discharge the ink, individual liquid chambers communicating with the multiple nozzles, a common liquid chamber to supply the ink to the individual liquid chambers, a circulating flow path communicating with the individual liquid chambers, a common circulating liquid chamber communicating with the circulating flow path, and a pressure generator to apply a pressure to the ink in the individual liquid chambers, wherein the proportion of the silver particle to the ink is from 1 to 15 percent by mass.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

Figure 1:
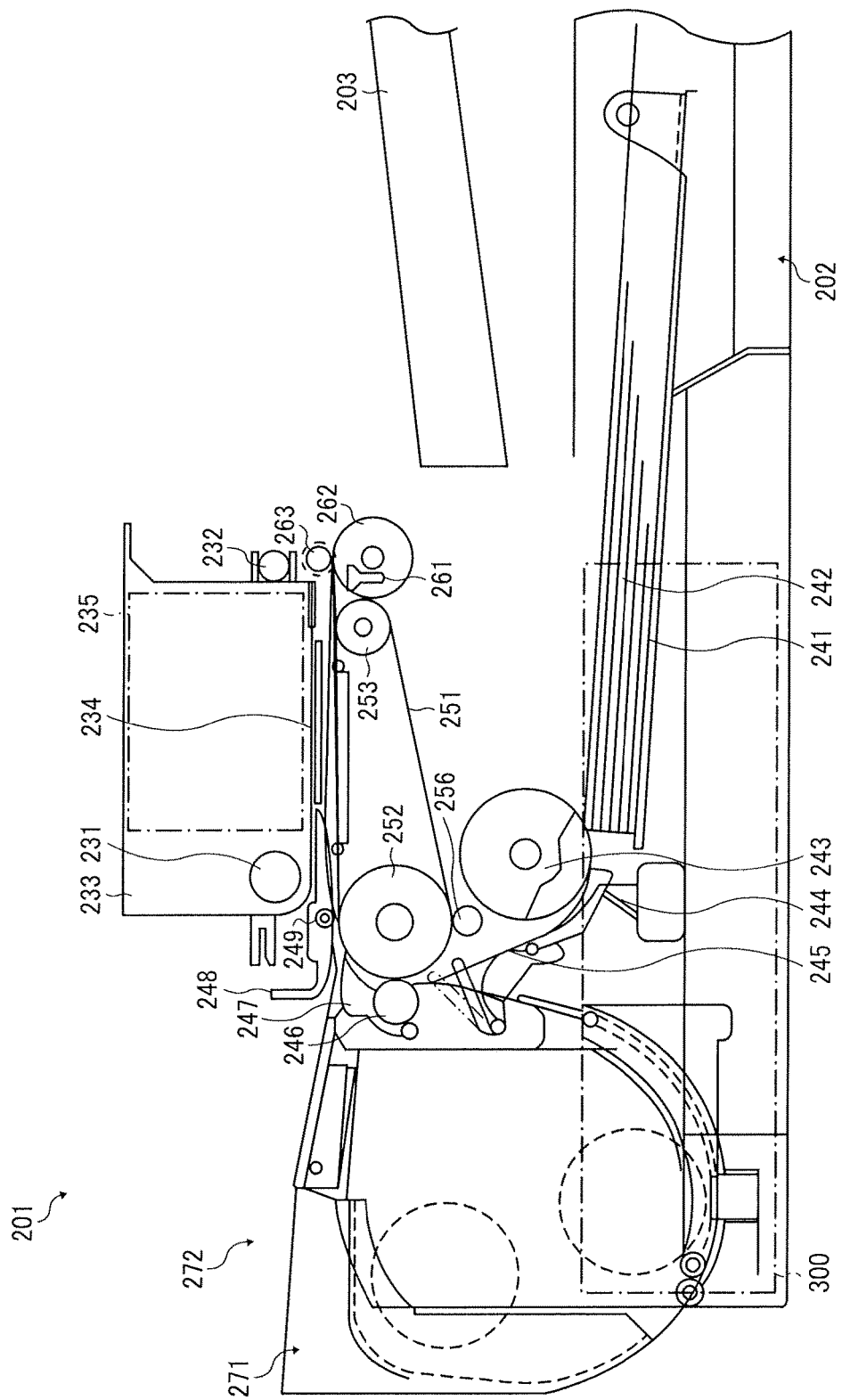
FIG. 1 is a schematic diagram illustrating a side view of the mechanism unit of the inkjet printing device according to an embodiment of the present disclosure.

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF THE EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Moreover, image forming, recording, printing, modeling, etc. in the present disclosure represent the same meaning, unless otherwise specified.

Ink

The ink of the present disclosure contains a silver particle and water, and the proportion of the silver particle to the ink is from 1 to 15 percent by mass. The ink is used for an ink discharging head including multiple nozzles to discharge the ink, individual liquid chambers communicating with the multiple nozzles, a common liquid chamber to supply the ink to the individual liquid chambers, a circulating flow path communicating with the individual liquid chambers, a common circulating liquid chamber communicating with the circulating flow path, and a pressure generator to apply a pressure to the ink in the individual liquid chambers.

The ink of the present disclosure is made based on knowledge that, in typical ink or print method, since the specific gravity of gloss pigments and metal colloid is heavy in comparison with that of organic pigments, the gloss pigments and metal colloid tend to settle down, so that discharging stability of ink is lost over time, thereby causing non-discharging of nozzles, losing metallic luster and specularity (image clarity), and exhibiting unnatural silver color.

Silver Particle

The silver particle demonstrates excellent metallic luster of obtained images. In addition, the silver particle demonstrates a high level of whiteness among various metals and represents various metal colors in combinational uses with other color ink. Moreover, the silver particle is stable in water because it is not easily reactive with water. As a consequence, the silver particle can be applied to aqueous glossy ink, which can reduce burden on environment.

In addition, the silver particle settled down in the ink can be re-dispersed in the ink discharging head, so that discharging stability is excellent and the ink discharging head can stably discharge the ink. In addition, since the silver particle uniformly adheres to a print medium, silver color is naturally demonstrated, which leads to excellent metallic luster and specularity (image clarity).

Examples of typical gloss pigment are pearl pigments and metal particles. Typical examples of pearl pigment include pigments having pearl gloss or interference gloss of mica covered with titanium dioxide, fish scale fish scale metallic pattern, and bismuth acid chloride. However, the particle size of these pigments is on the order of micron. This limits discharging of the pigments by an inkjet head, which is not preferable. In addition, if the particle diameter is reduced to enhance inkjet discharging property, discharging property is secured to some degree. However, since the particle size is excessively small, gloss caused by interference is not demonstrated in principle. Typical examples of the metal particle are aluminum, chrome, indium, copper, or gold particles. Of these, aluminum, gold, or silver particles are preferably used in terms of toxicity. However, aluminum reacts with water and produces oxides. That is, it is easily whitened over time. In addition, gold is expensive and variety of colors it can demonstrate is limited, which is not preferable. Furthermore, any of the metal particles mentioned above has a heavier specific gravity than that of an organic pigment. Therefore, the metal particles tend to settle down in ink prepared by dispersing the metal particles. As a consequence, non-discharging of nozzles occurs, and/or the metal particles are not uniformly attached to a print medium. This degrades metallic luster and specularity (image clarity) of the print matter.

Furthermore, gloss pigments using scale-like aluminum pigment available on the market have large particle diameters, so that inkjet discharging heads cannot stably discharge the pigment, which tends to invite a discharging problem soon.

The 50 percent cumulative volume particle diameter ($D_{50}$) of the silver particle as measured by dynamic light scattering is preferably from 5 to 2,200 nm, more preferably from 5 to 2,060 nm, and particularly preferably from 5 to 2,053 μm. For example, ink containing silver particles having a 50 percent cumulative volume particle diameter ($D_{50}$) of 5 nm or greater does not excessively penetrate into a print medium including a porous ink reception layer. For this reason, the ink surely demonstrates metallic luster and does not exhibit an unnatural color reflecting the color flavor (yellow) as nano particles of silver, which is preferable. In addition, ink containing silver particles having a 50 percent cumulative volume particle diameter ($D_{50}$) of 2,200 nm or less does not settle down over time or is free of unstable discharging, which is preferable.

The 90 percent cumulative volume particle diameter ($D_{90}$) of the silver particle as measured by dynamic light scattering is preferably 5,000 nm or less, more preferably from 2,000 nm or less, and particularly preferably 1,990 nm or less. Silver particles having a 90 percent cumulative volume particle diameter ($D_{90}$) of 5,000 nm or less are sufficiently small for nozzles of the ink discharging head, and therefore, the discharging head can stably discharge the ink including these silver particles. When the 90 percent cumulative volume particle diameter ($D_{90}$) is 2,000 nm or less, ink discharging is not easily affected by primary agglomeration of the silver particle. This is preferable in terms of continuous discharging stability.

The 50 percent cumulative volume particle diameter ($D_{50}$) and the 90 percent cumulative volume particle diameter ($D_{90}$) are determined as follows:

The diameter and the number of existing silver particles are measured. The results are statically processed to obtain the grain size accumulation curve. Based on this, the particle diameter at the time of 50 percent of the total volume and the particle diameter at the time of 90 percent of the total volume are respectively determined as the 50 percent cumulative volume particle diameter ($D_{50}$) and the 90 percent cumulative volume particle diameter ($D_{90}$). The particle diameter of the silver particle can be the diameter of the silver particle itself or the diameter of the particle colloid when the silver particle is colloidally dispersed.

The diameter of the silver particle dispersed in water can be obtained by, for example, using a particle size distribution measuring instrument based on dynamic light scattering. Examples of the particle size particle size distribution measuring instrument based on dynamic light scattering include Nanotrac Wave-UT151 (manufactured by MicrotracBEL Corp), Nanotrac Wave-EX150 (manufactured by NIKKISO CO., LTD.), ELSZ-2 and DLS-8000 (both manufactured by OTSUKA ELECTRONICS Co., LTD.), and LB-550 (manufactured by HORIBA, Ltd.).

The particle diameter can be measured by other methods, such as electron microscope method. A photograph of the silver particle obtained by the electron microscope is subjected to image processing to obtain the diameter of the silver particle. As an example, the area of 50 or more silver particles selected at random in the photograph is obtained, and the diameter of a circle having an area equal to the obtained area is calculated and determined as the particle diameter. Thereafter, the grain size accumulation curve can be obtained from the thus-obtained particle diameter.

Method of Manufacturing Silver Particle

The method of manufacturing the silver particle is not particularly limited and can be suitably selected to suit to a particular application. For example, a pulverization method of pulverizing coarse particles obtained by pulverizing ingot, etc. to a desired particle diameter, a method of peeling off a metal film formed on a film formed by vapor deposition, etc. from the film (in particular, peeling and pulverizing in liquid to disperse particles therein), a chemical granulation method such as wet reduction method, and various atomization method are suitable.

The wet reduction method includes a method of adding ammonium water to an aqueous solution of silver acetate to form a silver ammine complex and adding a reducing agent such as fromaline and hydrazine to reduce silver to obtain silver powder and a method of adding sodium hydroxide to an aqueous solution of silver acetate to produce particles of silver oxide followed by adding a reducing agent such as formaline and hydrazine to reduce silver to obtain silver powder. Thereafter, the solution containing the silver particle is separated into solid and liquid as the solid portion and the solution. The silver powder is washed with a suitable cleaning agent to remove liquid adhering to the silver powder. Moreover, the silver powder is dried to remove moisture, followed by processing such as pulverization and classification so that silver particles having a target size can be obtained.

The atomization method includes, for example, colliding melted metal (molten metal) with a coolant such as water and gas to obtain particulates. Metal particles having a narrow particle size distribution can be obtained by the atomization method.

Method of Manufacturing Liquid Dispersion of Silver Particle

To obtain a liquid dispersion of silver particle by dispersing the silver particle in water, for example, a hydrophilic functional group is introduced into the surface of the silver particle to prepare a self-dispersible pigment, and the surface of the silver particle is coated with a resin, followed by dispersion. Alternatively, a dispersant is used to disperse the silver particle.

In the dispersion method of coating the surface of the silver particle with a resin, the silver particle is encapsulated into a microcapsule to allow it dispersible in water. In this case, the silver particle added to ink is not necessarily entirely coated with a resin. The silver particle partially covered or wholly uncovered with a resin are allowed to be dispersed in water unless such silver particles have an adverse impact.

In the method of using a dispersant, for example, a known dispersant having a small molecular weight or a large molecular weight, which is represented by a surfactant, is used to disperse the silver particle in water.

As the dispersant, it is possible to use, for example, an anionic surfactant, a cationic surfactant, a nonionic surfactant, an amphoteric surfactant, etc. in accordance with the silver particle and the ink system to be used. These can be used alone or in combination. Of these, nonionic surfactants having an HLB value of from 10 to 20 and anion surfactants are preferable.

Specific examples of the anionic surfactant include, but are not limited to, polyoxyethylene alkyl ether acetates, alkyl benzene sulfonates (e.g., $NH_4$, Na, and Ca), alkyl disphenyl ether disulfonates (e.g., $NH_4$, Na, and Ca), sodium salts of dialkyl succinate sulfonates, formalin condensed sodium salts of naphthalene sulfonates, polyoxyethylene polycyclic phenyl ether sulfuric acid esters (e.g., $NH_4$ and Na), laurates, polyoxyethylene alkyl ether sulfates, and oleates. These can be used alone or in combination.

Of these, sodium salts of dioctyl sulfosuccinate, formalin condensed sodium salts of naphthalene sulfonates, and $NH_4$ salts of polyoxyethylene styrene phenyl ether sulfonates are preferable.

Specific examples of the nonionic surfactant having an HLB value of from 10 to 20 include, but are not limited to, polyoxyethylene alkyl ether, polyoxyalkylene alkyl ether, polyoxyethylene polycyclic phenyl ether, sorbitan aliphatic acid esters, polyoxy ethylene sorbitan aliphatic esters, polyoxyethylene sorbitan aliphatic esters, polyoxyethylene alkyl phenyl ethers, polyoxyethylene alkyl amines, polyoxyethylene alkyl amides, and acetylene glycol. These can be used alone or in combination.

Of these, polyoxyethylene lauryl ether, polyoxyethylene-β-naphtyl ether, polyoxyethylene sorbitan monooleate, and polyoxyethylene styrene phenyl ether are particularly preferable.

Examples of the polymer dispersant are copolymers of α-olefin-maleic anhydride represented by the following Chemical formula A, styrene-(meth)acrylic copolymer, water-soluble polyurethane resins, and water-soluble polyester resins. These can be used alone or in combination.

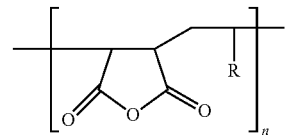

Chemical Formula A

In the Chemical formula A, R represents an alkyl group having 6 to 30 carbon atoms, preferably 12 to 22 carbon atoms, and more preferably 18 to 22 carbon atoms. "n" represents an integer of 1 or above and preferably an integer of from 20 to 100.

The α-olefin-maleic anhydride represented by the following Chemical formula A can be synthesized by using a mixture of olefins having different number of carbon atoms as raw material.

In this case, the α-olefin-maleic anhydride represented by the Chemical formula A is a copolymer where alkyl groups having different number of carbon atoms are randomly introduced into the polymer chain as R.

In the present disclosure, in addition to the α-olefin-maleic anhydride copolymer where alkyl groups having the same number of carbon atoms are introduced into the polymer chain as R, as described above, the α-olefin-maleic anhydride copolymer where alkyl groups having different numbers of carbon atoms are introduced into the polymer chain can be used as the α-olefin-maleic anhydride copolymer represented by the Chemical formula A.

The weight average molecular weight of the α-olefin-maleic anhydride represented by the Chemical formula A having a weight average molecular weight has no particular limit and can be suitably selected to suit to a particular application. For example, 5,000 to 20,000 is preferable. The weight average molecular weight can be measured by, for example, gel permeation chromatography (GPC).

The copolymer of α-olefin-maleic anhydride represented by the Chemical formula A, styrene-(meth)acrylic copolymer, water-soluble polyurethane resins, and water-soluble polyester resin are solid at room temperature and barely soluble in chilled water. However, when the copolymer and the resin are dissolved in an alkali (aqueous) solution equivalent or more (preferably 1.0 to 1.5 times of acid value) to the acid value of the copolymer and the resin, the obtained solution demonstrates the effect of a dispersant. The copolymer and the resin can be easily dissolved in an alkali (aqueous) solution by heating and stirring. However, when the olefin chain is long in the copolymer of α-olefin-maleic anhydride, it is not easy to dissolve the copolymer in the alkali (aqueous) solution and insoluble matters may remain in some cases. In such a case, the insoluble matter is removed with a filter, etc. to suitably use the solution as a polymer dispersion stabilizer.

Specific examples of the base in the alkali (aqueous) solutions include, but are not limited to, hydroxides of alkali metals such as sodium hydroxide, potassium hydroxide, lithium hydroxide; basic materials such as ammonia, triethyl amine, and morpholine; and alcohol amine such as triethanol amine, diethanol amine, N-methyl diethanol. 2-amino-2ethyl-1,3-propane diol, and choline. These can be used alone or in combination.

The copolymer of the α-olefin-maleic anhydride represented by the Chemical formula A can be synthesized or is available on the market.

Specific examples of the marketed products include, but are not limited to, T-YP112, T-YP115, T-YP114, and T-YP116 (all manufactured by SEIKO PMC CORPORATION).

As the copolymers of styrene and (meth)acrylate, suitably synthesized copolymer or a product available on the market is usable.

Specific examples of the marketed products include, but are not limited to, JC-05 (manufactured by SEIKO PMC CORPORATION), ARUFRON UC-3900, ARUFRON UC-3910, and ARUFRON UC-3920 (manufactured by TOAGOSET CO., LTD.).

As the water-soluble polyurethane resin, suitably synthesized resin or a product available on the market is usable.

Specific examples of the marketed products include, but are not limited to, Takelac W-5025, Takelac W-6010, and Takelac W-5661 (manufactured by Mitsui Chemicals, Inc.).

Any marketed products of the water-soluble polyester resins and any synthesized water-soluble polyurethane resins can be suitably used as the water-soluble polyurethane resin described above.

Specific examples of the marketed products include, but are not limited to, NICHIGO POLYESTER W-0030, NICHIGO POLYESTER W-0005S30WO, and NICHIGO POLYESTER WR-961 (manufactured by the NIPPON SYNTHESIS CHEMICAL INDUSTRY CO., LTD.), PES-RESIN A-210, and PESRESIN A-520 (manufactured by TAKAMATSU OIL & FAT CO., LTD.).

The acid value of the dispersant of polymer type has no particular limit and can be suitably selected to suit to a particular application. For example, it is preferably from 40 to 400 mgKOH/g and more preferably from 60 to 350 mgKOH/g. When the acid value is 40 mgKOH/g or greater, solubility of the alkali solution increases. When 400 mgKOH/g or less, viscosity of a dispersion can be reduced so that an increase of ink viscosity can be reduced, thereby maintaining discharging good and dispersion stability of a dispersion excellent.

The weight average molecular weight of the dispersant of polymer type has no particular limit and can be suitably selected to suit to a particular application. For example, it is preferably 20,000 or less and preferably from 5,000 to 20,000. When the mass average molecular mass is 20,000 or less, solubility of the alkali solution is high and viscosity is low so that viscosity of a dispersion can be decreased. When the mass average molecular mass is 5,000 or greater, dispersion stability of a pigment dispersion can be improved. The mass average molecular mass can be measured by, for example, gel permeation chromatography (GPC).

The dispersant can be used alone or in combination. Also, it is possible to use two or more kinds of polymer dispersants and low-molecular weight dispersants in combination. By the combinational use of two or more kinds of dispersants, a dispersant having strong points of each dispersant can be obtained to enhance dispersability and stability over time of the silver particles.

The amount of the dispersant is preferably from 1 to 100 parts by mass and more preferably from 10 to 50 parts by mass to 100 parts by mass of the silver particle. When the amount is 1 part by mass or greater, it is possible to disperse the silver particle to a primary particle depending on the dispersion condition. In addition, when the amount is 100 parts by mass of less, no extra component adsorbing to the silver particle is present so that the dispersant has no impact on the ink properties. Therefore, it is possible to reduce occurrence of image blur, deterioration of water resistance and scratch resistance, degradation of discharging performance from nozzles, and deterioration of economy.

Water, the silver particle, a dispersant, and other optional components are dispersed in the silver particle dispersion. For the dispersion, it is preferable to use a dispersing device to dissolve the dispersant in water. Next, the silver particle is added and sufficiently moistened. Thereafter, the resultant is dispersed by high speed stirring by a homogenizer, a disperser using balls such as a bead mill and a ball mill, a mixing and kneading disperser utilizing a shearing force such as a roll mill, or an ultrasonic disperser to prepare a silver particle liquid dispersion.

Using a transmission type electron microscope and reflection type electron microscope are suitable to observe the state of the silver particle. In addition, it is suitable to sever a pigment embedded in a resin to expose the cross section of the silver particle for observation. To grasp the dispersion state of the silver particle liquid dispersion, it is suitable to freeze the liquid dispersion according to freezing replica method at the time of preparation of the sample to observe individual silver particles. This makes it possible to fasten the breakage surface by deposition, etc. to check the dispersion state of the silver particle.

The composition of the silver particle can be subjected to macro composition analysis by fluorescent X-ray analysis, and micro sites can be subjected to composition analysis by using an electron probe microanalyzer (EPMA).

Moreover, utilizing energy dispersive X-ray analysis (EDX) in combination with a reflection type electron microscope, the composition per silver particle can be grasped.

In addition to this, element analysis of the uppermost layer of the composition and the chemical state of element can be grasped by X-ray photoelectron spectroscopy (XPS) to obtain the film state in detail. Moreover, three-dimensional composition distribution can be obtained by surface etching by sputtering method.

In addition, the proportion of the silver particle in the liquid dispersion of the silver particle is not particularly limited and can be suitably selected to suit a particular application. In terms of improving freedom of designing of ink formulation, the proportion is preferably from 1 to 50 percent by mass, more preferably from 1 to 30 percent by mass, and particularly preferably from 1 to 15 percent by mass. When the proportion is 1 percent by mass or greater, it is possible to control the concentration of the silver particle as ink formulation. In addition, when the proportion is 50 percent by mass or less, viscosity of the liquid dispersion can be reduced so that handling during ink manufacturing becomes easy. In addition, when the proportion is 30 percent by mass or less, stirring during manufacturing is easy, thereby further ameliorating dispersion efficiency.

It is preferable that the liquid dispersion of silver particle be optionally filtered with a filter, a centrifuge, etc. to remove coarse particles.

Method of Manufacturing Liquid Dispersion of Silver Particle Dispersed as Silver Colloid The silver particle is preferably dispersed in an aqueous dispersion medium as silver colloid having protective colloid attached to the surface thereof. Due to this, dispersion property of the silver particle to the aqueous dispersion medium is particularly excellent, thereby significantly improving storage stability of ink. The silver colloid can be prepared by any method. For example, it can be obtained by preparing a solution containing silver ion and reducing this silver ion with a reducing agent under the presence of a protection colloid.

For manufacturing a metal colloid by these methods, addition of a surfactant to an aqueous solution at any moment before and after reduction reaction further improves dispersion stability of metal particles.

In addition, the particle diameter of the silver particle can be controlled by controlling the reduction reaction by the reducing agent mentioned above. That is, it is possible to control the addition speed of the reducing agent and the reaction temperature. For example, particles having smaller particle diameters can be obtained by slowing down the addition speed of the reducing agent and lowering the liquid temperature.

The protective colloid can be any organic article serving to protect the surface of the silver particle with no limit. For example, organic compounds having a carboxyl group or dispersant polymers are preferable. These can be used alone or in combination, and the combinational use is more preferable to demonstrate synergy effect.

Organic Compound Having Carboxyl Group

The number of carboxyl groups in the organic compound having carboxyl groups has no particular limit as long as it is at least one per molecule, and can be suitably selected to suit to a particular application. For example, it is preferably from 1 to 10, more preferably from 1 to 5, and particularly preferably from 1 to 3.

In the organic compound having a carboxylic acid, carboxylic group may entirely or partially form salts (salts with amine, metal salts, etc.). In particular, in the present disclosure, it is possible to suitably use organic compounds in which carboxyl groups (in particular, all carboxyl groups) do not form salts (in particular, salts with basic compounds such as salts with amine or amine salts), i.e., organic compounds having isolated carboxyl groups.

In addition, as the organic compound having a carboxyl group, it has no particular limit as long as it includes carboxyl group, and can be suitably selected to suit to a particular application. Also, inclusion of functional groups (or coordinating group to metal compound or metal nano particle) other than carboxyl group is allowed.

Specific examples of such functional groups (or coordinating group) other than carboxyl group include, but are not limited to, groups (or functional groups) containing at least one hetero atoms selected from the group consisting of halogen atoms (fluorine atom, chlorine atom, bromine atom, iodine atom, etc.), nitrogen atom, oxygen atom, and sulfur atom, for example, groups having nitrogen atoms such as amino group, substituted amino group (e.g., dialkyl amino group), imino group (—NH—), nitrogen-containing cyclic groups such as 5 to 8 membered nitrogen-containing heterocyclic groups such as pyridyl group, carbazol group, morphonyl group), amide group (—CON<), cyano group, and nitro group, groups containing oxygen atoms such as hydroxy group, alkoxy group (such as alkoxy groups having 1 to 6 carbon groups such as methoxy group, ethoxy group, propoxy group, and buthoxy group), formyl groups, carbonyl groups (—CO—), ester group (—COO—), and oxygen-containing cyclic groups (such as 5 to 8 membered oxygen-containing cyclic groups such as tetahydropyranyl group), groups containing sulfur atoms such as thio group, thiol group, thiocarbonyl group (—SO—), alkylthio group (such as alkylthio groups having one to four carbon atoms such as methylthio group and ethylthio group), sulfo group, sulfamoyl group, and sulfinyl group (—$SO_2$—), and groups forming these salts such as ammonium salt group). These groups can be contained alone or in combination in the organic compounds containing carboxylic group.

As the organic compound containing carboxylic group, of these functional groups, compounds containing no basic group (in particular, amino group, substituted amino group, imino group, ammonium salt group, etc.) that can form a salt with carboxyl group are preferable.

Organic compounds containing representative carbocylic groups include carboxylic acids. Examples are monocarboxylic acids, polycarboxylic acids, and hydroxy carboxylic acids (or oxycarboxylic acids).

Specific examples of the monocarboxylic acid include, but are not limited to, aliphatic monocarboxylic acids (saturated aliphatic monocarboxylic acids such as those having 1 to 34 carbon atoms, preferably 1 to 30 carbon atoms such as acetic acid, propionic acid, butylic acid, caprylic acid, caproic acid, hexanoic acid, capric acid, lauric acid, myristic acid, cyclohexane carboxylic acid, dehydrocholic acid, and cholanic acid), unsaturated aliphatic monocarboxylic acid (such as those having 4 to 34 carbon atoms, preferably 10 to 30 carbon atoms, such as oleic acid, erucic acid, linolic acid, and abietic acid), and aromatic monocarboxylic acids (such as those having 7 to 12 carbon atoms such as benzoic acid and naphthoic acid).

Specific examples of the polycarboxylic acid include, but are not limited to, aliphatic polycarboxylic acids (saturated aliphatic polycarboxylic acids such as those having 2 to 14 carbon atoms, preferably 2 to 10 carbon atoms such as oxalic acid, malonic acid, succinic acid, glutaric acid, adipic acid, azelaic acid, sebacic acid, and cyclohexane dicarboxylic acid), unsaturated aliphatic polycarboxylic acid (such as those having 4 to 14 carbon atoms, preferably 4 to 10 carbon atoms, such as maleic acid, fumaric acid, itaconic acid, sorbic acid, and tetrahydrophthalic acid), and aromatic polycarboxylic acids (such as those having 8 to 12 carbon atoms such as phthalic acid and trimellitic acid).

Specific examples of the hydroxycarboxylic acid include, but are not limited to, hydroxymonocarboxylic acid (such as aliphatic hydroxymonocarboxylic acid such as those having 2 to 50 carbon atoms, preferably 2 to 34 carbon atoms, and more preferably 2 to 30 carbon atoms such as glycolic acid, lactic acid, oxybutylic acid, glyceric acid, 6-hydroxyhexanoic acid, cholic acid, deoxycholic acid, chenodeoxycholic acid, 12-oxochenodeoxycholic acid, glycocholic acid, lithocholic acid, hyodeoxycholic acid, ursodeoxycholic acid, apocholic acid, and taurocholic acid, aromatic hydroxy monocarboxylic acid (such as those having 7 to 12 carbon atoms such as salicylic acid, oxybenzoic acid, and gallic acid, and hydroxypolycarboxylic acids (such as those having 2 to 10 carbon atoms, such as aliphatic hydroxypolycarboxylic acids such as tartronic acid, tartaric acid, citric acid, and malic acid).

Those carboxylic acids are allowed to form salts and may be anhydrides or hydrates. In many cases, as described above, carboxylic acid does not form a salt (in particular, salts with basic compounds such as salts with amines).

These organic compounds having carboxylic acid can be used alone or in combination.

As the organic compound having carboxyl group, hydroxy carboxylic acids are preferable such as aliphatic hydroxy carboxylic acids (aliphatic hydroxymonocarboxylic acids and aliphatic hydroxypolycarboxylic acids).

As the aliphatic hydroxy carboxyl group, alicyclic hydroxy carboxylic acids or hydroxycarboxylic acid having an alicyclic backbone are preferable.

As the alicyclic hydroxy carboxylic acid or hydroxycarboxylic acid having an alicyclic backbone, alicyclic hydroxy carboxylic acids having 6 to 34 carbon atoms such as cholic acid are preferable. Alicyclic hydroxy carboxylic acids having 10 to 34 carbon atoms are preferable, and alicyclic hydroxy carboxylic acids having 16 to 30 carbon atoms are particularly preferable.

Polycyclic aliphatic hydroxy carboxylic acid such as cholic acid (such as condensation polycyclic ailphatic hydroxy carboxylic acid, preferably condensation polycyclic ailphatic hydroxy carboxylic acid having 10 to 34 carbon atoms, more preferably condensation polycyclic ailphatic hydroxy carboxylic acid having 14 to 34 carbon atoms, and particularly preferably condensation polycyclic ailphatic hydroxy carboxylic acid having 18 to 30 carbon atoms), polycyclic aliphatic carboxylic acids (for example, condensation polycyclic aliphatic carboxylic acids, preferably, condensation polycyclic ailphatic carboxylic acid having 10 to 34 carbon atoms and more preferably condensation polycyclic aliphatic carboxylic acid having 14 to 34 carbon atoms have bulky structures, so that agglomeration of silver particles can be significantly reduced, which is preferable.

The number average molecular weight of the organic compound having a carboxyl group is, for example, 1,000 or less (for example, 46 to about 900), preferably 800 or less (for example, 50 to about 700), and more preferably 600 or less (for example, 100 to about 500). The pKa value of the organic compound having a carboxyl group is, for example, 1 or greater (for example, 1 to about 10) and preferably 2 or greater (for example, 2 to about 8). The number average molecular weight can be measured by, for example, gel permeation chromatography (GPC).

Dispersant Polymer

In the present disclosure, protective colloid is constituted of a combination of the organic compound having a carboxyl group and a dispersant polymer. Such a constitution of protective colloid assists in obtaining a silver colloid containing silver particles in an extremely small amount of coarse particles. In particular, in the present disclosure, due to this particular combination of the protective colloid, the proportion of the silver particle can be increased in spite of a small proportion of coarse particles and storage stability of the silver colloid (and liquid dispersion thereof) is excellent.

The dispersant polymer has no particular limit as long as it can cover the silver particle. Preferably, amphiphatic dispersant polymers (or oligomer type dispersants) are preferably used.

Examples are those used to disperse a colorant in paint and ink.

Specific examples include, but are not limited to, styrene-based resin (styerene-(meth)acrylic acid copolymer, styrene-maleic anhydride copolymer, etc.), acrylic resins (methyl (meth)acrylate-(meth)acrylic acid copolymer, etc.), water-soluble urethane resins, water-soluble acrylic urethane resins, water-soluble epoxy resins, water-soluble polyester-based resins, cellulose derivatives (nitrocellulose, alkylcellulose such as ethylcellulose, alkyl-hydroxyalkyl cellulose such as ethylhydroxyethyl cellulose, hydroxyalkylcellulose such as hydroxyethyl cellulose and hydroxy propyl cellulose, cellulose ethers of carboxyalkyl cellulose such as carboxymethyl cellulose), polyvinyl alcohol, polyalkylene glycol (liquid polyethylene glycol, polypropylene glycol, etc.), natural polymers (gelatin, dextrin, etc.), polyethylene sulfonate, and formalin condensation products of naphthalene sulfonic acid. These can be used alone or in combination.

Representative dispersant polymers (amphiphatic dispersant polymer) are resins, water-soluble resins, or water-dispersible resins, including hydrophilic units (or hydrophilic block) constituted of hydrophilic monomers).

Specific examples of the hydrophilic monomer include, but are not limited to, monomers for addition polymerization such as monomers containing carboxyl group or acid anhydride {for example, (meth)acrylic monomers such as acrylic acid and methacrylic acid, unsaturated polycarboxuylic acids such as maleic acid, and maleic anhydride) and monomers containing hydroxyl group (hydroxyalkyl(meth)acrylate such as 2-hydroxyethyl(meth)acrylate, and vinylphenol); and monomers for condensation polymerization such as alkylene oxide (such as ethylene oxide).

The monomer for condensation polymerization may form a hydrophilic unit through reaction with an active group (for example, hydroxyl group-containing monomers) such as hydroxyl group).

The hydrophilic monomer may form a hydrophilic unit alone or in combination.

As least, the dispersant polymer includes a hydrophilic unit (or hydrophilic block). It can be a mono polymer or copolymer of a hydrophilic monomer (for example, polyacrylic acid or a salt thereof). Also, like the styrene-based resins or acrylic resins specified above, it can be a copolymer of a hydrophilic monomer and a hydrophobic monomer.

Specific examples of the hydrophobic monomer (nonionic monomer) include, but are not limited to, (meth)acrylic monomers such as (meth)acrylate {(meth)acrylic acid of alkyl having 1 to 20 carbon atoms such as methyl(meth) acrylate, ethyl(meth)acrylate, n-butyl(meth)acrylate, 2-ethylhexyl(meth)acrylate, lauryl(meth)acrylate, and stearyl (meth)acrylate, (meth)acrylic acid cycloalkyl such as cyclohexyl(meth)acrylate, aryl(meth)acrylate such as phenyl(meth)acrylate, benzyl(meth)acrylate, and aralkyl(meth) acrylate such as 2-phenylethyl(meth)acrylate}; styrene-based monomers such as styrene, α-methylstyrene, and vinyltoluene; olefin-based monomers such as α-olefin having 2 to 20 carbon atoms (such as ethylene, propylene, 1-butene, isobotylene, 1-hexene, 1-octen, and 1-dodecene); carboxylic acid vinylester-based monomers such as vinyl acetate and vinyl butylate. The hydrophobic monomer may form a hydrophobic unit alone or in combination.

When the dispersant polymer is a copolymer, for example, a copolymer of a hydrophilic monomer and a hydrophobic monomer, the copolymer is allowed to be a random copolymer, an alternate copolymer, a block copolymer (for example, a copolymer of a hydrophilic block constituted of a hydrophilic monomer and a hydrophobic block constituted of a hydrophobic monomer), or a comb-like copolymer (or comb-type graft copolymer).

The structure of the block copolymer is not particularly limited. For example, diblock structure and a triblock structure (ABA type and BAB type) are allowed.

In addition, in the comb-like copolymer, the main chain may be constituted of the hydrophilic block or the hydrophobic block or the hydrophilic block and the hydrophobic block.

In addition, the hydrophilic unit may be constituted of, for example, condensation-based block such as hydrophilic block (polyethyleneoxide, polyalkylene oxide such as polyethyleneoxide-polypropylene oxide) constituted of alkyleneoxide (ethylene oxide, etc.).

The hydrophilic block (polyalkylene oxide, etc.) and the hydrophobic block (polyolefin block, etc.) are allowed to be bonded via a coupling group such as ester bond, amide bond, ether bond, urethane bond, etc.

To form the bond, for example, hydrophobic block (such as polyolefin) is modified by a modifier (such as unsaturated carboxylic acid or anhydride thereof such as maleic anhydride, lactam or aminocarboxylic acid, hydroxyl amine, and diamine) and thereafter the hydrophilic block is introduced.

In addition, the comb-like copolymer (comb-like copolymer having the main chain constituted of a hydrophobic block) is allowed to be formed through reaction (or bond) between a polymer obtained from a monomer (such as the hydroxylalkyl(meth)acrylate) having a hydrophilic group such as hydroxyl group and carboxyl group and the condensation-based hydrophilic monomer (such as ethylene oxide group).

Moreover, in the copolymerization component, the hydrophobicity and the hydrophilicity can be balanced by using a hydrophilic nonionic monomer.

For example, such a component includes a monomer or oligomer including an alkyleneoxy (in particular ethyleneoxy) unit such as 2-(2-methoxyethoxy)ethyl(meth)acrylate and polyethyleneglycol monomethacrylate (having, for example, a number average molecular weight of from 200 to 1,000).

In addition, hydrophilicity and hydrophobicity can be balanced by modification (for example, esterification) of a hydrophilic group (such as carboxyl group).

The dispersant polymer may include a functional group. Examples of the functional group include acid groups (or acidic such as carboxyl group or acid anhydride group), sulfo group (sulfonic acid group), and hydroxy group. The dispersant polymer may contain these functional groups alone or in combination. Of these functional groups, it is preferable to include an acid group and more preferable to include carboxyl group.

In addition, when the dispersant polymer includes an acid group (such as carboxyl group), the acid group (such as carboxyl group) may at least partially or entirely form a salt (salt with amine, metal salt, etc.). In particular, in the present disclosure, it is possible to suitably use a dispersant polymer (that is, including an isolated acid group, in particular, carboxyl group) in which an acid group such as carboxyl group (in particular all carboxyl groups) does not form a salt [(in particular, a salt (salt with an amine or amine salt) with a basic compound].

The acid value of the dispersant polymer having an acid group (in particular, carboxyl group) is, for example, preferably 1 mgKOH/g or greater (for example, 2 mgKOH/g to 100 mgKOH/g), more preferably 3 mgKOH/g or greater (for example, 4 mgKOH/g to 90 mgKOH/g), furthermore preferably 5 mgKOH/g or greater (for example, 6 mgKOH/g to 80 mgKOH/g), and particularly preferably 7 mgKOH/g or greater (for example, 8 mgKOH/g to 70 mgKOH/g). In addition, normally, it can be 3 mgKOH/g to 50 mgKOH/g (for example, 5 mgKOH/g to 30 mgKOH/g). Note that, in the dispersant polymer having an acid group, the amine value is allowed to be zero (or almost zero).

In the dispersant polymer, the site of the functional group mentioned above is not particularly limited. It can be at the main chain or the side chain and both of the main chain and the side chain.

Such functional groups can be, for example, functional groups (for example, hydroxyl group) derived from a hydrophilic monomer or a hydrophilic unit. They can be introduced into a polymer through copolymerization of a copolymerizable monomer (such as maleic anhydride) having a functional group. These can be used alone or in combination. Polymer dispersants disclosed in Japanese Unexamined Patent Application Publication No. 2004-207558 can be used as the dispersant polymers.

It is possible to use suitably synthesized article or products available on the market as the dispersant polymer.

Specific examples of the dispersant polymer (or dispersant constituted of at least amphiphatic dispersant) available on the market include, but are not limited to, Solsperse series (manufactured by AvECIA GROUP) such as Solsperse 13240, Solsperse 13940, Solsperse 32550, Solsperse 31845, Solsperse 24000, Solsperse 26000, Solsperse 27000, Solsperse 28000, and Solsperse 41090; DISPERBYK series (manufactured by Byk) such as DISPERBYK 160, DISPERBYK 161, DISPERBYK 162, DISPERBYK 163, DISPERBYK 164, DISPERBYK 166, DISPERBYK 170, DISPERBYK 180, DISPERBYK 182, DISPERBYK 184, DISPERBYK 190, DISPERBYK 191, DISPERBYK 192, DISPERBYK 193, DISPERBYK 194, DISPERBYK 2001, and DISPERBYK 2050; EFKA-46, EFKA-47, EFKA-48, EFKA-49, EFKA-1501, EFKA-1502, EFKA-4540, EFKA- 4550, Polymer 100, Polymer 120, Polymer 150, Polymer 400, Polymer 401, Polymer 402, Polymer 403, Polymer 450, Polymer 451, Polymer 452, and Polymer 453 (available from EFKA Chemical Co., Ltd.); AJISPER series (manufactured by Ajinomoto Fine-Techno Co., Inc.) such as AJISPER PB711, AJISPER PA111, AJISPER PB811, AJISPER PB821, and AJISPER PW911, FLOWLEN series (manufactured by KYOEISHA CHEMICAL Co., LTD.) such as FLOWLEN DOPA-158, FLOWLEN DOPA-22, FLOWLEN DOPA-17, FLOWLEN TG-700, FLOWLEN TG-720 W, FLOWLEN 730 W, FLOWLEN 740 W, and FLOWLEN-745 W; and JONCRYL® series (manufactured by Johnson Polymer) JONCRYL® 678, JONCRYL® 679, and JONCRYL® 62.

Of these, specific examples of the dispersant polymer having an acid group include, but are not limited to, DISPERBYK 190 and DISPERBYK 194.

The number average molecular weight of the dispersant polymer is preferably from 1,500 to 100,000, more preferably from 2,000 to 80,000 (for example, 2,000 to 60,000), furthermore preferably from 3,000 to 50,000 (for example, 5,000 to 30,000), and particularly preferably from 7,000 to 20,000. The number average molecular weight can be measured by, for example, gel permeation chromatography (GPC).

The proportion of the silver particle is preferably from 1 to 15 percent by mass and more preferably from 2.5 to 10 percent by mass to the total mass of ink. When the proportion is from 1 to 15 percent by mass, it is possible to ameliorate storage stability and discharging stability of ink and demonstration of silver gloss.

Organic Solvent

There is no specific limitation to the organic solvent for use in the present disclosure. For example, water-soluble organic solvents can be used. Examples are polyols, ethers such as polyol alkylethers and polyol arylethers, nitrogen-containing heterocyclic compounds, amides, amines, and sulfur-containing compounds.

Specific examples of the water-soluble organic solvents include, but are not limited to, polyols such as ethylene glycol, diethylene glycol, 1,2-propanediol, 1,3-propanediol, 1,2-butanediol, 1,3-butanediol, 1,4-butanediol, 2,3-butanediol, 3-methyl-1,3-butane diol, triethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butane triol, 1,2,3-butanetriol, 2,2,4-trimethyl-1,3-pentanediol, and petriol; polyol alkylethers such as ethylene glycol monoethylether, ethylene glycol monobutylether, diethylene glycol monomethylether, diethylene glycol monoethylether, diethylene glycol monobutylether, tetraethylene glycol monomethylether, and propylene glycol monoethylether; polyol arylethers such as ethylene glycol monophenylether and ethylene glycol monobenzylether; nitrogen-containing heterocyclic compounds such as 2-pyrolidone, N-methyl-2-pyrolidone, N-hydroxyethyl-2-pyrolidone, 1,3-dimethyl-2-imidazolidinone, ε-caprolactam, and γ-butyrolactone; amides such as formamide, N-methyl form amide, N,N-dimethylformamide, 3-methoxy-N,N-dimethylpropioneamide, and 3-buthoxy-N,N-dimethyl propionamide; amines such as monoethanolamine, diethanolamine, and triethylamine; sulfur-containing compounds such as dimethyl sulfoxide, sulfolane, and thiodiethanol; propylene carbonate, and ethylene carbonate.

To serve as a humectant and impart a good drying property, it is preferable to use an organic solvent having a boiling point of 250 degrees C. or lower.

Polyol compounds having eight or more carbon atoms and glycol ether compounds are also suitable. Specific examples of the polyol compounds having eight or more carbon atoms include, but are not limited to, 2-ethyl-1,3-hexanediol and 2,2,4-trimethyl-1,3-pentanediol.

Specific examples of the glycolether compounds include, but are not limited to, polyol alkylethers such as ethyleneglycol monoethylether, ethyleneglycol monobutylether, diethyleneglycol monomethyl ether, diethyleneglycol monoethylether, diethyleneglycol monobutylether, tetraethyleneglycol monomethylether, and propyleneglycol monoethylether; and polyol arylethers such as ethyleneglycol monophenylether and ethyleneglycol monobenzylether.

The polyol compounds having eight or more carbon atoms and glycolether compounds enhance permeability of ink for paper used as a print medium (recording medium).

The proportion of the organic solvent in ink has no particular limit and can be suitably selected to suit to a particular application.

In terms of the drying property and discharging reliability of the ink, the proportion is preferably from 10 to 60 percent by mass and more preferably from 20 to 60 percent by mass.

Water

Water is the main medium of aqueous ink.

As the water, pure water and hyperpure water such as deionized water, ultrafiltered water, reverse osmosis water, and distilled water are preferable to reduce ionic impurities as much as possible. In addition, it is preferable to use water sterilized through ultraviolet irradiation or addition of hydrogen peroxide to prevent incidence of mold or bacteria for storage for an extended period of time.

The proportion of the water is not particularly limited and can be suitably selected to suit to a particular application. It is preferably from 20 to 75 percent by mass, more preferably from 20 percent by mass to 65 percent by mass, and particularly preferably from 30 to 60 percent by mass to the total mass of ink. Inkjet ink causing less burden on environment can be produced within the range of from 20 to 75 percent by mass, which is preferable.

Resin

The type of the resin contained in the ink has no particular limit and can be suitably selected to suit to a particular application. Examples are urethane resins, polyester resins, acrylic-based resins, vinyl acetate-based resins, styrene-based resins, butadiene-based resins, styrene-butadiene-based resins, vinyl chloride-based resins, acrylic styrene-based resins, and acrylic silicone-based resins.

Resin particles formed of such resins may be also used. It is possible to mix a resin emulsion in which resin particles are dispersed in water serving as a dispersion medium with materials such as a coloring material and an organic solvent to obtain an ink. It is possible to use a suitably-synthesized resin particle. Alternatively, the resin particle is available on the market. These resin particles can be used alone or in combination.

The volume average particle diameter of the resin particle is not particularly limited and can be suitably selected to suit to a particular application. The volume average particle diameter is preferably from 10 to 1,000 nm, more preferably from 10 to 200 nm, and furthermore preferably from 10 to 100 nm to obtain good fixability and image hardness.

The volume average particle diameter can be measured by using, for example, a particle size analyzer (Nanotrac Wave-UT151, manufactured by MicrotracBEL Corp.).

The proportion of the resin particle is preferably from 0.1 to less than 9 percent by mass and more preferably from 0.3 to 4 percent by mass to the total mass of ink. When the proportion is from 0.1 to less than 9 percent by mass, it is possible to ameliorate scratch resistance of an obtained image and demonstration of metallic luster.

The particle diameter of the solid portion in ink has no particular limit and can be suitably selected to suit to a particular application. For example, the maximum frequency in the maximum number conversion is preferably from 20 to 1,000 nm and more preferably from 20 to 150 nm to ameliorate the discharging stability and image quality such as image density. The solid portion includes resin particles, particles of pigments, etc. The particle diameter can be measured by using a particle size analyzer (Nanotrac Wave-UT151, manufactured by MicrotracBEL Corp).

Additive Agent

Ink may further optionally include a surfactant, a defoaming agent, a preservative and fungicide, a corrosion inhibitor, a pH regulator, etc.

Surfactant

Examples of the surfactant are silicone-based surfactants, fluorochemical surfactants, amphoteric surfactants, nonionic surfactants, anionic surfactants, etc.

The silicone-based surfactant has no specific limit and can be suitably selected to suit to a particular application.

Of these, preferred are silicone-based surfactants which are not decomposed even in a high pH environment.

Specific examples include, but are not limited to, side-chain-modified polydimethylsiloxane, both-distal-end-modified polydimethylsiloxane, one-distal-end-modified polydimethylsiloxane, and side-chain-both-distal-end-modified polydimethylsiloxane. A silicone-based surfactant having a polyoxyethylene group or a polyoxypropylene group as a modification group is particularly preferable because such an agent demonstrates good properties as an aqueous surfactant. It is possible to use a polyether-modified silicone-based surfactant as the silicone-based surfactant. A specific example is a compound in which a polyalkylene oxide structure is introduced into the side chain of the Si site of dimethyl siloxane.

Specific examples of the fluorochemical surfactants include, but are not limited to, perfluoroalkyl sulfonic acid compounds, perfluoroalkyl carboxylic acid compounds, ester compounds of perfluoroalkyl phosphoric acid, adducts of perfluoroalkyl ethylene oxide, and polyoxyalkylene ether polymer compounds having a perfluoroalkyl ether group in its side chain. These are particularly preferable because they do not easily produce foams.

Specific examples of the perfluoroalkyl sulfonic acid compounds include, but are not limited to, perfluoroalkyl sulfonic acid and salts of perfluoroalkyl sulfonic acid. Specific examples of the perfluoroalkyl carboxylic acid compounds include, but are not limited to, perfluoroalkyl carboxylic acid and salts of perfluoroalkyl carboxylic acid.

Specific examples of the polyoxyalkylene ether polymer compounds having a perfluoroalkyl ether group in its side chain include, but are not limited to, salts of sulfuric acid ester of polyoxyalkylene ether polymer having a perfluoroalkyl ether group in its side chain and salts of polyoxyalkylene ether polymers having a perfluoroalkyl ether group in its side chain. Counter ions of salts in these fluorochemical surfactants are, for example, Li, Na, K, $NH_4$, $NH_3CH_2CH_2OH$, $NH_2(CH_2CH_2OH)_2$, and $NH(CH_2CH_2OH)_3$.

Specific examples of the amphoteric surfactants include, but are not limited to, lauryl aminopropionic acid salts, lauryl dimethyl betaine, stearyl dimethyl betaine, and lauryl dihydroxyethyl betaine.

Specific examples of the nonionic surfactants include, but are not limited to, polyoxyethylene alkyl phenyl ethers, polyoxyethylene alkyl esters, polyoxyethylene alkyl amines, polyoxyethylene alkyl amides, polyoxyethylene propylene block polymers, sorbitan aliphatic acid esters, polyoxyethylene sorbitan aliphatic acid esters, and adducts of acetylene alcohol with ethylene oxides.

Specific examples of the anionic surfactants include, but are not limited to, polyoxyethylene alkyl ether acetates, dodecyl benzene sulfonates, laurates, and polyoxyethylene alkyl ether sulfates.

These can be used alone or in combination.

The silicone-based surfactant has no particular limit and can be suitably selected to suit to a particular application. Specific examples include, but are not limited to, side-chain-modified polydimethyl siloxane, both distal-end-modified polydimethylsiloxane, one-distal-end-modified polydimethylsiloxane, and side-chain-both-distal-end-modified polydimethylsiloxane. In particular, a polyether-modified silicone-based surfactant having a polyoxyethylene group or a polyoxyethylene polyoxypropylene group is particularly preferable because such a surfactant demonstrates good property as an aqueous surfactant. Any suitably synthesized surfactant and any product available on the market is suitable. Products available on the market can be obtained from Byc Chemie Japan Co., Ltd., Shin-Etsu Silicone Co., Ltd., Dow Corning Toray Co., Ltd., etc., NIHON EMULSION Co., Ltd., Kyoeisha Chemical Co., Ltd., etc.

The polyether-modified silicon-based surfactant has no particular limit and can be suitably selected to suit to a particular application. For example, a compound is usable in which the polyalkylene oxide structure represented by the following Chemical formula S-1 is introduced into the side chain of the Si site of dimethyl polysiloxane.

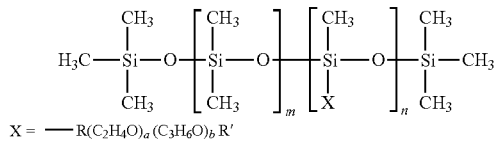

Chemical formula S-1

In the Chemical formula S-1, "m", "n", "a", and "b" each, respectively independently represent integers, R represents an alkylene group, and R' represents an alkyl group.

Specific examples of polyether-modified silicone-based surfactants include, but are not limited to, KF-618, KF-642, and KF-643 (all manufactured by Shin-Etsu Chemical Co., Ltd.), EMALEX-SS-5602 and SS-1906EX (both manufactured by NIHON EMULSION Co., Ltd.), FZ-2105, FZ-2118, FZ-2154, FZ-2161, FZ-2162, FZ-2163, and FZ-2164 (all manufactured by Dow Corning Toray Co., Ltd.), BYK-33 and BYK-387 (both manufactured by BYK Japan KK.), and TSF4440, TSF4452, and TSF4453 (all manufactured by Momentive Performance Materials Inc.).

A fluorochemical surfactant in which the number of carbon atoms replaced with fluorine atoms is 2 to 16 is preferable and, 4 to 16, more preferable.

Specific examples of the fluorochemical surfactants include, but are not limited to, perfluoroalkyl phosphoric acid ester compounds, adducts of perfluoroalkyl ethylene oxide, and polyoxyalkylene ether polymer compounds having a perfluoroalkyl ether group in its side chain.

Of these, polyoxyalkylene ether polymer compounds having a perfluoroalkyl ether group in its side chain are preferable because they do not foam easily and the fluorosurfactant represented by the following Chemical formula F-1 or Chemical formula F-2 is more preferable.

$$CF_3CF_2(CF_2CF_2)_m\text{—}CH_2CH_2O(CH_2CH_2O)_nH \quad \text{Chemical formula F-1}$$

In the compound represented by Chemical formula F-1, "m" is preferably 0 or an integer of from 1 to 10 and "n" is preferably 0 or an integer of from 1 to 40.

$$C_nF_{-2n+1}\text{—}CH_2CH(OH)CH_2\text{—}O\text{—}(CH_2CH_2O)_n\text{—}Y \quad \text{Chemical formula F-2}$$

In the compound represented by the chemical formula F-2, Y represents H or $C_mF_{2m+1}$, where n represents an integer of from 1 to 6, or $CH_2CH(OH)CH_2\text{—}C_mF_{2m+1}$, where m represents an integer of from 4 to 6, or $C_pH_{2p|1}$, where p is an integer of from 1 to 19. "n" represents an integer of from 1 to 6. "a" represents an integer of from 4 to 14.

As the fluorochemical surfactant, products available on the market may be used.

Specific examples include, but are not limited to, SURFLON S-111, SURFLON S-112, SURFLON S-121, SURFLON S-131, SURFLON S-132, SURFLON S-141, and SURFLON S-145 (all manufactured by ASAHI GLASS CO., LTD.); FLUORAD FC-93, FC-95, FC-98, FC-129, FC-135, FC-170C, FC-430, and FC-431 (all manufactured by SUMITOMO 3M); MEGAFACE F-470, F-1405, and F-474 (all manufactured by DIC CORPORATION); ZONYL TBS, FSP, FSA, FSN-100, FSN, FSO-100, FSO, FS-300, UR, and Capstone™ FS-30, FS-31, FS-3100, FS-34, and FS-35 (all manufactured by The Chemours Company); FT-110, FT-250, FT-251, FT-400S, FT-150, and FT-400SW (all manufactured by NEOS COMPANY LIMITED); POLYFOX PF-136A, PF-156A, PF-151N, PF-154, and PF-159 (manufactured by OMNOVA SOLUTIONS INC.); and UNIDYNE™ DSN-403N (manufactured by DAIKIN INDUSTRIES, Ltd.). Of these, in terms of improvement on print quality, in particular coloring property and permeability, wettability, and uniform dying property on paper, FS-3100, FS-34, and FS-300 of The Chemours Company, FT-110, FT-250, FT-251, FT-400S, FT-150, and FT-400SW of NEOS COMPANY LIMITED, POLYFOX PF-151N of OMNOVA SOLUTIONS INC., and UNIDYNE™ DSN-403N (manufactured by DAIKIN INDUSTRIES, Ltd.) are particularly preferable.

The proportion of the surfactant in ink is not particularly limited and can be suitably selected to suit to a particular application. For example, it is preferably from 0.001 to 5 percent by mass and more preferably from 0.05 to 5 percent by mass in terms of excellent wettability and discharging stability and improvement on image quality.

Defoaming Agent

The defoaming agent has no particular limit. For example, silicon-based defoaming agents, polyether-based defoaming agents, and aliphatic acid ester-based defoaming agents are suitable. These can be used alone or in combination. Of these, silicone-based defoaming agents are preferable in terms of the effect of breaking foams.

Preservatives and Fungicides

The preservatives and fungicides are not particularly limited. A specific example is 1,2-benzisothiazoline-3-one.

Corrosion Inhibitor

The corrosion inhibitor has no particular limitation. Specific examples include, but are not limited to, acid sulfites and sodium thiosulfates.

pH Regulator

The pH regulator has no particular limit as long as it can control pH to not lower than 7. Specific examples include, but are not limited to, amines such as diethanol amine and triethanol amine.

Properties of ink are not particularly limited and can be suitably selected to suit to a particular application. For example, viscosity, surface tension, pH, etc, are preferable in the following ranges.

Viscosity of the ink at 25 degrees C. is preferably from 5 to 30 mPa·s and more preferably from 5 to 25 mPa·s to improve print density and text quality and obtain good dischargeability. Viscosity can be measured by, for example, a rotatory viscometer (RE-80L, manufactured by TOKI SANGYO CO LTD.). The measuring conditions are as follows:

Standard cone rotor (1° 34'×R24)
Sample liquid amount: 1.2 mL
Number of rotations: 50 rotations per minute (rpm)
25 degrees C.
Measuring time: three minutes The surface tension of the ink is preferably 35 mN/m or less and more preferably 32 mN/m or less at 25 degrees C. in terms of suitable leveling of ink on a recording medium and shortening drying time of the ink.

pH of the ink is preferably from 7 to 12 and more preferably from 8 to 11 in terms of prevention of corrosion of metal material in contact with liquid.

The ink of the present disclosure has no specific limitation and can be suitably selected to suit to a particular application. However, the ink is not used for forming an electroconductive pattern so that is cannot be used for electroconductive purpose.

Ink Discharging Head

The ink discharging head includes multiple nozzles to discharge ink, individual liquid chambers communicating with the multiple nozzles, a common liquid chamber to supply the ink to the individual liquid chambers, a circulating flow path communicating with the individual liquid chambers, a common circulating liquid chamber communicating with the circulating flow path, and a pressure generator to apply a pressure to the ink in the individual liquid chambers. The ink discharging head may furthermore optionally include other devices.

The ink discharging head causes the ink to flow in from a flow-in path to the individual liquid chambers and flow out from the individual liquid chambers to a flow-out path. At least before discharging the ink, the ink in the ink discharging head is caused to flow, so that the silver particle in the ink does not settle down, avoiding separation state.

In addition, it is preferable that the ink discharging head be connected with an ink supply unit to supply the ink to the individual liquid chambers via the flow-in path. For an inkjet printing device having a circulation device, it is preferable that the flow-out path be connected with the ink supply unit to circulate the ink between the ink discharging head and the ink supply unit. Such a configuration is advantageous to reduce the amount of waste ink ascribable to flow-out of the flow-out path.

Inkjet Printing Device and Inkjet Printing Method

The inkjet printing device of the present disclosure includes an inkjet discharging head including multiple nozzles to discharge ink, individual liquid chambers communicating with the multiple nozzles, a common liquid chamber to supply the ink to the individual liquid chambers, a circulating flow path communicating with the individual liquid chambers, a common circulating liquid chamber communicating with the circulating flow path, and a pressure generator to apply a pressure to the ink in the individual liquid chambers, the ink of the present disclosure, preferably, a printing device, a circulation device, and a color ink accommodation unit. The inkjet printing device may furthermore optionally include other devices.

The inkjet printing method of the present disclosure includes applying a thermal energy or a kinetic energy to the ink of the present disclosure and discharging the ink using an ink discharging head including multiple nozzles to discharge the ink, individual liquid chambers communicating with the multiple nozzles, a common liquid chamber to supply the ink to the individual liquid chambers, a circulating flow path communicating with the individual liquid chambers, a common circulating liquid chamber communicating with the circulating flow path, and a pressure generator to apply a pressure to the ink in the individual liquid chambers, and preferably, suspending circulation of the ink, re-circulating the ink, circulating the ink prior to discharging of the ink, and applying a pressure to the ink. The inkjet printing method includes other optional steps.

The inkjet printing method can be suitably conducted by the inkjet printing device.

Ink Discharging Head

The ink discharging head mentioned above can be the same as the ink discharging head for use in the ink of the present disclosure.

The ink discharging head includes an individual liquid chambers, a flow-in path to cause the ink to flow into the individual liquid chambers, and a flow-out path to cause the ink to flow out of the individual liquid chambers, and discharges the ink.

Printing Device and Printing Process

The printing device applies a thermal energy or a kinetic energy to discharge the ink for printing using an ink discharging head including multiple nozzles to discharge ink, individual liquid chambers communicating with the multiple nozzles, a common liquid chamber to supply the ink to the individual liquid chambers, a circulating flow path communicating with the individual liquid chambers, a common circulating liquid chamber communicating with the circulating flow path, and a pressure generator to apply a pressure to the ink in the individual liquid chambers.

In the printing process (applying a thermal energy or a kinetic energy to the ink of the present disclosure and discharging the ink), a thermal energy or a kinetic energy is applied to the ink to discharge the ink for printing using an ink discharging head including multiple nozzles to discharge ink, individual liquid chambers communicating with the multiple nozzles, a common liquid chamber to supply the ink to the individual liquid chambers, a circulating flow path communicating with the individual liquid chambers, a common circulating liquid chamber communicating with the circulating flow path, and a pressure generator to apply a pressure to the ink in the individual liquid chambers.

The printing process can be suitably conducted by the printing device.

It is preferable to print by discharging the ink while circulating the ink.

The ink can be suitably circulated by the circulation device.

Circulation Device

The circulation device circulates the ink from the flow-in path to the flow-out path. The circulation device preferably circulates the ink before the ink discharging head discharges the ink. This circulation can be continuous or intermittent.

For the intermittent circulation, it is preferable to provide a process of suspending the ink circulation, a process of re-circulating the silver ink before discharging the silver ink, and a printing process of printing by discharging the ink. Also, it is preferable to provide a process of applying a pressure to the silver ink with a strength such that the silver ink is not discharged while circulating the silver ink. This is preferable to obtain good discharging stability.

The ink discharging head is capable of discharging ink after the circulation device circulates the ink and thereafter suspending the circulation of the ink. Also, the ink discharging head can discharge the ink while the circulation device constantly circulates the ink.

Moreover, it is preferable that the ink discharging head apply a stimulus to the ink by expansion and contraction of the piezoelectric member disposed around the individual liquid chambers with a strength such that the ink is not discharged. This is advantageous to re-disperse the silver particle.

The circulation device has no specific limit and can be suitably selected to suit to a particular application. For example, liquid feeding pump is usable.

Ink Accommodation Unit and Color Ink Accommodation Unit

The ink accommodation unit (hereinafter referred to as ink cartridge, cartridge, or main tank) accommodates the ink.

The color ink accommodation unit accommodates color ink containing a coloring material and a solvent.

The ink or the color ink accommodated in the ink accommodation unit or the color ink accommodation unit is supplied to the ink supply unit via a liquid feeding path. In addition, the accommodation units are connected with a configuration to replenish the ink consumed in accordance with printing from the ink accommodation units to the ink supply unit via the liquid feeding path.

Ink Supply Unit

The ink supply unit supplies the ink or the color ink to the individual liquid chambers via the flow-in path. The circulation device preferably circulates the ink or the color ink between the ink supply unit and the ink discharging head via the flow-in path and the flow-out path. In addition, it is preferable to supply the ink from the accommodation unit to the ink supply unit via the liquid feeding path.

Liquid Feeding Path

The liquid feeding path supplies the ink or the color ink from the ink accommodation unit or the color ink accommodation unit.

Color Ink

The color ink includes a coloring material and a solvent, and optionally, resin particles and other components.

The color ink means achromatic ink such as black ink and white ink and chromatic color ink such as yellow ink, magenta ink, and cyan ink.

Using the color ink, various metallic color other than silver color can be reproduced.

Examples of the solvent are organic solvents and water.

As the organic solvent, the same organic solvent as those for the ink of the present disclosure can be used.

As the water, the same as those for the ink of the present disclosure can be used.

As the resin particle, the same as those for the ink of the present disclosure can be used.

Coloring Material

The coloring material has no particular limit. For example, pigments and dyes are suitable.

As the pigment, inorganic pigments or organic pigments can be used. These can be used alone or in combination. In addition, it is possible to use a mixed crystal.

As the pigments, for example, black pigments, yellow pigments, magenta pigments, cyan pigments, white pigments, green pigments, orange pigments, gloss pigments of gold, silver, etc., and metallic pigments can be used.

As the inorganic pigments, in addition to titanium oxide, iron oxide, calcium carbonate, barium sulfate, aluminum hydroxide, barium yellow, cadmium red, and chrome yellow, carbon black manufactured by known methods such as contact methods, furnace methods, and thermal methods can be used.

As the organic pigments, it is possible to use azo pigments, polycyclic pigments (phthalocyanine pigments, perylene pigments, perinone pigments, anthraquinone pigments, quinacridone pigments, dioxazine pigments, indigo pigments, thioindigo pigments, isoindolinone pigments, and quinophthalone pigments, etc.), dye chelates (basic dye type chelates, acid dye type chelates, etc.), nitro pigments, nitroso pigments, and aniline black can be used. Of those pigments, pigments having good affinity with solvents are preferable. Also, hollow resin particles and hollow inorganic particles can be used.

Specific examples of the pigments for black include, but are not limited to, carbon black (C.I. Pigment Black 7) such as furnace black, lamp black, acetylene black, and channel black, metals such as copper, iron (C.I. Pigment Black 11), and titanium oxide, and organic pigments such as aniline black (C.I. Pigment Black 1).

Specific examples of the pigments for color include, but are not limited to, C.I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 138, 150, 153, 155, 180, 185, and 213; C.I. Pigment Orange 5, 13, 16, 17, 36, 43, and 51; C.I. Pigment Red 1, 2, 3, 5, 17, 22, 23, 31, 38, 48:2, 48:2 {Permanent Red 2B(Ca)}, 48:3, 48:4, 49:1, 52:2, 53:1, 57:1 (Brilliant Carmine 6B), 60:1, 63:1, 63:2, 64:1, 81, 83, 88, 101 (rouge), 104, 105, 106, 108 (Cadmium Red), 112, 114, 122 (Quinacridone Magenta), 123, 146, 149, 166, 168, 170, 172, 177, 178, 179, 184, 185, 190, 193, 202, 207, 208, 209, 213, 219, 224, 254, and 264; C.I. Pigment Violet 1 (Rhodamine Lake), 3, 5:1, 16, 19, 23, and 38; C.I. Pigment Blue 1, 2, 15 (Phthalocyanine Blue), 15:1, 15:2, 15:3, 15:4, (Phthalocyanine Blue), 16, 17:1, 56, 60, and 63; C.I. Pigment Green 1, 4, 7, 8, 10, 17, 18, and 36.

The dye is not particularly limited and includes, for example, acidic dyes, direct dyes, reactive dyes, basic dyes. These can be used alone or in combination.

Specific examples of the dye include, but are not limited to, C.I. Acid Yellow 17, 23, 42, 44, 79, and 142, C.I. Acid Red 52, 80, 82, 249, 254, and 289, C.I. Acid Blue 9, 45, and 249, C.I. Acid Black 1, 2, 24, and 94, C. I. Food Black 1 and 2, C.I. Direct Yellow 1, 12, 24, 33, 50, 55, 58, 86, 132, 142, 144, and 173, C.I. Direct Red 1, 4, 9, 80, 81, 225, and 227, C.I. Direct Blue 1, 2, 15, 71, 86, 87, 98, 165, 199, and 202, C.I. Direct Black 19, 38, 51, 71, 154, 168, 171, and 195, C.I. Reactive Red 14, 32, 55, 79, and 249, and C.I. Reactive Black 3, 4, and 35.

The coloring material is preferably C.I. Pigment Blue 15:3, carbon black, titanium oxide, and hollow resins.

To obtain printed matter demonstrating natural silver metallic luster, it is preferable to use a pigment or dye having a color of black, cyan, or white. Using these, the color derived from the silver nano particle is lost, and the color of silver is naturally represented.

Pigments are preferable as the coloring material.

The volume average particle diameter of the coloring material is preferably from 50 to 400 nm. When the volume average particle diameter is within the range of from 50 to 400 nm, natural silver metallic luster is obtained. The volume average particle diameter can be measured by using, for example, a particle size analyzer (Nanotrac Wave-UT151, manufactured by MicrotracBEL Corp.).

The proportion of the coloring material in the ink is preferably from 0.1 to 15 percent by mass and more preferably from 1 to 10 percent by mass in terms of enhancement of image density, fixability, and discharging stability.

To obtain an ink by dispersing a pigment, for example, a hydrophilic functional group is introduced into a pigment to prepare a self-dispersible pigment, the surface of a pigment is coated with a resin followed by dispersion, or a dispersant is used to disperse a pigment.

To prepare a self-dispersible pigment by introducing a hydrophilic functional group into a pigment, for example, it is possible to add a functional group such as sulfone group and carboxyl group to the pigment (e.g., carbon) to disperse the pigment in water.

To coat the surface of a pigment with a resin, the pigment is encapsulated by microcapsules to make the pigment dispersible in water. This can be referred to as a resin-coated pigment. In this case, all the pigments to be added to ink are not necessarily entirely coated with a resin. Pigments partially or wholly uncovered with a resin are allowed to be dispersed in the ink unless such pigments have an adverse impact.

In a method of using a dispersant to disperse a pigment, for example, a known dispersant having a small molecular weight or a large molecular weight, which is represented by a surfactant, is used to disperse the pigment in ink.

As the dispersant, it is possible to use, for example, an anionic surfactant, a cationic surfactant, a nonionic surfactant, an amphoteric surfactant, etc. depending on a pigment.

Also, a nonionic surfactant (RT-100, manufactured by TAKEMOTO OIL & FAT CO., LTD.) and a formalin condensate of naphthalene sodium sulfonate are suitable as the dispersant.

Those can be used alone or in combination.

Pigment Dispersion

Materials such as water and an organic solvent are mixed with the pigment to obtain the ink. It is also possible to mix the pigment with water, a dispersant, etc., to prepare a pigment dispersion and thereafter mix the pigment dispersion with material such as water and an organic solvent to manufacture the ink.

The pigment dispersion is obtained by mixing and dispersing water, a pigment, a pigment dispersant, and other optional components and controlling the particle size. It is good to use a dispersing device for dispersion.

The particle diameter of the pigment in the pigment dispersion has no particular limit. For example, the average particle diameter of the coloring material is preferably from 50 to 400 nm to improve dispersion stability of the pigment and ameliorate discharging stability and image quality such as image density. Within this range, natural silver metallic luster is obtained. The particle diameter of the pigment can be measured using a particle size analyzer (Nanotrac Wave-UT151, manufactured by MicrotracBEL Corp).

In addition, the proportion of the pigment in the pigment dispersion is not particularly limited and can be suitably selected to suit a particular application. In terms of improving discharging stability and image density, the proportion is preferably from 0.1 to 50 percent by mass and more preferably from 0.1 to 30 percent by mass.

It is preferable that the pigment dispersion be filtered with a filter, a centrifuge, etc. to remove coarse particles followed by degassing.

Figure 2:
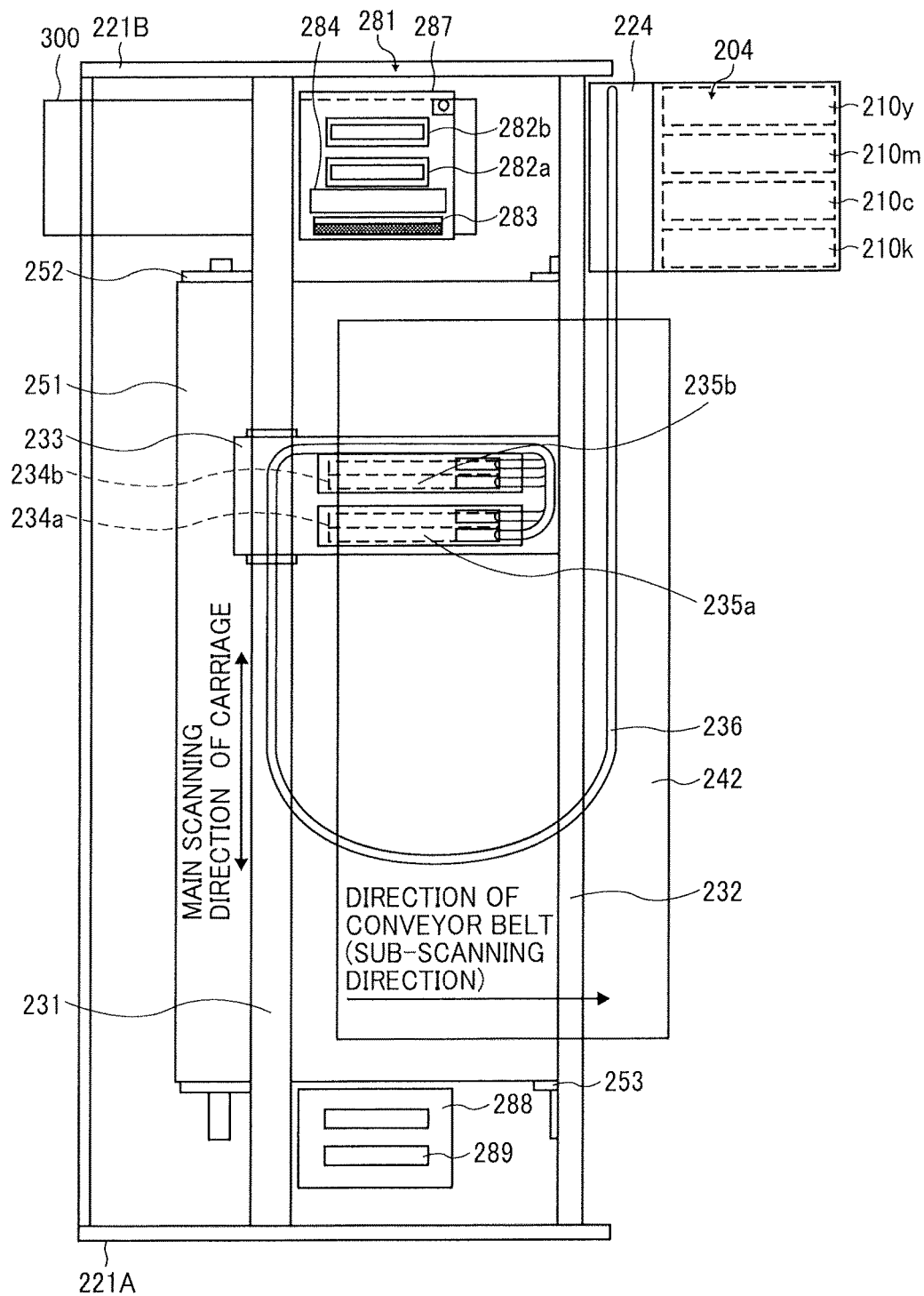
FIG. 2 is a diagram illustrating a planar view of the main part of the inkjet printing device illustrated in FIG. 1.

Embodiments of the present disclosure are described with reference to the accompanying drawings. An embodiment of the inkjet printing device of the present disclosure is described with reference to FIGS. 1 and 2. FIG. 1 is a schematic diagram illustrating an example of the mechanism of the inkjet printing device of the present disclosure. FIG. 2 is a diagram illustrating a planar view of the main part of the inkjet printing device illustrated in FIG. 1.

The inkjet printing device is of a serial type. An image forming apparatus 201 holds a carriage 233 slidably movable in the main scanning direction with primary and supporting guiding rods 231 and 232 as guiding members laterally bridged between side plates 221A and 221B on the right side and the left side of the image forming apparatus 201. A main scanning motor moves and scans (carriage main scanning direction) along the direction indicated by the arrow illustrated in FIG. 2 via a timing belt.

Hereinafter, a case of yellow (Y), cyan (C), magenta (M), and black (K) is described. Silver is added in addition to or instead of at least one of yellow (Y), cyan (C), magenta (M), and black (K) to obtain the inkjet printing method and the inkjet printing device of the present disclosure.

The carriage 233 carries multiple ink discharging heads 234a and 234b (which are referred to as ink discharging head 234, if not necessary to distinguish from each other. This applies to other members) to discharge ink droplets of each of yellow (Y), cyan (C), magenta (M), and black (K). Each of the ink discharging heads 234 carries a nozzle line having multiple nozzles in the sub-scanning direction vertical to the main scanning direction with the ink droplet discharging surface downward.

The ink discharging head 234 in the inkjet printing device of the present disclosure includes the flow-in path to cause the ink to flow into the individual liquid chambers and the flow-out path to cause the ink to flow out of the individual liquid chambers, the detail of which is described later.

Each of the ink discharging heads 234 includes two nozzle lines. One of the nozzle lines of the ink discharging head 234a discharges droplets of black (K) and the other nozzle line discharges droplets of cyan (C). Moreover, one of the nozzle lines of the ink discharging head 234b discharges droplets of magenta (M) and the other nozzle line discharges droplets of yellow (Y). It is also possible to use a recording head including nozzle lines of each color having multiple nozzles on a single nozzle surface as the ink discharging head 234.

The carriage 233 carries ink supply vessels (hereinafter referred to as head tank, supply tank, or ink tank) 235a and 235b to supply each color ink in accordance with the nozzle line of the ink discharging head 234. Ink accommodation vessels 210y, 210m, 210c, and 210k (referred to as ink accommodation unit 210, if not necessary to be distinguished) of each color are detachably attached to a cartridge insertion unit 204.

A supply pump unit 224 replenishes and supplies the ink of each color from the ink accommodation unit 210 to each head tank 235 via a supply tube 236 of each color.

As a sheet feeding unit to feed a sheet (recording medium) 242 loaded on a sheet loader (pressure plate) 241 of a sheet feeder tray 202 includes a half-moon shape roller (sheet feeding roller) 243 to separate and feed the sheet 242 one by one from the sheet loader 241 and a separation pad 244 that disposed facing the sheet feeding roller 243. The separation pad 244 is biased toward the half-moon shape roller 243.

To feed the sheet 242 fed from the sheet feeding unit below the ink discharging head 234, there are provided a guide member 245 to guide the sheet 242, a counter roller 246, a conveying guide member 247, a pressing member 248 including a front end pressing roller 249. The image forming apparatus 201 includes a conveyor belt 251 serving as a conveying device to convey the sheet 242 at the position facing the ink discharging head 234 by electrostatically adsorbing the sheet 242.

The conveyor belt 251 has an endless form, stretched between a conveyor roller 252 and a tension roller 253. A sub-scanning motor rotates the conveying roller 252 to move the conveyor belt 251 in a circular manner in the belt conveying direction illustrated in FIG. 2. In addition, a charging roller 256 serving as a charger is disposed around the conveyor roller 252 to charge the surface of the conveyor belt 251.

This charging roller 256 is disposed in contact with the surface layer of the conveyor belt 251 and rotationarily driven to the circular rotation of the conveyor belt 251.

Furthermore, as the sheet ejection unit to eject the sheet 242, on which an image is recorded by the ink discharging head 234, there are provided a separation claw 261 to separate the sheet 242 from the conveyor belt 251, an ejection roller 262, and an ejection roller 263. A sheet ejection tray 203 is located below the ejection roller 262.

A double-face print unit 271 is installed onto the rear side of the image forming apparatus 201 in a detachable manner.

The conveyor belt 251 conveys the sheet 242 by the reverse rotation to the double-face unit 271, which takes in and reverses the sheet 242, and thereafter feeds the sheet 242 back between the counter roller 246 and the conveyor belt 251. In addition, the upper surface of the double-face unit 271 forms a bypass tray 272.

Furthermore, a maintenance and recovery mechanism 281 is disposed in the non-image printing area on one side of the carriage 233 in the scanning direction thereof. It maintains and recovers the state of the nozzle of the ink discharging head 234. This maintenance and recovery mechanism 281 includes each of capping members (hereinafter referred to as caps) 282a and 282b to cap each of the nozzle surfaces of the ink discharging head 234. The maintenance and recovery mechanism 281 includes a wiping member (wiper blade) 283 to wipe off the nozzle surface and a dummy discharging receiver 284 to receive liquid droplets discharged not for recording but for dummy discharging to discharge thickened ink.

In addition, the maintenance and recovery mechanism 281 includes a carriage lock 287 to lock the carriage 233. Moreover, below the maintenance and recovery mechanism 281, a waste liquid tank 300 is attached to the image forming apparatus 201 in a replaceable manner to accommodate waste liquid produced during maintenance and recovery operation.

In addition, in the non-printing areas on the other side of the carriage 233 in the scanning direction, a dummy discharging receiver 288 is disposed to receive droplets discharged not for recording but for dummy discharging to remove the recording liquid thickened during recording, etc. The dummy discharging receiver 88 includes slits 289 along the direction of the nozzle line of the ink discharging head 234.

In the inkjet printing device having such a configuration, the sheet 242 is separated and fed from the sheet feeder tray 202 one by one substantially vertically upward, guided by the guide 245, and conveyed while being pinched between the conveyor belt 251 and the counter roller 246. Furthermore, the front end of the sheet 242 is guided by the conveying guide 237 and pressed against the conveyor belt 251 by the front end pressure roller 249 to change the conveying direction substantially 90 degrees.

At this point, the conveyor belt 251 is charged in an alternating charging voltage pattern by the charging roller 256. When the sheet 242 is fed onto the conveyor belt 251 charged with this alternating pattern, the sheet 242 is adsorbed to the conveyor belt 251 and conveyed thereon in the sub-scanning direction by the circulation movement of the conveyor belt 251.

At the same time, the ink discharging head 234 is driven in response to image signals while moving the carriage 233, the ink discharging head 234 discharges ink droplets onto the sheet 242 standing still to record an image thereon in an amount corresponding to one line and thereafter the sheet 242 is conveyed in a predetermined amount for recording in the next line. On receiving a signal indicating that the recording is finished or the rear end of the sheet 242 has reached the image recording area, the recording operation stops, and the sheet 242 is ejected to the ejection tray 203.

Figure 3:
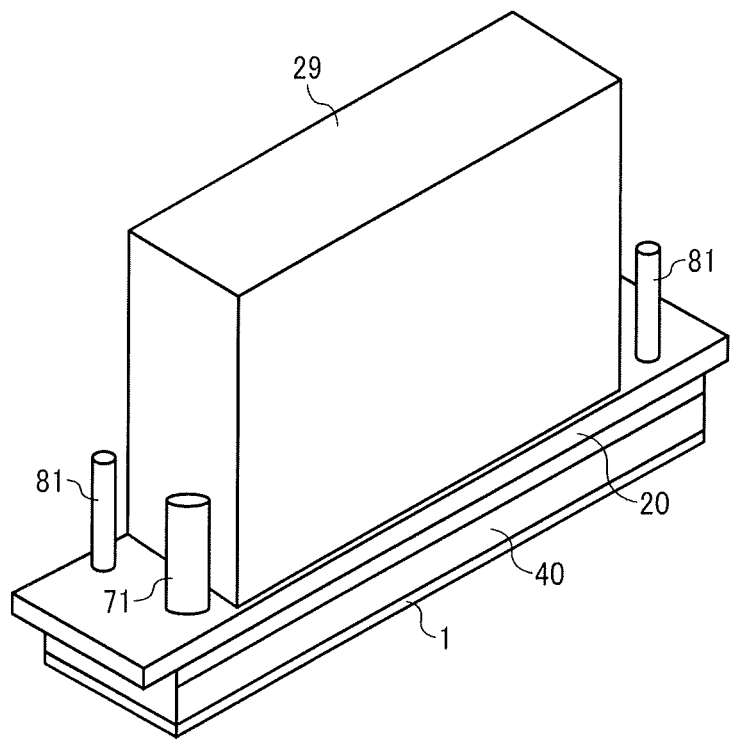
FIG. 3 is a diagram illustrating a perspective view of the outlook of an example of the ink discharging head of the inkjet printing device according to an embodiment of the present disclosure.
Figure 4:
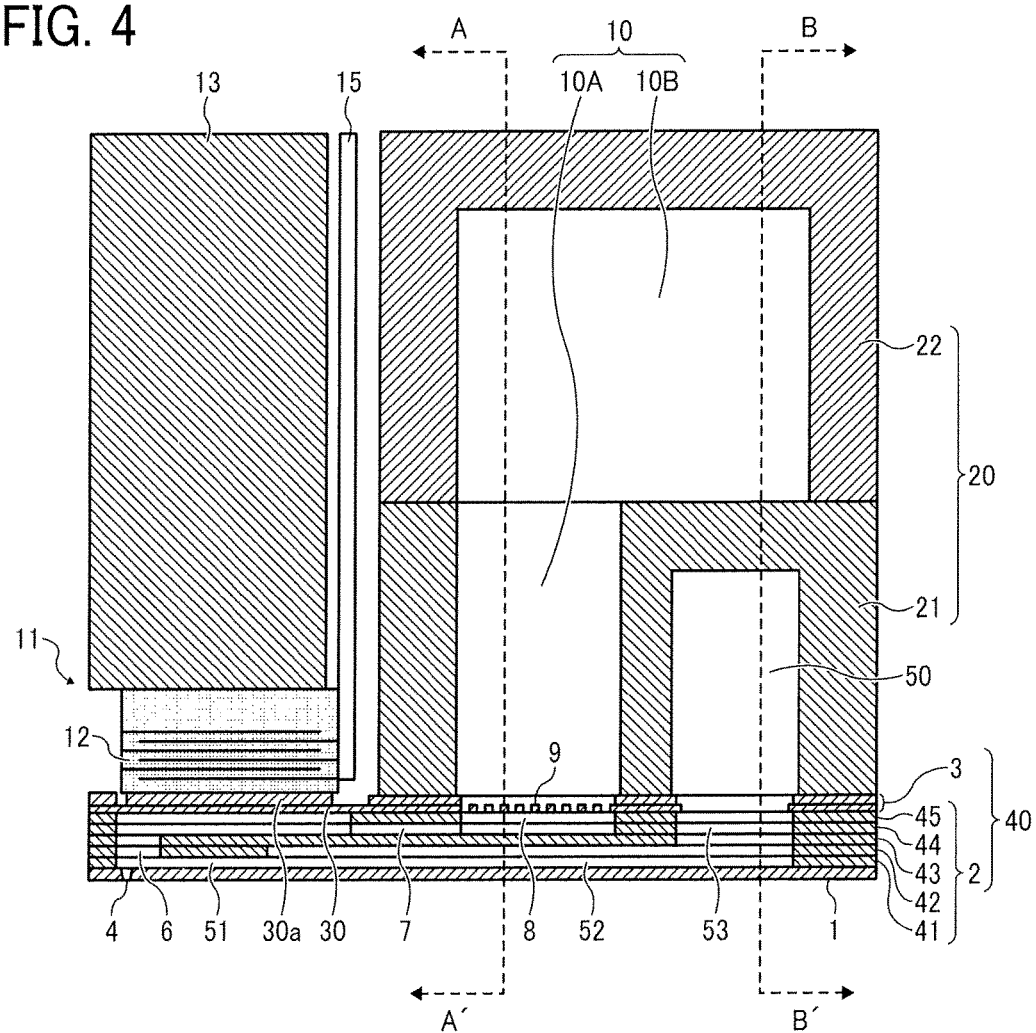
FIG. 4 is a diagram illustrating a cross section in a direction orthogonal to the nozzle arrangement direction of the ink discharging head illustrated in FIG. 3.
Figure 5:
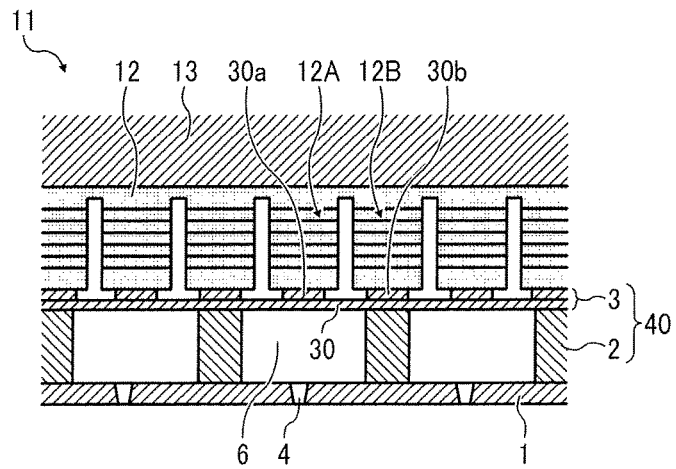
FIG. 5 is a diagram illustrating a partial cross section in a direction parallel to the nozzle arrangement direction of the ink discharging head illustrated in FIG. 3.
Figure 6:
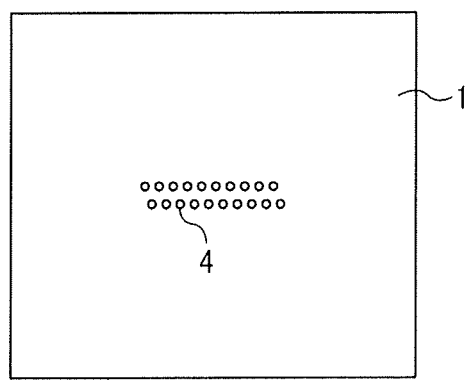
FIG. 6 is a diagram illustrating a planar view of a nozzle plate of the ink discharging head illustrated in FIG. 3.

An embodiment of the inkjet printing device of the present disclosure is described with reference to FIGS. 3, 4, 5, 6, 7A to 7F, 8A, and 8B. FIG. 3 is a diagram illustrating a perspective view of the outlook of an example of the ink discharging head of the inkjet printing device of the present disclosure. FIG. 4 is a diagram illustrating a cross section in a direction orthogonal to the nozzle arrangement direction of the ink discharging head illustrated in FIG. 3. FIG. 5 is a diagram illustrating a partial cross section in a direction parallel to the nozzle arrangement direction of the ink discharging head illustrated in FIG. 3. FIG. 6 is a diagram illustrating a planar view of the nozzle plate of the ink discharging head illustrated in FIG. 3. FIGS. 7A to 7F are diagrams illustrating a planar view of each member constituting a flow path of the discharging head illustrated in FIG. 3.

Figure 8A:
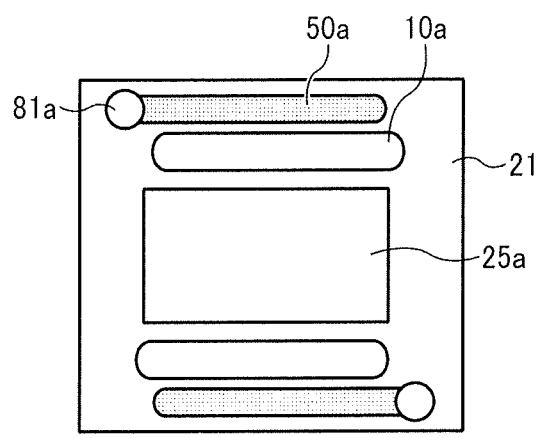
FIG. 8A is a diagram illustrating a planar view of each member constituting a common liquid chamber member of the discharging head illustrated in FIG. 3.
Figure 8B:
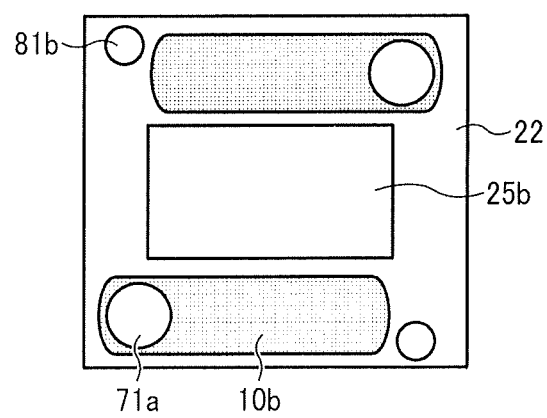
FIG. 8B is a diagram illustrating a planar view of each member constituting a common liquid chamber member of the discharging head illustrated in FIG. 3.

FIGS. 8A and 8B are diagrams illustrating a planar view of each member constituting the common liquid chamber of the discharging head illustrated in FIG. 3.

Also, the ink discharging head includes a nozzle plate 1, a flow path plate 2, and a diaphragm plate member 3 as a wall member, which are laminated and attached to each other. Also, the ink discharging head includes a piezoelectric actuator 11 to displace the diaphragm member 3, a common liquid chamber member 20, and a cover 29.

The nozzle plate 1 includes multiple nozzles 4 to discharge the ink.

The flow path plate 2 forms the individual liquid chamber 6 communicating with the nozzle 4, the fluid resistance 7 communicating with the individual liquid chamber 6 as the flow-in path, and the liquid introducing portion 8 communicating with the fluid resistance 7. In addition, the flow path plate 2 is formed of a plurality of plate-like members 41 to 45 laminated and attached to each other from the side of the nozzle plate 1. These plate-like members 41 to 45 and the diaphragm member 3 are laminated and attached to each other to form a flow path member 40.

The diaphragm member 3 includes a filter portion 9 as an opening to cause the liquid introducing portion 8 to communicate with the common liquid chamber 10 formed of the common liquid chamber member 20.

The diaphragm plate member 3 is a wall surface member forming the wall surface of the individual liquid chamber 6 of the flow path plate 2. This diaphragm member 3 has a double layer structure (but not limited to double) formed of a first layer forming a thin portion and a second layer forming a thick portion from the side of flow path plate 2. The first layer forms a transformable vibration area 30 at the site corresponding to the individual liquid chamber 6.

The nozzle plate 1 includes multiple nozzles 4 in a zigzag manner as illustrated in FIG. 6.

Figure 7A:
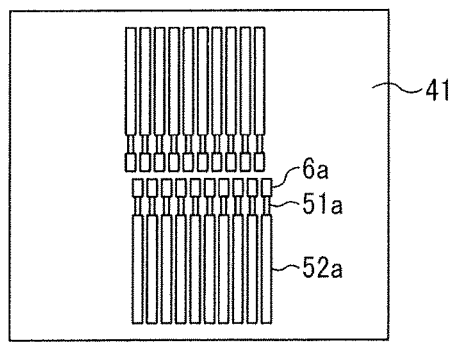
FIG. 7A is a diagram illustrating a planar view of each member constituting a flow path member of the discharging head illustrated in FIG. 3.

On the plate-like member 41 forming the flow path plate 2, a through-hole groove portion 6a (through hole having a groove-like form) constituting the individual liquid chamber 6, the fluid resistance 51, and through hole groove portions 51a and 52a constituting the circulation flow path 52 as the flow-out path are formed as illustrated in FIG. 7A.

Figure 7B:
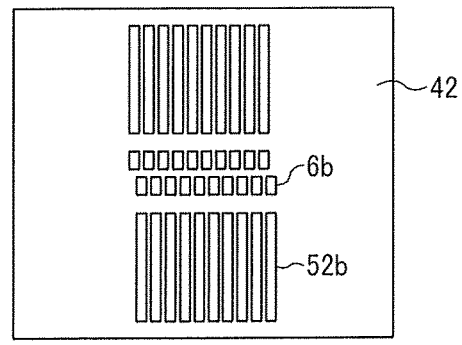
FIG. 7B is a diagram illustrating a planar view of each member constituting a flow path member of the discharging head illustrated in FIG. 3.

Similarly, on the plate-like member 42, a through-hole groove portion 6b constituting the individual liquid chamber 6 and a through hole groove portion 52b constituting the circulation flow path 52 are formed as illustrated in FIG. 7B.

Figure 7C:
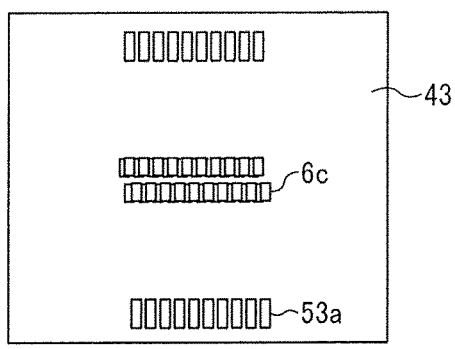
FIG. 7C is a diagram illustrating a planar view of each member constituting a flow path member of the discharging head illustrated in FIG. 3.

Similarly, on the plate like member 43, a through-hole groove portion 6c constituting the individual liquid chamber 6 and a through hole groove portion 53a constituting a circulation flow path 53 with the nozzle disposition direction along the longitudinal direction are formed as illustrated in FIG. 7C.

Figure 7D:
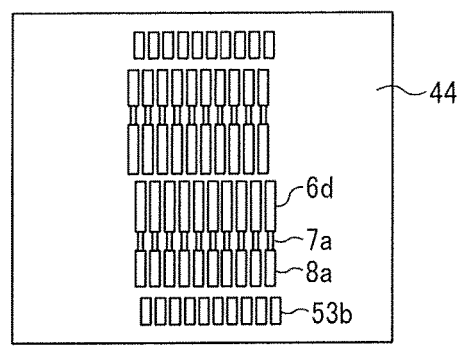
FIG. 7D is a diagram illustrating a planar view of each member constituting a flow path member of the discharging head illustrated in FIG. 3.

Similarly, on the plate like member 44, a through-hole groove portion 6d constituting the individual liquid chamber 6, a through-hole groove portion 7a constituting the fluid resistance 7, a through-hole groove portion 8a constituting the liquid introducing portion 8, and a through-hole groove portion 53b constituting the circulation flow path 53 with the nozzle disposition direction along the longitudinal direction are formed as illustrated in FIG. 7D.

Figure 7E:
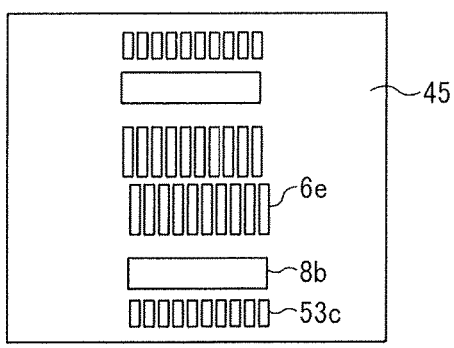
FIG. 7E is a diagram illustrating a planar view of each member constituting a flow path member of the discharging head illustrated in FIG. 3.

Similarly, on the plate like member 45, a through-hole groove portion 6e constituting the individual liquid chamber 6, a through-hole portion 8b (forming liquid chamber on the downstream of the filter) constituting the liquid introducing portion 8 with the nozzle disposition direction along the longitudinal direction, and a through hole groove portion 53c constituting a circulation flow path 53 with the nozzle disposition direction along the longitudinal direction are formed as illustrated in FIG. 7E.

Figure 7F:
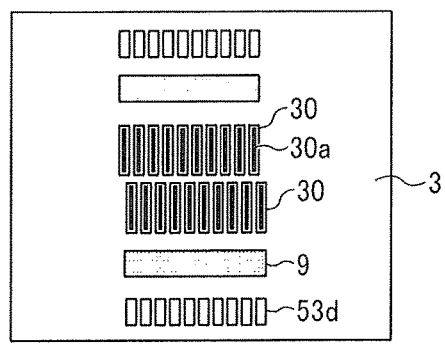
FIG. 7F is a diagram illustrating a planar view of each member constituting a flow path member of the discharging head illustrated in FIG. 3.

Similarly, on the plate like member 3, the vibration area 30, the filter portion 9, and a through-hole groove portion 53d constituting the circulation flow path 53 with the nozzle disposition direction along the longitudinal direction are formed as illustrated in FIG. 7F.

Complicated flow paths can be formed with such a simple configuration of the flow path member constituted of multiple laminated and attached plate-like members.

According to this configuration, on the flow path member 40 formed of the flow path plate 2 and the diaphragm member 3, the fluid resistance 51 along the surface direction of the flow path plate 2 communicating with each of the individual liquid chambers 6, the circulation flow path 52, and the circulation flow path 53 disposed along the thickness direction of the flow path member 40 communicating with the circulation flow path 52 are formed. The circulation flow path 53 communicates with a circulation common liquid chamber 50, which is described later.

The common liquid chamber member 20 includes the common liquid chamber 10 and the circulation common liquid chamber 50 to which the ink is supplied from the main tank and the ink cartridge.

As illustrated in FIG. 8A, on a first common liquid chamber 21, there are formed a through hole 25a for piezoelectric actuator, a through hole groove portion 10a constituting a common liquid chamber 10A on the downstream, and a groove portion 50a with a basement, which constitutes the circulation common liquid chamber 50.

As illustrated in FIG. 8B, on a second common liquid chamber 22, there are formed a through hole 25b for piezoelectric actuator and a groove portion 10b constituting a common liquid chamber 10B on the upstream. In addition, as illustrated in FIG. 3, on the second common liquid chamber 22, there are formed a through hole 71a as a supplying opening communicating one end of the common liquid chamber 10 in the nozzle arrangement direction with a supply port 71.

On the first common liquid chamber 21 and the second common liquid chamber 22, there are formed through holes 81a and 81b communicating the other end (the end on the opposite side of the through hole 71a) of the circulation common liquid chamber 50 in the nozzle arrangement direction with a circulation port 81.

Note that, in FIGS. 8A and 8B, the groove portion with a basement is illustrated in solid (this applies to the drawings below).

The common liquid chamber member 20 is constituted of the first common liquid chamber member 21 and the second common liquid chamber member 22. The first common liquid chamber member 21 is attached to the flow path member 40 on the side of the diaphragm member 3 and the second liquid chamber member 22 is laminated and attached to the first common liquid chamber member 21.

The first common liquid chamber member 21 forms a common liquid chamber 10A on the downstream side, which constitutes a part of the common liquid chamber 10 communicating with the liquid introducing portion 8 and the circulation common liquid chamber 50 communicating with the circulation flow path 53. In addition, the second common liquid chamber 22 forms a common liquid chamber 10B on the upstream side, which constitutes the rest of the common liquid chamber 10.

The common liquid chamber 10A on the downstream side forming a part of the common liquid chamber 10 and the circulation common liquid chamber 50 are disposed side by side in the direction orthogonal to the nozzle arrangement direction. Also, the circulation common liquid chamber 50 is disposed at the position projected in the common liquid chamber 10.

Due to this, the dimension (size) of the circulation common liquid chamber 50 obtains freedom of designing from the dimension required for the flow paths including the individual liquid chamber 6, the fluid resistance 7, and the liquid introducing portion 8 formed of the flow path member 40.

Moreover, since the circulation common liquid chamber 50 and a part of the common liquid chamber 10 are disposed side by side and the circulation common liquid chamber 50 is positioned in the projection thereof in the common liquid chamber 10, the width of the head along the direction orthogonal to the nozzle arrangement direction can be reduced, thereby preventing a size increase of the head. The common liquid chamber member 20 includes the circulation common liquid chamber 50 and the common liquid chamber 10 to which the ink is supplied from the head tank or the ink cartridge.

On the opposite side of the diaphragm plate member 3 about the individual liquid chamber 6, there is disposed the piezoelectric actuator 11 including an electromechanical transducer element as a driving device (e.g., actuator, pressure generator) to transform the vibration area 30 of the diaphragm plate member 3.

As illustrated in FIG. 5, this piezoelectric actuator 11 includes a piezoelectric member 12 attached to a base member 13. The piezoelectric member 12 is grooved by half cut dicing and a particular number of piezoelectric elements 12A and 12B having a pillar-like form are formed on the single piezoelectric member 12 in a pectinate manner spaced a predetermined distance therebetween.

Although the piezoelectric element 12A of the piezoelectric element 12 is used as a piezoelectric element driven by a drive waveform and the piezoelectric element 12B of the piezoelectric element 12 is used as a simple supporting pillar without an application of a drive waveform, all of the piezoelectric elements 12A and the piezoelectric elements 12B can be used as piezoelectric elements driven by drive waveforms.

The piezoelectric element 12A is jointed to a convex part 30a, which is a thick part having an island-like form formed on the vibration area 30 of the diaphragm plate member 3. The piezoelectric element 12B is jointed to a convex part 30b, which is a thick part of the diaphragm plate member 3.

This piezoelectric member 12 is formed by alternately laminating piezoelectric layers and inner electrodes. Each of the inner electrodes are pulled out to the exterior to provide outer electrodes, with which flexible wiring members 15 is connected.

In the ink discharging head having such a configuration, for example, the piezoelectric element 12A shrinks by lowering the voltage applied to the piezoelectric element 12A from a reference voltage. For this reason, the vibration area 30 of the diaphragm plate member 3 is lowered, thereby inflating the volume of the individual liquid chamber 6, so that the ink flows into the individual liquid chamber 6.

Thereafter, the piezoelectric element 12A is elongated in the lamination direction by raising the voltage applied to the piezoelectric element 12A to transform the vibration area 30 of the diaphragm plate member 3 toward the nozzle 4 direction, thereby reducing the volume of the individual liquid chamber 6. As a result, the ink in the individual liquid chamber 6 is under pressure, so that the ink is discharged from the nozzle 4.

Thereafter, the voltage applied to the piezoelectric element 12A is returned to the reference voltage. Accordingly, the vibration area 30 of the diaphragm plate member 3 is back to the initial position so that the individual liquid chamber 6 inflates, which generates a negative pressure. At this point in time, the ink is supplied from the common liquid chamber 10 to the individual liquid chamber 6. After the vibration of the meniscus surface of the nozzle 4 decays and becomes stable, the system starts operations to discharge next droplets.

The drive method of the head is not limited to the above-mentioned (pull-push discharging). The way of discharging changes in accordance with how a drive waveform is provided, and pull discharging or push discharging is possible. In addition, in the embodiment described above, the laminated piezoelectric element is used as a device to cause a pressure change to the individual liquid chamber 6 but not limiting. For example, a piezoelectric element having a thin film can be used. Moreover, it is also possible to use a heat element which is disposed in the individual liquid chamber 6 and generates heat to produce air bubbles to change the pressure or an element causing a pressure change utilizing the electrostatic force.

Next, an example of the ink circulating system using the ink discharging head relating to the embodiment is described with reference to FIG. 9.

Figure 9:
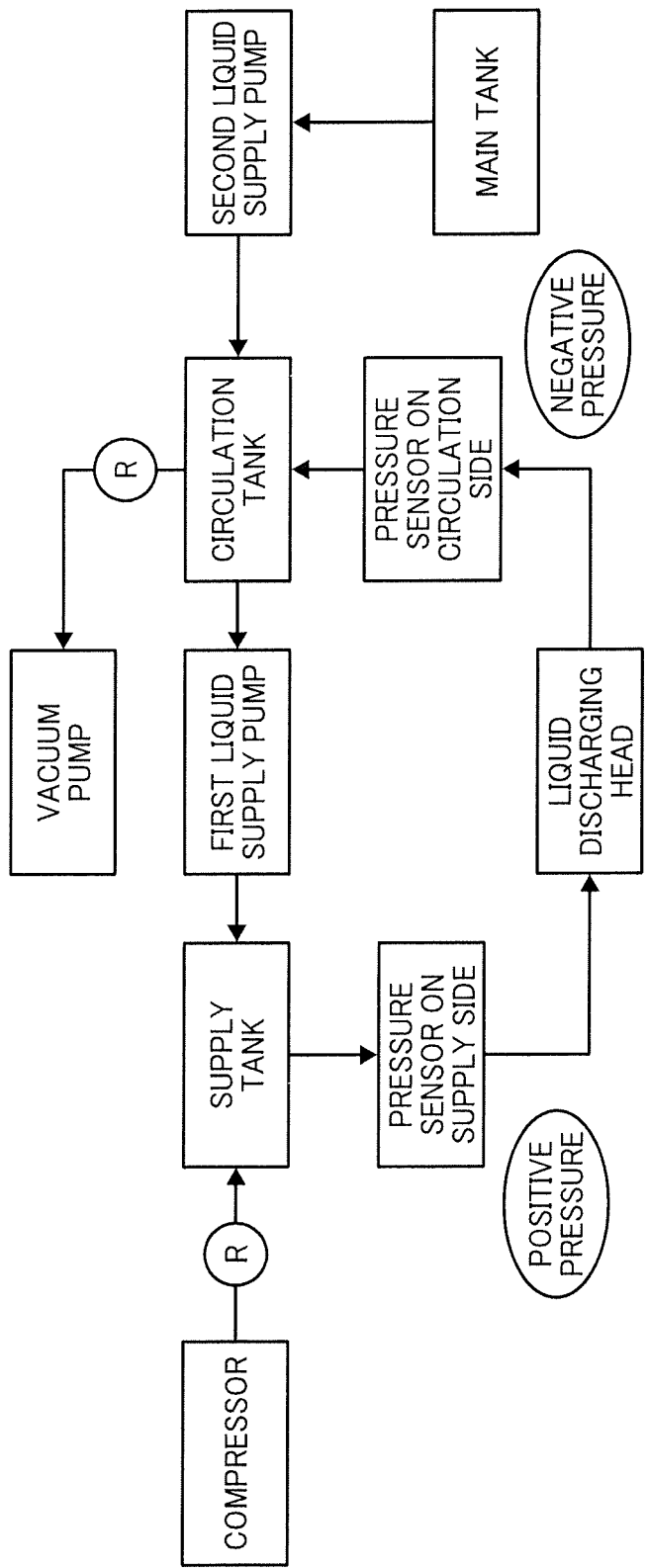
FIG. 9 is a block diagram illustrating an example of the system of ink circulation relating to the present disclosure.

FIG. 9 is a block diagram illustrating an example of the ink circulation system relating to the present disclosure.

As illustrated in FIG. 9, the ink circulation system includes a main tank, an ink discharging head, a supply tank, a circulation tank, a compressor, a vacuum pump, a liquid feeding pump, a regulator (R), a pressure sensor on the supply side, a pressure sensor on the circulation side, etc. The pressure sensor on the supply side is disposed between the supply tank and the ink discharging head and connected on the supply flow path side connected with the supply port 71 (FIG. 3) of the ink discharging head. The pressure sensor on the circulation side is disposed between the ink discharging head and the circulation tank and connected with the circulation flow path side connected with the circulation port 81 (FIG. 3) of the ink discharging head.

One end of the circulation tank is connected with the supply tank via the first liquid feeding pump and, the other end, with the main tank via the second liquid feeding pump. Due to this configuration, the ink flows from the supply tank into the ink discharging head through the supply port 71 and ejected through the circulation port to the circulation tank. Furthermore, the ink is sent from the circulation tank to the supply tank by the first liquid feeding pump for circulation.

In addition, a compressor is connected with the supply tank, which is controlled to detect a predetermined positive pressure by the pressure sensor on the supply side. In addition, a vacuum pump is connected with the circulation tank, which is controlled to detect a predetermined negative pressure by the pressure sensor on the circulation side. Therefore, the negative pressure of the meniscus can be maintained constant while circulating the ink through the ink discharging head.

In addition, as the liquid droplet is discharged from the nozzle of the ink discharging head, the amount of the ink in the supply tank and the circulation tank decreases. Therefor, it is desirable to replenish the ink from the main tank to the circulation tank using the second liquid feeding pump on suitable occasions. When to replenish the ink from the main tank to the circulation tank can be controlled based on the detection result of, for example, liquid surface sensor disposed in the circulation tank to replenish the ink when the liquid surface height becomes lower than the predetermined height.

Figure 10:
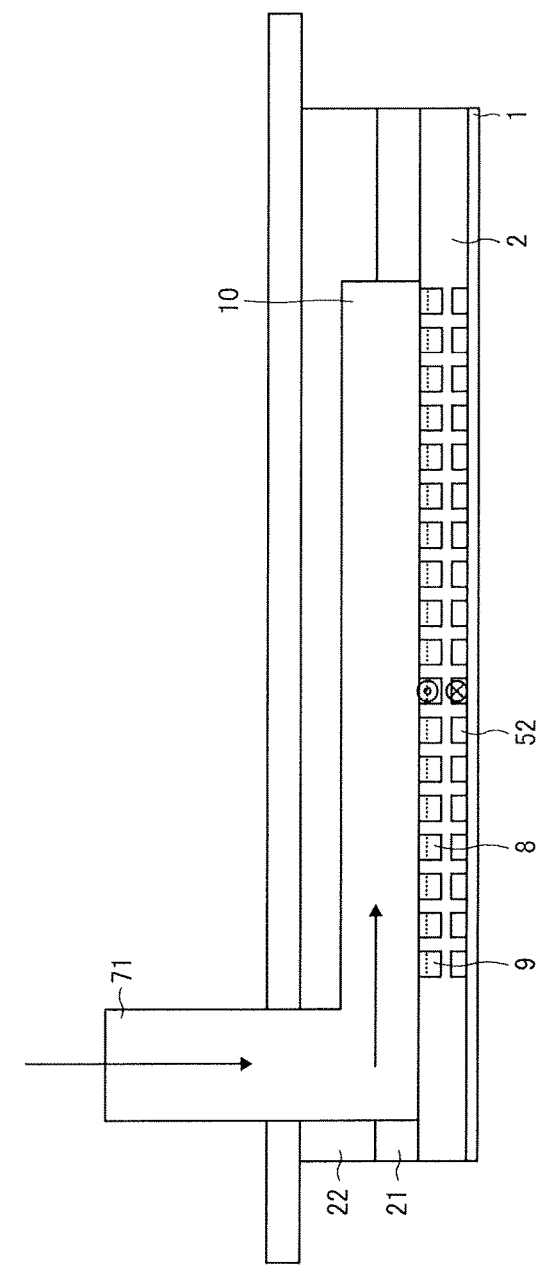
FIG. 10 is a cross section of FIG. 4 about A-A' line.
Figure 11:
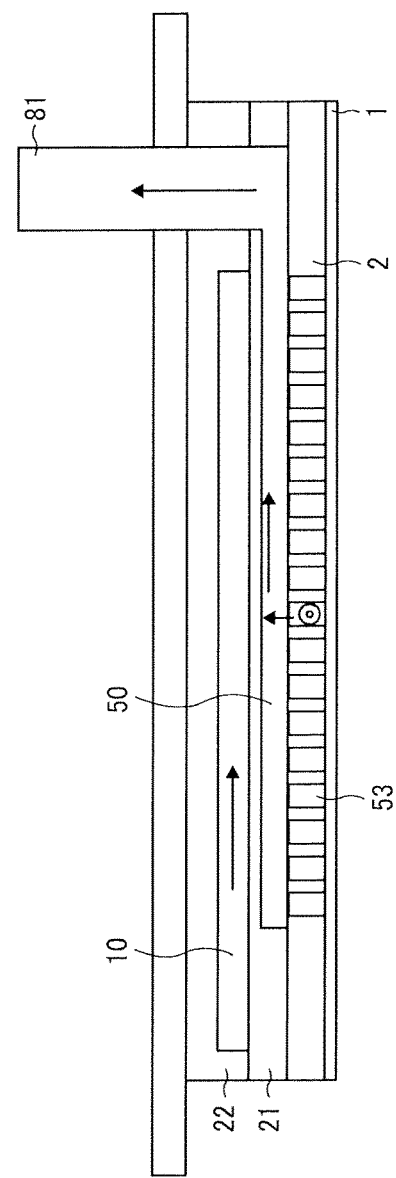
FIG. 11 is a cross section of FIG. 4 about B-B' line.

Next, the ink circulation in the ink discharging head is described. As illustrated in FIG. 3, the supply port 71 communicating with the common liquid chamber and the circulation port 81 communicating with the circulation common liquid chamber 50 are formed at ends of the common liquid chamber member 20. The supply port 71 and the circulation port 81 are connected with the supply tank and the circulation tank (FIGS. 10 and 11) to store the ink via respective tubes. The ink stored in the supply tank is supplied to the individual liquid chamber 6 via the supply port 71, the common liquid chamber 10, the liquid introducing portion 8, and the fluid resistance 7.

Moreover, while the piezoelectric element 12 is driven to discharge the ink in the individual liquid chamber 6 from the nozzle 4, the entire or the part of the ink accumulated in the individual liquid chamber 6 without being discharged circulates to the circulation tank via the fluid resistance 51, the circulation flow paths 52 and 53, the circulation common liquid chamber 50, and the circulation port 81.

The ink can be circulated during both operation and non-operation of the ink discharging head. If the ink circulates downtime, the ink in the individual liquid chamber 6 is always refreshed, and agglomeration and settling-down of the components contained in the ink can be reduced, which is preferable.

Control of Discharging

Figure 12:
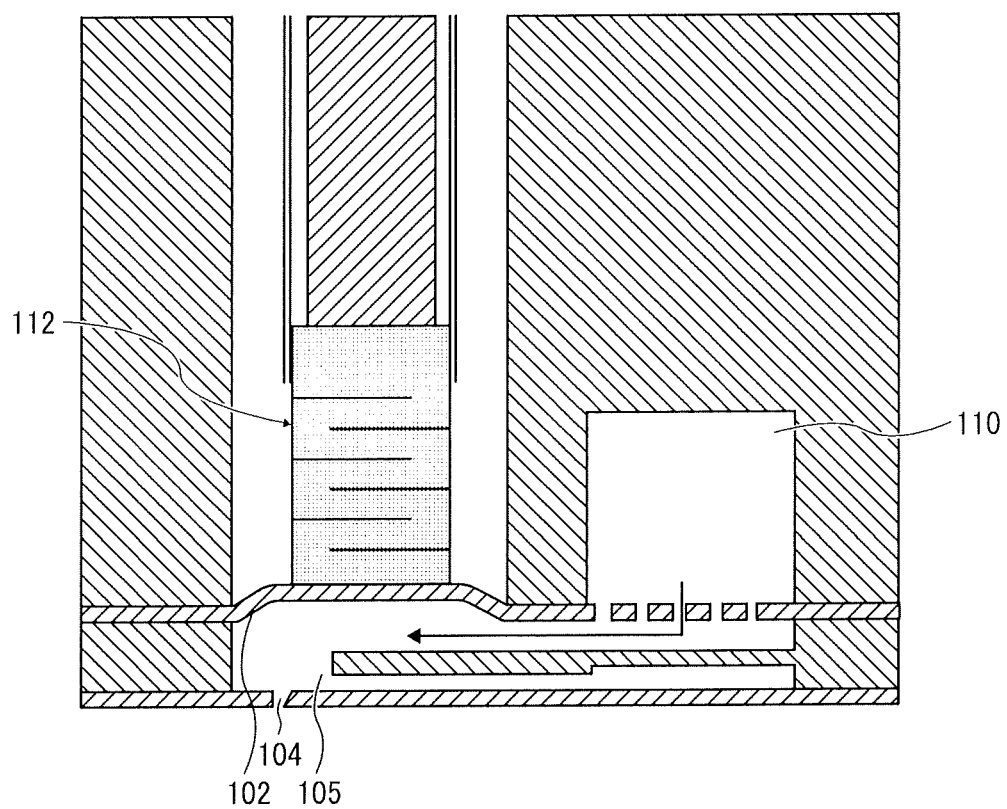
FIG. 12 is a diagram illustrating an example of the ink discharging head in the ink discharging device according to an embodiment of the present disclosure.

In the ink discharging head, as illustrated in FIG. 12, a piezoelectric element 112 shrinks by, for example, lowering the voltage applied to the piezoelectric element 12 from a reference voltage Ve, which transforms a diaphragm plate member 102, causing the volume of the individual liquid chamber 105 to inflate. As a result, the ink flows into the individual liquid chamber 105.

Figure 13:
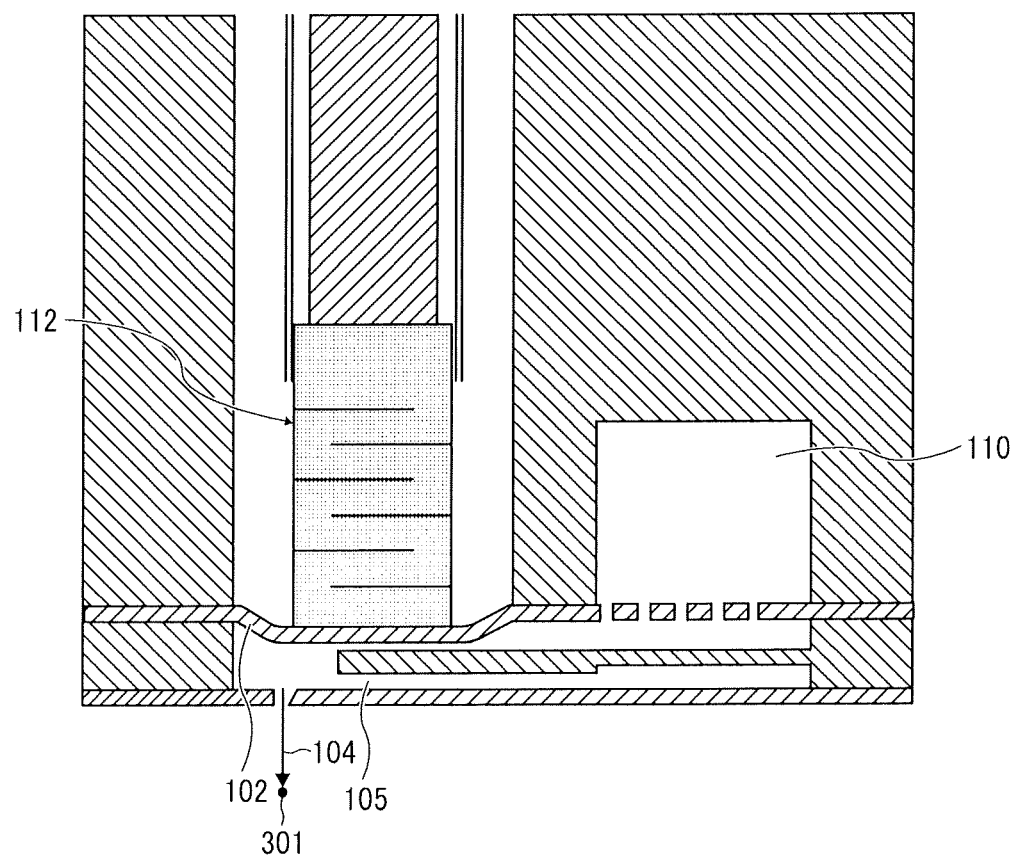
FIG. 13 is a diagram illustrating a cross section of the ink discharging head illustrated in FIG. 12.

Thereafter, as illustrated in FIG. 13, the voltage applied to the piezoelectric element 112 is raised to elongate the piezoelectric element 112 in the lamination direction, thereby transforming the diaphragm plate member 102 toward the nozzle 104, so that the volume of an individual liquid chamber 105 shrinks. For this reason, the liquid in the individual liquid chambers 105 is pressurized, so that a droplet 301 is discharged through the nozzle 104.

Thereafter, the voltage applied to the piezoelectric element 112 is returned to the reference voltage Ve. Accordingly, the diaphragm 102 is back to the initial position, so that the individual liquid chamber 105 inflates, generating a negative pressure. At this point, the liquid chamber 105 is filled with the ink from the common liquid chamber 110. After the vibration of the meniscus surface of the nozzle 104 decays and becomes stable, the system starts operations to discharge the next droplet.

Figure 14:
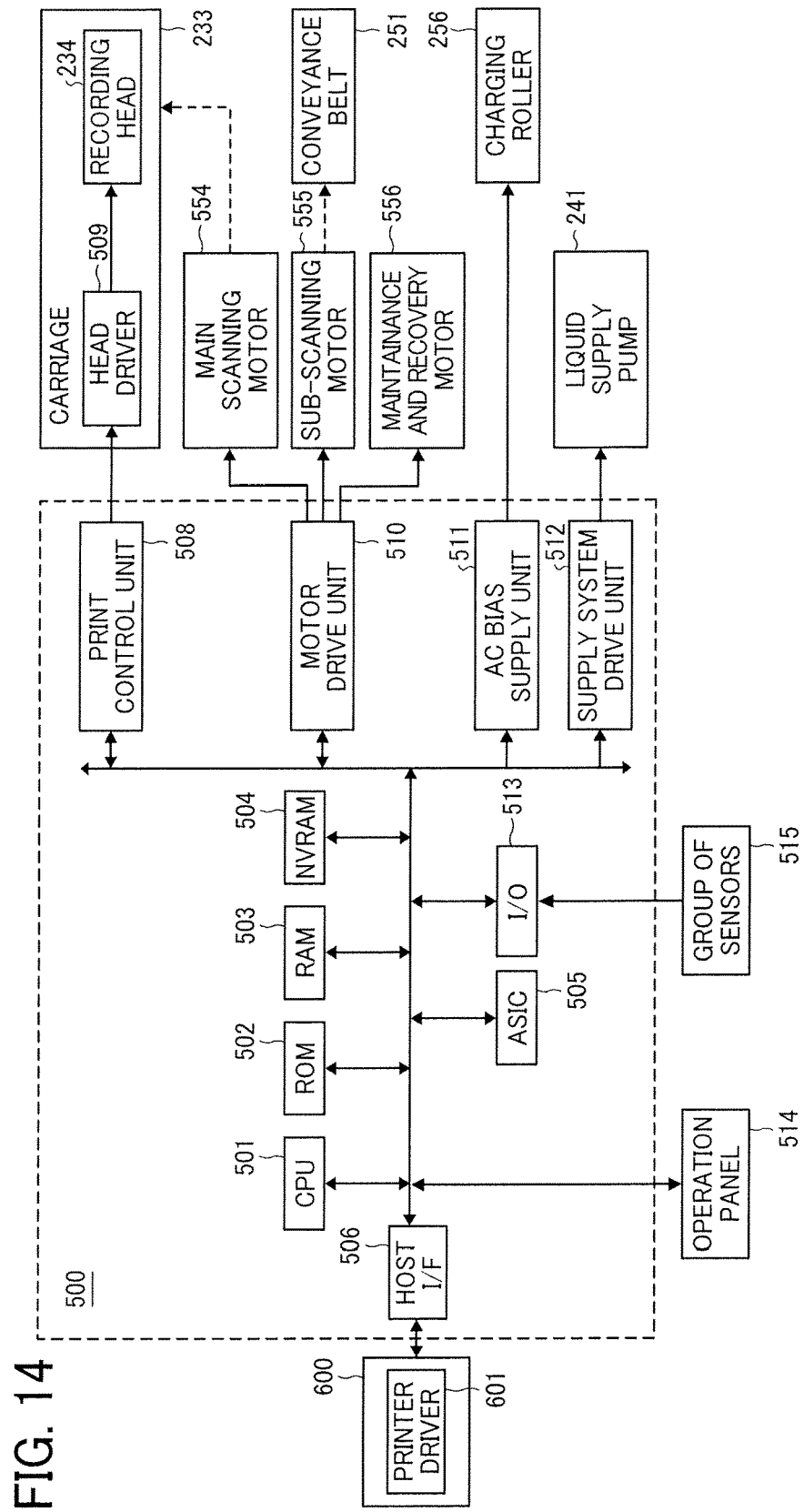
FIG. 14 is a block diagram illustrating an example of the control unit of the inkjet printing device according to an embodiment of the present disclosure.

Next, the control unit of the inkjet printing device of the present disclosure is described with reference to FIG. 14. FIG. 14 is a block diagram illustrating an example of the control unit of the inkjet printing device of the present disclosure.

A control unit 500 has a CPU 501 to control the entire of the inkjet printing device, a ROM 502 to store programs executed by the CPU 501 and other fixed data, and a RAM 503 to temporarily store image data, etc. In addition, the control unit 500 includes a non-volatile memory 504 (NVRAM) rewritable to maintain data while the power of the inkjet printing device is shut down and an application specific integrated circuit (ASIC) 505 to process I/O signal to control various signal processing for image data, image processing for sorting, and the entire device.

Also, the control unit 500 includes a print control unit 508 including a data transfer device to drive and control the ink discharging head 234 and a drive signal generating device and a head driver (driver IC) 509 to drive the ink discharging head 234 disposed on the side of the carriage 233. In addition, the control unit 500 also includes a main scanning motor 554 to move and scan the carriage 233, a sub-scanning motor 555 to circularly move the conveyor belt 251, a motor drive unit 510 to drive a maintenance and recovery motor 556 to move the cap 282 and the wiping member 283 of the maintenance and recovery mechanism 281 illustrated in FIG. 2 and operate a suction pump. In addition, the control unit 500 includes an AC bias supply unit 511 to supply an AC bias to the charging roller 256 and a supply system drive unit 512 to drive a liquid feeding pump 241.

In addition, this control unit 500 is connected with an operation panel 514 to input and display information required for the device.

The control unit 500 includes a host interface (I/F) 506 to send and receive data and signals with a host computer. This enables reception of the data from a host 600 such as an image processing device such as a home computer, an image reader, and an imaging device at the host I/F 506 via a cable or a network.

The CPU 501 of the control unit 500 reads and analyzes print data in the reception buffer included in the host I/F 506, conducts image processing and data sorting at an ASIC 505, and transfers the image data from the print control unit 508 to the head driver 509. The dot pattern data to output images are created at a printer driver 601 on the host 600 or the control unit 500.

In addition to transfer of the image data in serial data, the print control unit 508 outputs transfer clocks, latch signals, control signals, etc. required to transfer the image data and determine the transfer to the head driver 509. In addition, the print control unit 508 includes a drive signal generating unit including a D/A converter to make D/A conversion of pattern data of drive waveforms stored in the ROM 502, a voltage amplifier, a current amplifier, etc. It outputs a drive waveform constituted of a single or multiple drive pulses to the head driver 509.

The head driver 509 selects a drive pulse constituting a drive waveform provided from the print control unit 508 based on the serially input image data corresponding to an amount of a single line of the ink discharging head 234 and applies the pulses to a piezoelectric member 112 serving as a pressure generating device of the ink discharging head 234 to drive the ink discharging head 234. At the time of this selection, part or all of the drive pulses constituting the drive waveform or part or all of the waveform elements forming the drive pulse is selected to separately discharge different sizes of dots such as large droplets, middle-sized droplets, and small droplets.

An I/O unit 513 acquires information from a group of various sensors 515 installed onto the inkjet printing device, extracts the information required to control the printer, and use it to control the printer control unit 508, the motor control unit 510, and the AC bias supplying unit 511. The group of various sensors 515 include an optical sensor to detect the position of a sheet, a thermistor to monitor the temperature in the device, a sensor to monitor the voltage of the charging belt, and an interlock switch to detect open and close of a cover. The I/O unit 513 is capable of processing various kinds of sensor information.

Figure 15:
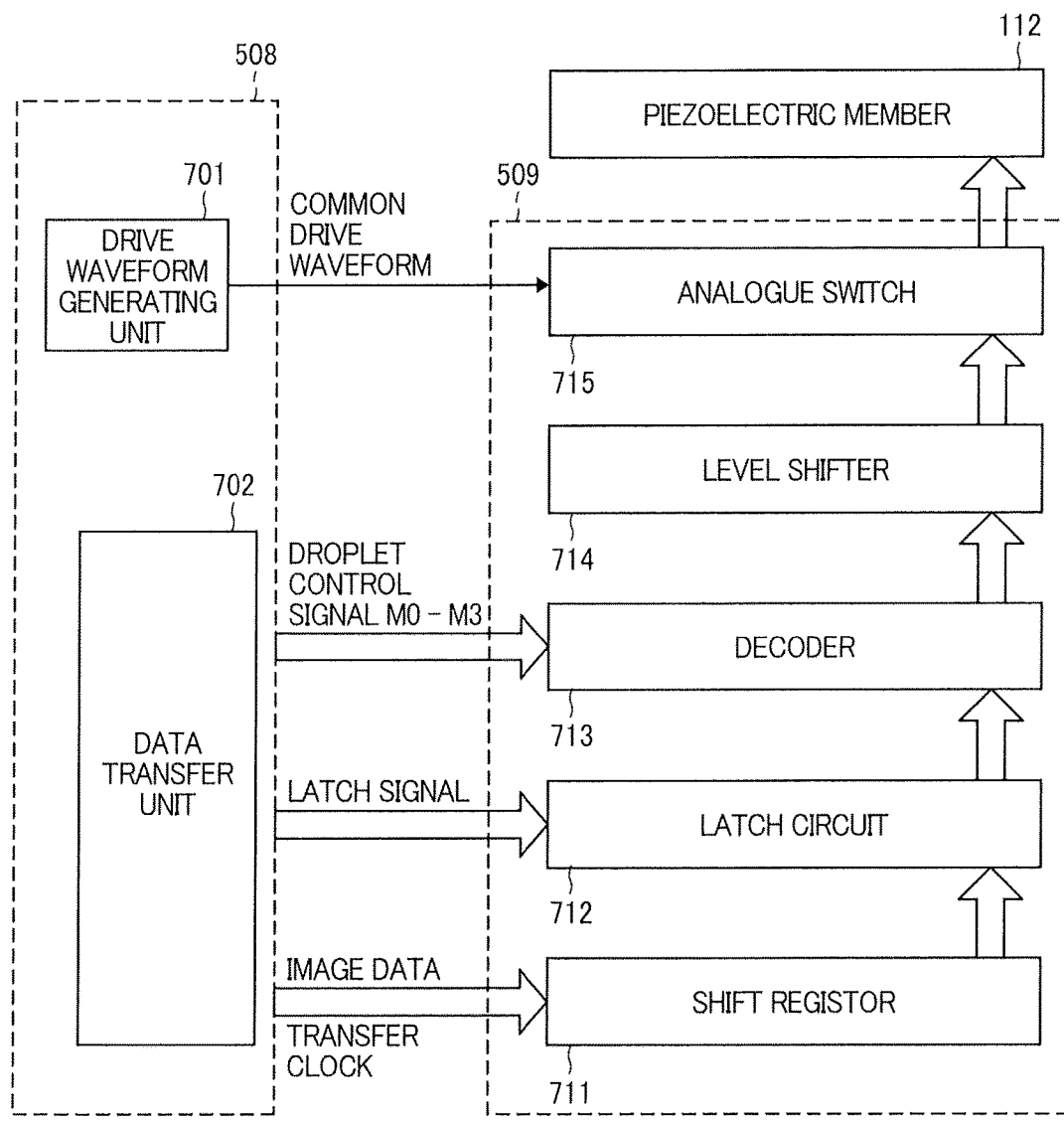
FIG. 15 is a block diagram illustrating an example of the print control unit and the head driver of the inkjet printing device according to an embodiment of the present disclosure.

Next, an embodiment of the print control unit 508 and the head driver 509 is described with reference to FIG. 15. FIG. 15 is a block diagram illustrating an example of the print control unit and the head driver of the inkjet printing device of the present disclosure.

The print control unit 508 includes a drive waveform generating unit 701 and a data transfer unit 702.

The drive waveform generating unit 701 generates and outputs a drive waveform (common drive waveform) constituted of multiple pulses (drive signals) in a single print cycle (a single drive cycle) during image formation. The data transfer unit 702 outputs two-bit image data (gradation signal 0 and 1) corresponding to the print image, a transfer clock, a latch signal (LAT), and a droplet control signals MO to M3.

Note that, the droplet control signal is a two-bit signal to instruct on and off of an analog switch 715 for each droplet, which serves as the switching device described later of the head driver 509. The droplet control signal transitions to H level (ON) by a drive pulse or drive waveform element selected to suit to the print cycle of the common drive waveform and to L level (OFF) when not selected.

The pulse for a large droplet is selected for the droplet control signal M3, the pulse for a middle-sized droplet is selected for the droplet control signal M2, the pulse for a small droplet is selected for the droplet control signal M1, and the drive pulse is selected for the droplet control signal M0.

The head driver 509 includes a shift register 711 to which a transfer clock (shift clock) from the data transfer unit 702 and a serially transferred image data (gradation data: two bit/1 channel per nozzle) are input and a latch circuit 712 to latch each registration value of the shift register 711 by a latch signal. In addition, the head driver 509 also includes a decoder 713 to decode the gradation data and the droplet control signals M0 to M3 to output the result and a level shifter 714 to change the logic level voltage signal of the decoder 713 to a level where the analogue switch 715 is operable. Moreover, the head driver 509 includes an analogue switch 715, which opens and closes (on and off) in accordance with the output of the decoder 713 provided via the level shifter 714.

The analog switch 715 is connected with a selective electrode (individual electrode) of each piezoelectric element 112, and a common drive waveform Pv from the drive waveform generating unit 701 is input to the analog switch 715. Therefore, the analog switch 715 is switched on and off in response to the result obtained by decoding the serially transferred image data (gradation data) and the droplet control signals M0 to M3 by the decoder 713. When the analog switch 715 is switched on, the predetermined drive pulse (or waveform element) constituting the common drive waveform Pv passes (or is selected) and is applied to the piezoelectric element 112.

Next, the drive waveform in one embodiment of the present disclosure is described with reference to FIG. 16.

Figure 16:
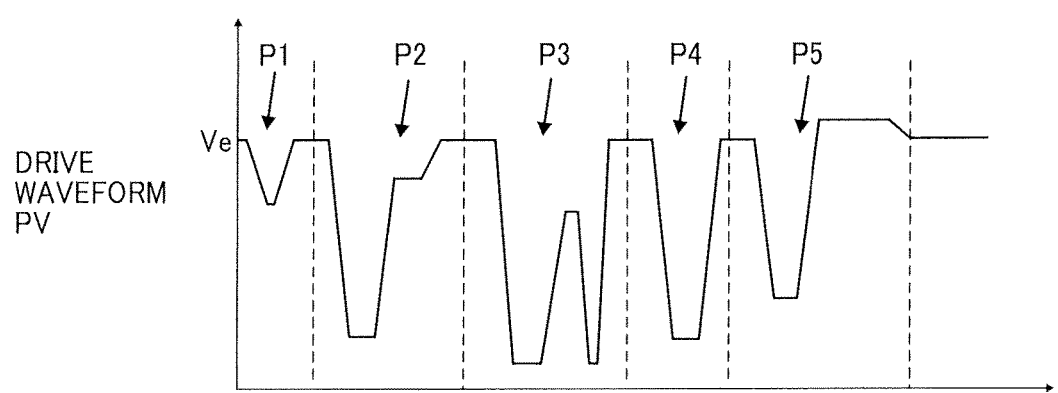
FIG. 16 is a diagram illustrating an example of the drive waveform applied to a piezoelectric member in the inkjet printing device according to an embodiment of the present disclosure.

FIG. 16 is a diagram illustrating an example of the drive waveform to be applied to a piezoelectric member in the inkjet printing device of the present disclosure.

Pulse means a drive pulse as an element constituting a drive waveform.

Discharging pulse means a drive pulse applied to a pressure generating device to discharge a liquid droplet. Non-discharging pulse is a drive pulse applied to a pressure generating device to drive the pressure generating device to a degree that no droplet is discharged (flow the ink in the nozzle). The drive waveform and the pulse as an element to constitute the drive waveform described below are just examples but not limiting.

The drive waveforms (common drive waveforms) Pv illustrated in FIG. 16 are a pulse P1 forming a fine drive pulse and pulses P2 to P5 forming discharging pulses generated in a single print cycle (a single drive cycle) in chronological order.

Figure 17:
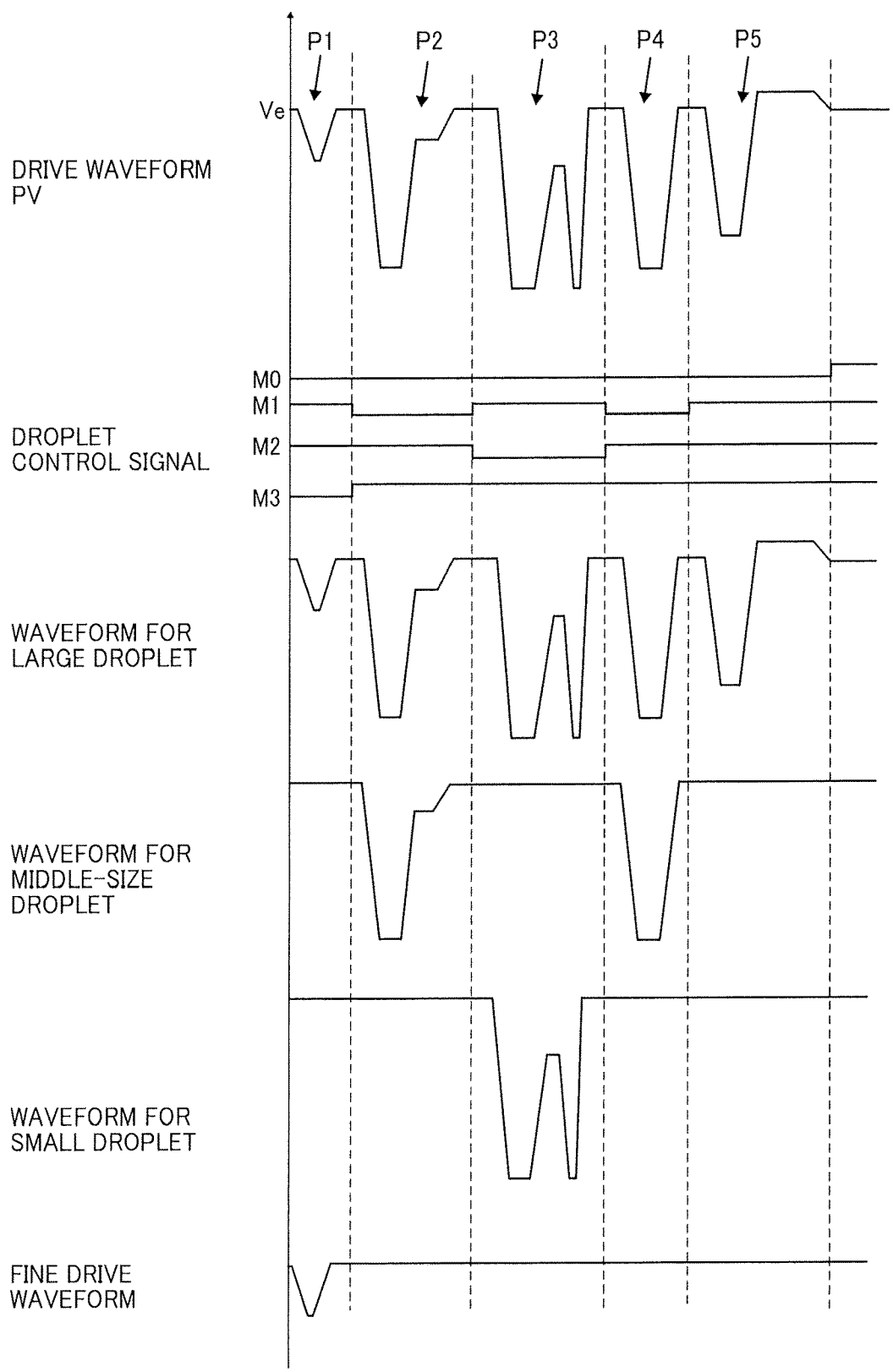
FIG. 17 is a diagram illustrating an example of each drive waveform for droplet applied to a piezoelectric member in the inkjet printing device according to an embodiment of the present disclosure.

As a result of the selection of these pulses P1 to P5 by the liquid droplet control signals M3 to M0 illustrated in FIG. 17, a waveform applied to the pressure generating device is obtained as the drive waveform for discharging a large droplet, the drive waveform for discharging a middle-sized droplet, the drive waveform for driving a small droplet, and the fine drive waveform due to the selection of at least one pulse in accordance with the droplet size.

That is, for the selection of the pulses P1 to P5, the drive waveform for discharging a large droplet forming a large droplet as a result of the unification of each droplet discharged by the pulses P2 to P5 during jetting is obtained. For the selection of the pulses P2 to P4, the drive waveform for discharging a middle-sized droplet forming a middle-sized droplet as a result of the unification of each droplet discharged by the pulses P2 to P4 during jetting is obtained. For the selection of the pulse P3, the drive waveform for small droplet forming a small droplet discharged by the pulse P3 is obtained. For the selection of the pulse P1, the fine drive waveform for fine drive is obtained.

Ink Supply Operation

Figure 18A:
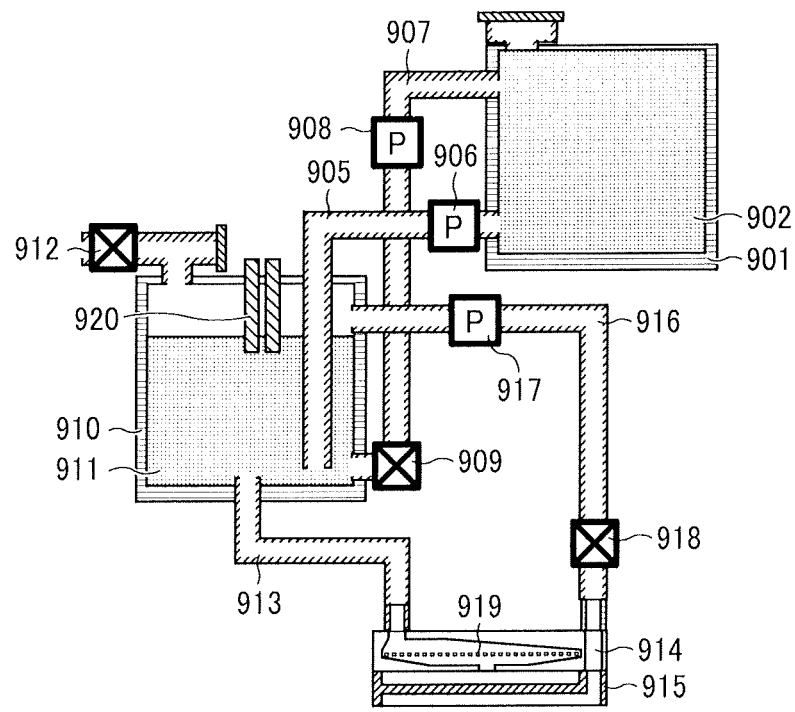
FIG. 18A is a diagram illustrating an example of the ink discharging head and the ink supply unit in the inkjet printing device according to an embodiment of the present disclosure.
Figure 18B:
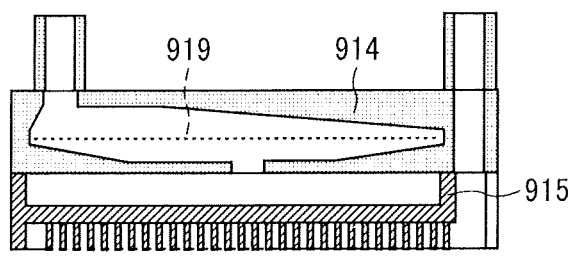
FIG. 18B is an enlarged diagram of the inkjet printing device illustrated in FIG. 18A.

The ink supply unit in the inkjet printing device of the present disclosure is described with reference to FIGS. 18A and 18B. FIG. 18A is a diagram illustrating an example of the ink discharging head and the in supply unit in the inkjet printing device of the present disclosure and FIG. 18B is a diagram illustrating an enlarged view of the ink discharging head illustrated in FIG. 18A.

The inkjet printing device supplies an ink 902 to the inkjet printing device to an ink cartridge 901 accommodating the ink 902. The ink 902 in the ink cartridge 901 is supplied to an ink tank 910 via an ink supply tube 905 by operating a liquid feeding pump 906. An air releasing valve 912 to release air in the ink tank 910 is positioned higher than the liquid surface of the ink tank 910.

In this configuration, an ink 911 is fed from the ink tank 910 to a filter unit 914 via a head supply tube 913. A filter 919 is provided to the filter unit 914 to trap coarse components in the ink 911 to prevent them from flowing into a head 915. The ink 911 supplied is supplied to the head 915 through the filter unit 914. The ink 911 not used for printing is ejected to a head circulation tube 916 via a path having no filter of the filter unit 914. The head circulation tube 916 includes a circulation valve 918 and a head circulation pump 917, by which the ink in the head 915 circulates to the ink tank 910.

The ink is supplied at the initial stage as follows:

First, while a circulation valve 909 is closed and the air release valve 912 is open, the liquid feeding pump 906 is driven to feed the ink 902 from the ink cartridge 901 to the ink tank 910. This supply operation continues until a fill-up detection sensor 920 detects full.

When the fill-up detection sensor 920 detects full, the liquid feeding pump 906 stops to close the air releasing valve 912.

Thereafter, the circulation valve 918 opens to drive the head circulation pump 917, so that the head 915 is filled with the ink from the filter unit 914 to allow the head circulation tube 916 filled with the ink.

In addition, if the fine drive is set to start when the head circulation pump 917 drives, wetting of the ink flowing into the individual liquid chambers is accelerated. This moves air bubbles adhering to the wall surface of the individual liquid chambers. This movement of the ink in circulation accelerates wetting and removal of the air bubbles, thereby improving ink filling property of the ink discharging head.

Thereafter, the amount of ink sufficient to generate a negative pressure is suctioned from the nozzle surface of the head 915 to wipe off the nozzle surface, which makes the printing environment suitable.

While the device is in operation, the circulation valve 918 is opened to drive the head circulation pump 917 to circulate the ink. During ink discharging, it is possible to avoid the separation state such as settling-down of the aluminum particle in the ink in the head and the filter unit. In addition, for drying of the nozzle, flowing of the ink in the individual liquid chambers in the head prevents local drying, so that occurrence of non-discharging nozzles can be prevented.

To clean the ink flow path, cleaning liquid is set in place of the ink in the ink cartridge 901. The ink flow path is easily diluted by the circulation described above. This also enables ink replacement.

At the time of ink discharging after suspension, due to hydrogen gas produced from the ink in the head common liquid chamber 110 and the individual liquid chamber 105, air bubbles are produced in the individual liquid chamber 105, which inhibits transmission of the discharging pressure due to dumper effect. Accordingly, before discharging the ink by switching from the suspension to discharging, it is suitable to open the circulation valve 918 to drive the head circulation pump 917, which circulates the ink to remove the air bubble in the head common liquid chamber 110 and the individual liquid chamber 105. This prevents defective discharging. When circulating the ink, in addition to the drive of the head circulation pump 917, it is suitable to apply vibration to the air bubbles attached to the wall surface of the liquid chamber in the individual liquid chamber 105 by the fine drive of the head that applies a pressure to the ink with a strength not to discharged the ink. This prompts ejection of the air bubbles due to the movement of the circulation of the ink.

However, the aluminum particles in the ink settle down during suspension for a long period of time. Therefore, before discharging the ink, it is suitable to open the circulation valve 918 to drive the head circulation pump 917, thereby ejecting the air bubble in the head common liquid chamber 110 and the individual liquid chamber 105. This prevents defective discharging. Moreover, unlike the case of the air bubble, it is necessary to speed up the circulation speed of the ink to re-disperse the settled-down aluminum particle. Furthermore, in addition to the drive of the head circulation pump 917, it is suitable to apply vibration to the settled-down aluminum particle attached to the base surface of the liquid chamber in the individual liquid chamber 105 to accelerate re-dispersion of the aluminum particle in accordance with the circulation movement of the ink.

Production of hydrogen gas depends on the amount of aluminum in the ink and the surface state. Therefore, the amount of hydrogen gas tends to increase as the chemical reaction proceeds over time. In addition, the settling down of the aluminum particle depends on the time as indicated in Stokes' law. As the time elapses, the amount of settling down increases. Therefore, as the suspension time increases, the circulation time and the fine drive time of the ink before discharging the ink are required to be long.

In addition, similarly, the amount of the hydrogen gas and the settling down amount of the aluminum particle increases depending on the temperature. Therefore, when the environment temperature during the suspension period is high, it is preferable to increase the circulation period of the ink and the fine drive period before the ink discharging in accordance with the environment temperature.

Aluminum particles contained in the ink in the cartridge settle down when the cartridge is left undone for a long period of time. This settling down decreases the amount of the aluminum particle of the ink supplied from the cartridge, which degrades the coloring power. In addition, if the ink tank filled with the ink is left undone for a long period of time, the aluminum particle in the ink settles down so that the concentration of the aluminum particle in the ink supplied to the head becomes non-uniform.

Therefore, it is suitable to use a mechanism to circulate the ink between the ink tank and the ink cartridge. This enables re-dispersion of the aluminum particle settling down in the ink in the ink cartridge or the ink tank and equalizes the concentration of the aluminum particle in the ink.

This circulation device (hereinafter also referred to as circulation mechanism) is described with reference to FIG. 18A. The ink 902 in the ink cartridge 901 is supplied to the ink tank 910 via an ink supply tube 905 as the outward liquid feeding path by operating the liquid feeding pump 906. The ink 911 in the ink cartridge 910 can be returned to the ink cartridge 901 by opening the circulation valve 909 to operate the circulation pump 908 via the circulation tube 907 as the inward liquid feeding path. By making the liquid feeding amount by the liquid feeding pump 906 equal to that by the circulation pump 908, the ink can circulate between the ink tank and the ink cartridge, enabling stirring of the ink in the respective vessels.

In addition, with the circulation mechanism, the operations of filling the ink tank to generating the negative pressure are as follows: First, the circulation valve 909 of the circulation tube 907 is closed and the liquid feeding pump 906 is driven while the air release valve 912 is open to feed the ink 902 from the ink cartridge 901 to the ink tank 910. This supply operation continues until the fill-up detection sensor 920 detects full. When the fill-up detection sensor 920 detects full, the liquid feeding pump 906 stops and the air releasing valve 912 closes. Thereafter, the circulation valve 918 opens to drive the head circulation pump 917, so that the head 915 is filled with the ink from the filter unit 914 to allow the head circulation tube 916 filled with the ink. Thereafter, a minor amount of the ink is suctioned from the nozzle surface of the head 915 to wipe off the nozzle surface. Thus, the printing environment becomes suitable.

The air releasing valve 912 is released again, and the liquid feeding pump 906 is operated for supply until the fill-up detection sensor 920 detects full. After the ink tank 910 is fully filled with the ink, the circulation valve 909 is opened to operate the circulation pump 908 to return a sufficient amount of the ink to generate a negative pressure. After stopping the circulation pump 908, the circulation valve 909 is closed. This operation can reduce the amount of waste ink to be used to generate the negative pressure.

Moreover, for the generation of hydrogen gas in the ink tank, it is suitable to release the air releasing valve at an arbitrary interval to release the gas and generate the negative pressure at the same time. This reduces accumulation of the hydrogen gas in the ink tank so that the negative pressure can be maintained.

As the operation, the following air releasing sequence is executed at an arbitrary interval. First, the air releasing valve 912 is released and the liquid feeding pump 906 is operated for supply until the fill-up detection sensor 920 detects full. After the ink tank 910 is fully filled with the ink, the circulation valve 909 is opened to operate the circulation pump 908 to return a sufficient amount of the ink to generate a negative pressure to the ink cartridge 901. After suspending the circulation pump 908, the circulation valve 909 is closed to complete the sequence.

This operation makes it possible to remove unwanted hydrogen gas in the ink tank and replenish the ink reduced by this removal as well. In addition, this circulation mechanism generates a negative pressure without wasting ink.

The substrate to which the ink is applied is not limited to articles used as a typical recording medium. It is suitable to use building materials such as wall paper and floor material, cloth for apparel, textile, and leather. In addition, the configuration of the paths through which the substrate is conveyed can be arranged to use ceramics, glass, metal, etc. The following can be used as the recording medium.

Recording Medium

The recording medium for use in recording is not particularly limited. Specific examples include, but are not limited to, plain paper, gloss paper, special paper, cloth, film, transparent sheets, printing paper for general purpose.

Printed Matter

It is possible to obtain printed matter by applying a print layer to a substrate such as print medium using the inkjet printing device and the inkjet printing method of the present disclosure.

Image forming, recording, printing, print, etc. in the present disclosure represent the same meaning.

Having generally described preferred embodiments of this disclosure, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, embodiments of the present disclosure are described in detail with reference to Examples but not limited thereto.

Preparation Example 1 of Resin Particle

Preparation of Polycarbonate Urethane Resin Emulsion A 1,500 g of polycarbonate diol (reaction product of 1,6-hexane diol and dimethyl carbonate), 220 g of 2,2-dimethylol propionic acid (DMPA), and 1,347 g of dipropylene glycol dimethyl ether (boiling point: 171 degrees C.) were loaded in a reaction container equipped with a stirrer, a reflux cooling tube, and a thermometer in a nitrogen atmosphere followed by heating to 60 degrees C. to dissolve DMPA.

Thereafter, 1,445 g of 4,4'dicyclohexyl methane diisocyanate and 2.6 g of dibutyl tin laurylate (catalyst) were added thereto followed by heating to 90 degrees C. to complete urethanification reaction in five hours. As a resultant, a urethane prepolymer having an isocyanate group at its end was obtained.

This reaction mixture was cooled down to 80 degrees C. and 149 g of triethyl amine was admixed therewith. 4,340 g of the resultant mixture was extracted and loaded in a liquid mixture of 5,400 g of water and 15 g of triethyl amine during vigorous stirring.

Thereafter, 1,500 g of ice and 626 g of 35 percent by mass 2-methyl-1,5-pentane diamine aqueous solution were added to conduct chain elongation reaction followed by distillation away of the solvent in such a manner that the concentration of the solid portion was 30 percent by mass to obtain polycarbonate urethane resin emulsion (urethane resin component: 30 percent by mass, water: 64 percent by mass, dipropylene glycol dimethyl ether: 6 percent by mass).

Thereafter, 10,000 g of the thus-obtained polycarbonate urethane resin emulsion was extracted and 2,000 g of water was added during stirring to obtain a polycarbonate-modified urethane resin emulsion A (urethane resin component: 25 percent by mass, water: 70 percent by mass, and dipropylene glycol dimethylether: 5 percent by mass).

The thus-obtained polycarbonate urethane resin emulsion A was applied to a glass slide to form a layer having a thickness of 10 μm. Thereafter, the resin emulsion was dried at 100 degrees C. for 30 minutes to form a resin film. Martens hardness of the film was measured by a micro surface hardness tester (FISCHERSCOPE HM2000, manufactured by Fischer Instruments K.K. Japan). It was 120 N/mm$^2$ when a Vickers indenter was pressed in under a load of 9.8 mN.

Preparation Example 1 of Pigmented Liquid Dispersion

Preparation of Pigmented Liquid Dispersion 1

After preliminarily mixing the following recipe, the mixture was subjected to circulation dispersion for seven hours with a disk type bead mill (KDL type, media: zirconia ball having a diameter of 0.3 mm, manufactured by SHINMARU ENTERPRISES CORPORATION) to obtain a pigmented liquid dispersion 1 (concentration of pigment solid portion: 15 percent by mass).

| | |
|---|---|
| C.I. Pigment Blue 15:3 (CHROMOFINE Blue A-220JC, manufactured by Dainichiseika Color & Chemicals Mfg. Co., Ltd.): | 15 percent by mass |
| Anionic surfactant (Pionine A-51-B, manufactured by TAKEMOTO OIL & FAT CO., LTD.): | 2 parts by mass |
| Deionized water: | 83 parts by mass |

Preparation Examples 2 to 4 of Pigmented Liquid Dispersion

Preparation of Pigmented Liquid Dispersions 2 to 4

Pigmented liquid dispersions 2 to 4 having a concentration of pigment solid portion of 15 percent by mass was obtained in the same manner as in Preparation Example 1 of Pigmented Liquid Dispersion except that C.I. Pigment Blue 15:3 was changed to the pigments shown in Table 1.

Preparation Example 5 of Pigmented Liquid Dispersion

Preparation of Pigmented Liquid Dispersion 5

Pigmented liquid dispersion 5 having a concentration of pigment solid portion of 15 percent by mass was obtained in the same manner as in Preparation Example 1 of Pigmented Liquid Dispersion except that the mixture was subjected to circulation dispersion for seven hours with a disk type bead mill (KDL type, media: zirconia ball having a diameter of 0.3 mm, manufactured by SHINMARU ENTERPRISES CORPORATION) and thereafter, another circulation dispersion for three hours with a disk type bead mill (KDL type, media: zirconia ball having a diameter of 0.1 mm, manufactured by SHINMARU ENTERPRISES CORPORATION).

Preparation Example 6 of Pigmented Liquid Dispersion

Preparation of Pigmented Liquid Dispersion 6

Pigmented liquid dispersion 6 having a concentration of pigment solid portion of 15 percent by mass was obtained in the same manner as in Preparation Example 1 of Pigmented Liquid Dispersion except that the mixture was subjected to circulation dispersion for five hours with a disk type bead mill (KDL type, media: zirconia ball having a diameter of 1.0 mm, manufactured by SHINMARU ENTERPRISES CORPORATION).

| | | Pigment | Volume average particle diameter (nm) |
|---|---|---|---|
| Pigment liquid dispersion | 1 | C.I. Pigment Blue 15: 3 (CHROMOHNE BLUE A-220JC, manufactured by Dainichiseika Color & Chemicals Mfg. Co., Ltd.) | 60 |
| | 2 | Carbon black (FW100, manufactured by Evonik Industries AG) | 100 |
| | 3 | Titanium dioxide (GTR-100, manufactured by SAKAI CHEMICAL INDUSTRY CO., LTD.) | 380 |
| | 4 | Hollow resin emulsion (SX-866(B), manufactured by JSR Corporation) | 300 |
| | 5 | C.I. Pigment Blue 15: 3 (CHROMOFINE BLUE A-220JC, manufactured by Dainichiseika Color & Chemicals Mfg. Co., Ltd.) | 40 |
| | 6 | C.I. Pigment Blue 15: 3 (CHROMOFINE BLUE A-220JC, manufactured by Dainichiseika Color & Chemicals Mfg. Co., Ltd.) | 450 |

Preparation Example 1 of Color Ink

Preparation of Color Ink 1

After mixing and stirring the following recipe, the mixture was filtered by a polypropylene filter having an average opening diameter of 0.2 µm to manufacture a color ink 1.

Recipe

| | |
|---|---|
| Pigmented liquid dispersion 1: | 20.0 parts |
| Polycarbonate urethane resin emulsion A: | 20.0 parts |
| Silicone-based surfactant (KF-351A, manufactured by Shin-Etsu Chemical Co., Ltd.): | 1.0 part |
| 2,4,7,9-tetramethyldecane-4,7-diol (manufactured by Tokyo Chemical Industry Co. Ltd.): | 0.5 parts |
| 1,2-propane diol (boiling point of 188 degrees C., manufactured by Tokyo Chemical Industry Co. Ltd.): | 20.0 parts |
| 3-ethyl-3-hydroxymethyl oxetane (boiling point of 240 degrees C., manufactured by Tokyo Chemical Industry Co. Ltd.): | 15.0 parts |
| Preservatives and fungicides (PROXEL LV, manufactured by AVECIA GROUP): | 0.1 parts |
| Deionized water: | 23.4 parts |

Preparation Example 2 of Color Ink

Preparation of Color Ink 2

After mixing and stirring the following recipe, the mixture was filtered by a polypropylene filter having an average opening diameter of 0.2 µm to manufacture a color ink 2.

Recipe

| | |
|---|---|
| Pigmented liquid dispersion 1: | 6.0 parts |
| Polycarbonate urethane resin emulsion A: | 20.0 parts |
| Silicone-based surfactant (KF-351A, manufactured by Shin-Etsu Chemical Co., Ltd.): | 1.0 part |
| 2,4,7,9-tetramethyldecane-4,7-diol (manufactured by Tokyo Chemical Industry Co. Ltd.): | 0.5 parts |
| 1,2-propane diol (boiling point of 188 degrees C., manufactured by Tokyo Chemical Industry Co. Ltd.): | 27.0 parts |
| 3-ethyl-3-hydroxymethyl oxetane (boiling point of 240 degrees C., manufactured by Tokyo Chemical Industry Co. Ltd.): | 15.0 parts |

-continued

| | |
|---|---|
| Preservatives and fungicides (PROXEL LV, manufactured by AVECIA GROUP): | 0.1 parts |
| Deionized water | 30.4 parts |

Preparation Examples 3 to 5 of Color Ink

Preparation of Color Inks 3 to 5

Color inks 3 to 5 were obtained in the same manner as in Preparation Example 1 of Color Ink except that the pigmented liquid dispersion 1 was changed to the pigmented liquid dispersions shown in Table 2.

TABLE 2

| | | Pigment liquid dispersion No. |
|---|---|---|
| Color Ink | 1 | 1 |
| | 2 | 1 |
| | 3 | 2 |
| | 4 | 3 |
| | 5 | 4 |

Preparation Example 6 of Color Ink

Preparation of Color Ink 6

After mixing and stirring the following recipe, the mixture was filtered by a polypropylene filter having an average opening diameter of 0.2 μm to manufacture a color ink 6.
Recipe

| | |
|---|---|
| Pigmented liquid dispersion 1: | 20 parts |
| Silicone-based surfactant (KF-351A, manufactured by Shin-Etsu Chemical Co., Ltd.): | 1.0 part |
| 2,4,7,9-tetramethyldecane-4,7-diol (manufactured by Tokyo Chemical Industry Co. Ltd.): | 0.5 parts |
| 1,2-propane diol (boiling point of 188 degrees C., manufactured by Tokyo Chemical Industry Co. Ltd.): | 25.0 parts |
| 3-ethyl-3-hydroxymethyl oxetane (boiling point of 240 degrees C., manufactured by Tokyo Chemical Industry Co. Ltd.): | 15.0 parts |
| Preservatives and fungicides (PROXEL LV, manufactured by AVECIA GROUP): | 0.1 parts |
| Deionized water | 38.4 parts |

Preparation Example 7 of Color Ink

Preparation of Color Ink 7

After mixing and stirring the following recipe, the mixture was filtered by a polypropylene filter having an average opening diameter of 0.2 μm to manufacture a color ink 7.
Recipe

| | |
|---|---|
| Pigmented liquid dispersion 1: | 6.0 parts |
| Silicone-based surfactant (KF-351A, manufactured by Shin-Etsu Chemical Co., Ltd.): | 1.0 part |
| 2,4,7,9-tetramethyldecane-4,7-diol (manufactured by Tokyo Chemical Industry Co. Ltd.): | 0.5 parts |
| 1,2-propane diol (boiling point of 188 degrees C., manufactured by Tokyo Chemical Industry Co. Ltd.): | 32.0 parts |
| 3-ethyl-3-hydroxymethyl oxetane (boiling point of 240 degrees C., manufactured by Tokyo Chemical Industry Co. Ltd.): | 15.0 parts |

-continued

| | |
|---|---|
| Preservatives and fungicides (PROXEL LV, manufactured by AVECIA GROUP): | 0.1 parts |
| Deionized water | 45.4 parts |

Preparation Examples 8 to 10 of Color Ink

Preparation of Color Inks 8 to 10

Color inks 8 to 10 were obtained in the same manner as in Preparation Example 1 of Color Ink except that the pigmented liquid dispersion 1 was changed to the pigmented liquid dispersions shown in Table 3.

Preparation Example 11 of Color Ink

Preparation of Color Ink 11

After mixing and stirring the following recipe, the mixture was filtered by a polypropylene filter having an average opening diameter of 5.0 μm to manufacture a color ink 11.
Recipe

| | |
|---|---|
| Pigmented liquid dispersion 5: | 20.0 parts |
| Polycarbonate urethane resin emulsion A: | 20.0 parts |
| Silicone-based surfactant (KF-351A, manufactured by Shin-Etsu Chemical Co., Ltd.): | 1.0 part |
| 2,4,7,9-tetramethyldecane-4,7-diol (manufactured by Tokyo Chemical Industry Co. Ltd.): | 0.5 parts |
| 1,2-propane diol (boiling point of 188 degrees C., manufactured by Tokyo Chemical Industry Co. Ltd.): | 20.0 parts |
| 3-ethyl-3-hydroxymethyl oxetane (boiling point of 240 degrees C., manufactured by Tokyo Chemical Industry Co. Ltd.): | 15.0 parts |
| Preservatives and fungicides (PROXEL LV, manufactured by AVECIA GROUP): | 0.1 parts |
| Deionized water: | 23.4 parts |

Preparation Example 12 of Ink

Preparation of Color Ink 12

After mixing and stirring the following recipe, the mixture was filtered by a polypropylene filter having an average opening diameter of 5.0 μm to manufacture a color ink 12.
Recipe

| | |
|---|---|
| Pigmented liquid dispersion 6: | 20.0 parts |
| Polycarbonate urethane resin emulsion A: | 20.0 parts |
| Silicone-based surfactant (KF-351A, manufactured by Shin-Etsu Chemical Co., Ltd.): | 1.0 part |
| 2,4,7,9-tetramethyldecane-4,7-diol (manufactured by Tokyo Chemical Industry Co. Ltd.): | 0.5 parts |
| 1,2-propane diol (boiling point of 188 degrees C., manufactured by Tokyo Chemical Industry Co. Ltd.): | 20.0 parts |
| 3-ethyl-3-hydroxymethyl oxetane (boiling point of 240 degrees C., manufactured by Tokyo Chemical Industry Co. Ltd.): | 15.0 parts |
| Preservatives and fungicides (PROXEL LV, manufactured by AVECIA GROUP): | 0.1 parts |
| Deionized water: | 23.4 parts |

TABLE 3

| | | Pigment liquid dispersion No. |
|---|---|---|
| Color Ink | 6 | 1 |
| | 7 | 1 |
| | 8 | 2 |
| | 9 | 3 |

TABLE 3-continued

| | Pigment liquid dispersion No. |
|---|---|
| 10 | 4 |
| 11 | 5 |
| 12 | 6 |

Preparation Example 1 of Liquid Dispersion of Silver Particle

Preparation of Liquid Dispersion 1 of Silver Particle 66.8 g of silver nitrate, 7.2 g of a dispersant polymer having a carboxyl group (DISPERBYK 190, solvent: water, non-volatile component: 40 percent by mass, acid value: 10 mgKOH/g, amine value: 0 mgKOH/g, manufactured by Byc Chemie Japan Co., Ltd.), 1.8 g of cholic acid (manufactured by Wako Pure Chemical Industries, Ltd.), and 100 g of deionized water were mixed and stirred to obtain a suspension.

To the suspension, 100 g of dimethylaminoethanol (manufactured by Wako Pure Chemical Industries, Ltd.) was gradually added such that the water temperature did not surpass 50 degrees C. followed by heating and stirring for two hours in a water bath at a water temperature of 60 degrees C. The thus-obtained reaction liquid was filtrated by a glass filter (GC-90, average diameter: 0.8 μm, manufactured by ADVANTEC CO., LTD.) to obtain a liquid dispersion containing silver in an amount of 15 percent by mass and water in an amount of 37.8 percent by mass. The particle size distribution of the thus-obtained liquid dispersion 1 of silver particle was measured by a particle size analyzer (Nanotrac Wave-EX150, manufactured by NIKKISO CO., LTD.). 50 percent cumulative volume particle diameter ($D_{50}$) and 90 percent cumulative volume particle diameter ($D_{90}$) thereof were 5 nm and 30 nm, respectively.

Preparation Examples 2 to 3 of Liquid Dispersion of Silver Particle

Preparation of Liquid Dispersions 2 to 3 of Silver Particle

Liquid dispersions 2 to 3 of silver particle containing silver in an amount of 15 percent by mass were obtained in the same manner as in Preparation Example 1 of liquid Dispersion of Silver Particle except that the rate of adding dimethylaminoethanol and the water temperature were controlled in such a manner that 50 percent cumulative volume particle diameter ($D_{50}$) and 90 percent cumulative volume particle diameter ($D_{90}$) were as shown in Table 4.

Preparation Example 4 of Liquid Dispersion of Silver Particle

Preparation of Liquid Dispersion 4 of Silver Particle 340 g of silver nitrate (manufactured by Kanto Chemical Co., Inc.) was added to 700 g of pure water in a reaction vessel to completely dissolve silver nitrate to prepare an aqueous solution thereof. 700 g of ammonium water (special grade, manufactured by Kanto Chemical Co., Inc.) adjusted in such a manner that the ammonium concentration was 25 percent by mass was added to the aqueous solution followed by stirring to prepare an aqueous solution of ammine silver complex, and the temperature was controlled to be 23 degrees C.

111 g of hydroquinone (manufactured by Kanto Chemical Co., Inc.) and 50 g of anhydrous potassium sulfite (manufactured by Kanto Chemical Co., Inc.) were dissolved in 1,260 g of pure water in another vessel to prepare a reducing agent aqueous solution. After controlling the water temperature to be 23 degrees C., the aqueous solution of ammine silver complex was added to this reducing agent aqueous solution at once, followed by stirring for 10 minutes to complete reduction precipitation of the silver particle.

Thereafter, the silver particle was filtrated by Buchner funnel and retrieved. Subsequent to rinsing with 1 L of water, the resultant was dried to obtain silver particles.

15 parts of the thus-obtained silver particle, 3 parts by mass of RHEODOL TW-0120V (manufactured by Kao Corporation), and 82 parts by mass of pure water were loaded in a beaker and sufficiently stirred by a stirrer. Thereafter, while rinsing with water, the mixture was subjected to dispersion processing for one hour by an ultrasonic homogenizer (US-300T, chip diameter of 26 mm, manufactured by NISSEI Corporation) at 200 μA to obtain a liquid dispersion 4 of silver particle containing silver in an amount of 15 percent by mass.

The particle size distribution of the thus-obtained liquid dispersion 4 of silver particle was measured by a particle size analyzer (Nanotrac Wave-EX150, manufactured by NIKKISO CO., LTD.). 50 percent cumulative volume particle diameter ($D_{50}$) and 90 percent cumulative volume particle diameter ($D_{90}$) thereof were 1,540 nm and 3,020 nm, respectively.

Preparation Example 5 of Liquid Dispersion of Silver Particle

Preparation of Liquid Dispersion 5 of Silver Particle

Polyethylene terephthalate (PET) film (E-5100, average thickness of 100 μm, manufactured by TOYOBO CO., LTD.) was subjected to corona treatment. A liquid application was applied to the surface of the film by a bar coater. The liquid application was obtained by mixing and dissolving 5 percent by mass polyvinyl pyrrolidone K15 (manufactured by Kanto Chemical Co., Inc.), 0.1 percent by mass fluorochemical surfactant (Capstone FS-3100, manufactured by E. I. du Pont de Nemours and Company), 10 percent by mass diethylene glycol-n-butylether (manufactured by Kanto Chemical Co., Inc.), and 84.9 percent by mass deionized water. Subsequent to drying at 70 degrees C. for 15 minutes, a PET film having a peeling-off resin layer thereon was manufactured.

Using a vacuum deposition device, a silver deposition layer having an average thickness of 100 nm was formed on the PET film to manufacture a thin layer film PET film.

The thus-obtained thin layer film PET film was dipped in highly pure water and subjected to peeling-off treatment by an ultrasonic wave cleaner (VS-150, manufactured by AS ONE Corporation). The silver thin layer film was peeled off from the PET film together with the peeling-off resin layer by a two-hour treatment. Thereafter, the PET film was removed, and the silver thin layer film was separated as precipitation component by a centrifuge at 1,000 G for one hour. Supernatent was discarded and pure water was added for re-dispersion. The operation to precipitate and separate by centrifugal was repeated three times to clean the silver thin layer film.

Obtaining the solid portion of the precipitated component by heat mass measuring of heat analysis, 10 parts of RHEODOL TW-00120V (manufactured by Kao Corporation) was added to 100 parts of the solid portion of silver, and pure water was added in such a manner that the solid portion of silver was 15 percent by mass. While cooling down with water, the resultant was subjected to dispersion processing for one hour by an ultrasonic homogenizer (US-300T, chip diameter of 26 mm, manufactured by NISSEI Corporation) at 200 µA.

The thus-obtained liquid dispersion of silver thin layer film was subjected to filtration under pressure using SUS mesh filter (LCF-241, manufactured by NIHON PALL LTD.) having an average opening diameter of 18 µm followed by filtration under pressure by a cellulose acetate membraned filter having an average opening diameter of 5 µm to remove coarse particles, thereby obtaining a liquid dispersion 5 of silver particle containing silver in amount of 15 percent by mass.

The particle size distribution of the thus-obtained liquid dispersion 5 of silver particle was measured by a particle size analyzer (Nanotrac Wave-EX150, manufactured by NIKKISO CO., LTD.). 50 percent cumulative volume particle diameter ($D_{50}$) and 90 percent cumulative volume particle diameter ($D_{90}$) thereof were 1,610 nm and 1,990 nm, respectively.

Preparation Example 6 of Liquid Dispersion of Silver Particle

Preparation of Liquid Dispersion 6 of Silver Particle 15 parts of the silver particle (AGC-2011, manufactured by FUKUDA METAL FOIL & POWDER Co., LTD.), 2 parts by mass of anionic surfactant (Pionine A-51-B, manufactured by TAKEMOTO OIL & FAT CO., LTD.), and 83 parts by mass of deionized water were premixed. Thereafter, while cooling down with water, the mixture was subjected to dispersion processing for one hour by an ultrasonic homogenizer (US-300T, chip diameter of 26 mm, manufactured by NISSEI Corporation) at 200 µA to obtain a liquid dispersion 6 of silver particle containing silver in an amount of 15 percent by mass. The particle size distribution of the thus-obtained liquid dispersion 6 of silver particle was measured by a particle size analyzer (Nanotrac Wave-EX150, manufactured by NIKKISO CO., LTD.). 50 percent cumulative volume particle diameter ($D_{50}$) and 90 percent cumulative volume particle diameter ($D_{90}$) thereof were 2,053 nm and 4,950 nm, respectively.

Preparation Example 7 of Liquid Dispersion of Silver Particle

Preparation of Liquid Dispersion 7 of Silver Particle 15 parts of the silver particle (AGC-156I, manufactured by FUKUDA METAL FOIL & POWDER Co., LTD.), 2 parts by mass of anionic surfactant (Pionine A-51-B, manufactured by TAKEMOTO OIL & FAT CO., LTD.), and 83 parts by mass of deionized water were premixed. Thereafter, while cooling down with water, the mixture was subjected to dispersion processing for one hour by an ultrasonic homogenizer (US-300T, chip diameter of 26 mm, manufactured by NISSEI Corporation) at 200 µA to obtain a liquid dispersion 7 of silver particle containing silver in an amount of 15 percent by mass. The particle size distribution of the thus-obtained liquid dispersion 7 of silver particle was measured by a particle size analyzer (Nanotrac Wave-EX150, manufactured by NIKKISO CO., LTD.). 50 percent cumulative volume particle diameter ($D_{50}$) and 90 percent cumulative volume particle diameter ($D_{90}$) thereof were 2,901 nm and 8,560 nm, respectively.

Preparation Example 8 of Liquid Dispersion of Silver Particle

Preparation of Liquid Dispersion 8 of Silver Particle

The thus-obtained liquid dispersion 1 of silver particle in the Preparation Example 1 of Liquid Dispersion of Silver Particle was condensed by a rotary evaporator, followed by filtration by a glass filter (GC-90, average opening diameter: 0.8 µm, manufactured by ADVANTEC CO., LTD.) to obtain a liquid dispersion 8 of silver particle containing silver in an amount of 25 percent by mass. The particle size distribution of the thus-obtained liquid dispersion 8 of silver particle was measured by a particle size analyzer (Nanotrac Wave-EX150, manufactured by NIKKTSO CO., LTD.). 50 percent cumulative volume particle diameter ($D_{50}$) and 90 percent cumulative volume particle diameter ($D_{90}$) thereof were 5 nm and 30 nm, respectively.

TABLE 4

| | | 50 percent cumulative volume particle diameter ($D_{50}$) (nm) | 90 percent cumulative volume particle diameter ($D_{90}$) (nm) | Amount of silver particle (percent by mass) |
|---|---|---|---|---|
| Liquid dispersion of silver particle | 1 | 5 | 30 | 15 |
| | 2 | 50 | 220 | 15 |
| | 3 | 100 | 350 | 15 |
| | 4 | 1,540 | 3,020 | 15 |
| | 5 | 1,610 | 1,990 | 15 |
| | 6 | 2,053 | 4,950 | 15 |
| | 7 | 2,901 | 8,560 | 15 |
| | 8 | 5 | 30 | 20 |

Preparation Example 1 of Silver Ink

Preparation of Silver Ink 1

After mixing and stirring the following recipe, the mixture was filtrated by a filter (LCF-24110, SUS304L "Ridimesh", filtration accuracy: 18 µm, manufactured by NIHON PALL LTD.) to obtain a silver ink 1.

Recipe

| | |
|---|---|
| Liquid dispersion 1 of silver particle: | 33.4 parts |
| 2,4,7,9-tetramethyldecane-4,7-diol (manufactured by Tokyo Chemical Industry Co. Ltd.): | 0.5 parts |
| 1,2-propane diol (boiling point of 188 degrees C., manufactured by Tokyo Chemical Industry Co. Ltd.): | 10.2 parts |
| 3-ethyl-3-hydroxymethyl oxetane (boiling point of 240 degrees C., manufactured by Tokyo Chemical Industry Co. Ltd.): | 15.0 parts |
| Preservatives and fungicides (PROXEL LV, manufactured by AVECIA GROUP): | 0.1 parts |
| Deionized water: | 39.8 parts |
| Silicone-based surfactant (KF-351A, manufactured by Shin-Etsu Chemical Co., Ltd.): | 1.0 part |

Preparation Examples 2 to 7 of Silver Ink

Preparation of Silver Ink 2 to 7

Silver Inks 2 to 7 were obtained in the same manner as in Preparation Example 1 of Silver Ink except that the liquid dispersion 1 of silver particle was changed to those shown in Table 5.

TABLE 5

|  | Liquid dispersion of silver particle No. | Amount of silver particle (percent by mass) | Amount of resin particle (percent by mass) |
|---|---|---|---|
| Silver ink | 1 | 1 | 5.0 | — |
|  | 2 | 2 | 5.0 | — |
|  | 3 | 3 | 5.0 | — |
|  | 4 | 4 | 5.0 | — |
|  | 5 | 5 | 5.0 | — |
|  | 6 | 6 | 5.0 | — |
|  | 7 | 7 | 5.0 | — |

Preparation Examples 2 to 8 of Silver Ink

Preparation of Silver Ink 8

After mixing and stirring the following recipe, the mixture was filtrated by a filter (LCF-24110, SUS304L "Ridimesh", filtration accuracy: 18 μm, manufactured by NIHON PALL LTD.) to obtain a silver ink 8.

Recipe

| | |
|---|---|
| Liquid dispersion 1 of silver particle: | 33.4 parts |
| Polycarbonate urethane resin emulsion A: | 20.0 parts |
| Silicone-based surfactant (KF-351A, manufactured by Shin-Etsu Chemical Co., Ltd.): | 1.0 part |
| 2,4,7,9-tetramethyldecane-4,7-diol (manufactured by Tokyo Chemical Industry Co. Ltd.): | 0.5 parts |
| 1,2-propane diol (boiling point of 188 degrees C., manufactured by Tokyo Chemical Industry Co. Ltd.): | 14.9 parts |
| 3-ethyl-3-hydroxymethyl oxetane (boiling point of 240 degrees C., manufactured by Tokyo Chemical Industry Co. Ltd.): | 15.0 parts |
| Preservatives and fungicides (PROXEL LV, manufactured by AVECIA GROUP): | 0.1 parts |
| Deionized water: | 15.1 parts |

Preparation Examples 9 to 14 of Silver Ink

Silver Inks 9 to 14 were obtained in the same manner as in Preparation Example 8 of Silver Ink except that the liquid dispersion 1 of silver particle was changed to those shown in Table 6.

TABLE 6

|  | Liquid dispersion of silver particle No. | Amount of silver particle (percent by mass) | Amount of resin particle (percent by mass) |
|---|---|---|---|
| Silver ink | 8 | 1 | 5.0 | 5.0 |
|  | 9 | 2 | 5.0 | 5.0 |
|  | 10 | 3 | 5.0 | 5.0 |
|  | 11 | 4 | 5.0 | 5.0 |
|  | 12 | 5 | 5.0 | 5.0 |
|  | 13 | 6 | 5.0 | 5.0 |
|  | 14 | 7 | 5.0 | 5.0 |

Preparation Example 15 of Silver Ink

Preparation of Silver Ink 15

After mixing and stirring the following recipe, the mixture was filtrated by a filter (LCF-24110, SUS304L "Ridimesh", filtration accuracy: 18 manufactured by NIHON PALL LTD.) to obtain a silver ink 15.

Recipe

| | |
|---|---|
| Liquid dispersion 1 of silver particle: | 5.3 parts |
| 2,4,7,9-tetramethyldecane-4,7-diol (manufactured by Tokyo Chemical Industry Co. Ltd.): | 0.5 parts |
| 1,2-propane diol (boiling point of 188 degrees C., manufactured by Tokyo Chemical Industry Co. Ltd.): | 10.2 parts |
| 3-ethyl-3-hydroxymethyl oxetane (boiling point of 240 degrees C., manufactured by Tokyo Chemical Industry Co. Ltd.): | 15.0 parts |
| Preservatives and fungicides (PROXEL LV, manufactured by AVECIA GROUP): | 0.1 parts |
| Deionized water: | 67.9 parts |
| Silicone-based surfactant (KF-351A, manufactured by Shin-Etsu Chemical Co., Ltd.): | 1.0 part |

Preparation Example 16 of Silver Ink

Preparation of Silver Ink 16

After mixing and stirring the following recipe, the mixture was filtrated by a filter (LCF-24110, SUS304L "Ridimesh", filtration accuracy: 18 μm, manufactured by NIHON PALL LTD.) to obtain a silver ink 16.

Recipe

| | |
|---|---|
| Liquid dispersion 1 of silver particle: | 6.7 parts |
| 2,4,7,9-tetramethyldecane-4,7-diol (manufactured by Tokyo Chemical Industry Co. Ltd.): | 0.5 parts |
| 1,2-propane diol (boiling point of 188 degrees C., manufactured by Tokyo Chemical Industry Co. Ltd.): | 10.2 parts |
| 3-ethyl-3-hydroxymethyl oxetane (boiling point of 240 degrees C., manufactured by Tokyo Chemical Industry Co. Ltd.): | 15.0 parts |
| Preservatives and fungicides (PROXEL LV, manufactured by AVECIA GROUP): | 0.1 parts |
| Deionized water: | 66.5 parts |
| Silicone-based surfactant (KF-351A, manufactured by Shin-Etsu Chemical Co., Ltd.): | 1.0 part |

Preparation Example 17 of Silver Ink

Preparation of Silver Ink 17

After mixing and stirring the following recipe, the mixture was filtrated by a filter (LCF-24110, SUS304L "Ridimesh", filtration accuracy: 18 μm, manufactured by NIHON PALL LTD.) to obtain a silver ink 17.

Recipe

| | |
|---|---|
| Liquid dispersion 8 of silver particle: | 60.0 parts |
| 2,4,7,9-tetramethyldecane-4,7-diol (manufactured by Tokyo Chemical Industry Co. Ltd.): | 0.5 parts |
| 1,2-propane diol (boiling point of 188 degrees C., manufactured by Tokyo Chemical Industry Co. Ltd.): | 10.2 parts |
| 3-ethyl-3-hydroxymethyl oxetane (boiling point of 240 degrees C., manufactured by Tokyo Chemical Industry Co. Ltd.): | 15.0 parts |
| Preservatives and fungicides (PROXEL LV, manufactured by AVECIA GROUP): | 0.1 parts |
| Deionized water: | 13.2 parts |
| Silicone-based surfactant (KF-351A, manufactured by Shin-Etsu Chemical Co., Ltd.): | 1.0 part |

Preparation Example 18 of Silver Ink

Preparation of Silver Ink 18

After mixing and stirring the following recipe, the mixture was filtrated by a filter (LCF-24110, SUS304L "Ridimesh", filtration accuracy: 18 μm, manufactured by NIHON PALL LTD.) to obtain a silver ink 18.

Recipe

| | |
|---|---|
| Liquid dispersion 8 of silver particle: | 62.0 parts |
| 2,4,7,9-tetramethyldecane-4,7-diol (manufactured by Tokyo Chemical Industry Co. Ltd.): | 0.5 parts |
| 1,2-propane diol (boiling point of 188 degrees C., manufactured by Tokyo Chemical Industry Co. Ltd.): | 10.2 parts |
| 3-ethyl-3-hydroxymethyl oxetane (boiling point of 240 degrees C., manufactured by Tokyo Chemical Industry Co. Ltd.): | 15.0 parts |
| Preservatives and fungicides (PROXEL LV, manufactured by AVECIA GROUP): | 0.1 parts |
| Deionized water | 11.2 parts |
| Silicone-based surfactant (KF-351A, manufactured by Shin-Etsu Chemical Co., Ltd.): | 1.0 part |

TABLE 7

| | Liquid dispersion of silver particle No. | Amount of silver particle (percent by mass) | Amount of resin particle (percent by mass) |
|---|---|---|---|
| Silver ink | 15 | 1 | 0.8 |
| | 16 | 1 | 1.0 |
| | 17 | 8 | 15.0 |
| | 18 | 8 | 15.5 |

Preparation Example 1 of Liquid Dispersion of Scale-Like Aluminum

Preparation Example of Liquid Dispersion 1 of Scale-Like Aluminum 41.7 parts of distilled water and 0.8 parts of 2-amino-2-methylpropanol were mixed in a stainless container. Thereafter, an acrylic resin emulsion having a hydroxyl group (copolymer of methyl methacrylate in an amount of 33 percent by mass, butyl acrylate in an amount of 27 percent by mass, hydroxyethyl methacrylate in an amount of 20 percent by mass, hydroxybutyl acrylate in an amount of 10 percent by mass, hydroxypropyl acrylate in an amount of 3 percent by mass, and acrylic acid in an amount of 7 percent by mass, average molecular weight of 50,000, concentration of solid portion of 55 percent by mass, manufactured by KANSAI PAINT CO., LTD.) was loaded in the stainless container. The resultant mixture was sufficiently mixed by a high performance disper. Thereafter, 10 parts of triethylene glycol mono-n-butylether and 0.7 parts of Surfynol 104A (nonionic surfactant, manufactured by Air Products Limited.) were loaded therein. Finally, 28.6 parts of Alpaste® 7640 NS (scale-like aluminum paste, concentration of solid portion: 70 percent by mass, average particle diameter of 16 µm, manufactured by Toyo Aluminium K.K.) was loaded therein during stirring to sufficiently mix to equalize the concentration to obtain a liquid dispersion 1 of scale-like aluminum containing scale-like aluminum in an amount of 20 percent by mass. The particle size distribution of the thus-obtained liquid dispersion 1 of scale-like aluminum was measured by a particle size analyzer (Nanotrac Wave-EX150, manufactured by NIKKISO CO., LTD.). 50 percent cumulative volume particle diameter ($D_{50}$) and 90 percent cumulative volume particle diameter ($D_{90}$) thereof were 15,845 nm and 19,676 nm, respectively.

Preparation Example 2 of Liquid Dispersion of Scale-Like Aluminum

Preparation Example of Liquid Dispersion 2 of Scale-Like Aluminum

PET film (Toyoboester® film E5100, average thickness of 100 µm, manufactured by TOYOBO CO., LTD.) was subjected to corona treatment. To the surface of the corona-treated PET film, a liquid application containing 5 percent by mass cellulose acetate butylate (CAB-381-0.1 m butylation ratio: 38 percent, manufactured by EASTMAN) and 95 percent by mass diethylene glyoldiethylether (manufactured by Kanto Chemical Co., Inc.) were applied by using a bar coater. The resultant was dried at 70 degrees C. for 15 minutes to form a peeling-off resin layer on the PET film.

A deposition aluminum layer having an average thickness of 30 nm was formed on the surface of the peeling-off resin layer formed on the PET film using a vacuum deposition device to manufacture an aluminum deposited PET film.

The aluminum deposited PET film was dipped in diethylene glycol solution containing an anionic surfactant (PLYSURF™, M208B, polyoxyethylene lauryl ether phosphoric acid monoethanol amine, manufactured by DKS Co. Ltd.) in an amount of 5 percent by mass) and subjected to peeling-off treatment for two hours by an ultrasonic cleaner (VS-150, manufactured by AS ONE Corporation). After peeling off the aluminum deposited layer from the PET film, the PET film was removed. The resultant was subjected to finalization treatment for 12 hours by an ultrasonic wave homogenizer (US-300T, chip diameter of 26 mm, manufactured by NISSEI Corporation) to prepare a solution containing aluminum particles.

The solution containing aluminum was filtrated with a filter (LCF-24110, SUS304L "Ridimesh", filtration accuracy: 18 µm, manufactured by NIHON PALL LTD.), followed by filtration under a pressure using a cellulose acetate membrane filter having an average opening diameter of 5 µm to remove coarse particles. Diethylene glycol was distilled away from the thus-obtained filtrate using a rotary evaporator to obtain a liquid dispersion 2 of scale-like aluminum containing scale-like aluminum in an amount of 15 percent by mass.

The particle size distribution of the thus-obtained liquid dispersion 2 of scale-like aluminum was measured by a particle size analyzer (Nanotrac Wave-EX150, manufactured by NIKKISO CO., LTD.). 50 percent cumulative volume particle diameter ($D_{50}$) and 90 percent cumulative volume particle diameter ($D_{90}$) thereof were 1,645 nm and 1,976 nm, respectively.

Preparation Example 1 of Ink of Scale-Like Aluminum

Preparation Example of Ink 1 of Scale-Like Aluminum 25.0 parts by mass of the liquid dispersion 1 of scale-like aluminum and 51.5 parts of deionized water were mixed in a stainless container by a high performance disper for mixing and stirring. Thereafter, 8.0 parts by mass of triethylene glycol mono-butylether (manufactured by Tokyo Chemical Industry Co. Ltd.), 5.0 parts of diethylene glycol (manufactured by Tokyo Chemical Industry Co. Ltd.), 10.0 parts by mass of glycerin (manufactured by Tokyo Chemical Industry Co. Ltd.), and 0.5 parts by mass of Surfynol 465 (surface adjusting agent, manufactured by Air Products Limited) were added to the stainless container followed by stirring and mixing until the resultant became uniform. Finally, a suitable amount of dimethyl ethanolamine as a pH regulator was added to adjust the pH to be 8.0. After sufficient stirring and mixing, the resultant was filtrated using a nylon screen having a 200 mesh to obtain an ink 1 of scale-like aluminum containing scale-like aluminum in an amount of 5.0 percent by mass. The particle size distribution of the thus-obtained ink 1 of scale-like aluminum was measured by a particle size analyzer (Nanotrac Wave-EX150, manufactured by NIKKISO CO., LTD.). 50 percent cumulative volume particle diameter ($D_{50}$) and 90 percent cumulative volume particle diameter ($D_{90}$) thereof were 1,645 nm and 1,976 nm, respectively.

Preparation Example 2 of Ink of Scale-Like Aluminum

Preparation of Ink 2 of Scale-Like Aluminum

After mixing and stirring the following recipe, the mixture was filtrated by a filter (LCF-24110, SUS304L "Ridimesh", filtration accuracy: 18 μm, manufactured by NIHON PALL LTD.) to obtain an ink 2 of scale-like aluminum containing scale-like aluminum in an amount of 5 percent by mass.

Recipe

| | |
|---|---|
| Liquid dispersion 2 of scale-like aluminum: | 33.4 parts |
| Polycarbonate urethane resin emulsion A: | 20.0 parts |
| Silicone-based surfactant (KF-351A, manufactured by: Shin-Etsu Chemical Co., Ltd.) | 1.0 part |
| 2,4,7,9-tetramethyldecane-4,7-diol (manufactured by Tokyo Chemical Industry Co. Ltd.): | 0.5 parts |
| 1,2-propane diol (boiling point of 188 degrees C., manufactured by Tokyo Chemical Industry Co. Ltd.): | 14.9 parts |
| 3-ethyl-3-hydroxymethyl oxetane (boiling point of 240 degrees C., manufactured by Tokyo Chemical Industry Co. Ltd.): | 15.0 parts |
| Preservatives and fungicides (PROXEL LV, manufactured by AVECIA GROUP): | 0.1 parts |
| Deionized water: | 15.1 parts |

The particle size distribution of the thus-obtained ink 2 of scale-like aluminum was measured by a particle size analyzer (Nanotrac Wave-EX150, manufactured by NIKKISO CO., LTD.). 50 percent cumulative volume particle diameter ($D_{50}$) and 90 percent cumulative volume particle diameter ($D_{90}$) thereof were 16,458 nm and 19,860 nm, respectively.

Example 1

The ink discharging head including the circulation mechanism illustrated in FIGS. 3 to 11, the ink supply unit including the ink tank and the ink cartridge illustrated in FIG. 18A, and the ink cartridge illustrated in FIG. 18A were filled with the silver ink 1 as the inkjet printing device, and the silver ink 1 for use in the ink discharging head in the inkjet printing device was manufactured.

Examples 2 to 16

Silver ink for use in the ink discharging head was manufactured in the same manner as in Example 1 except that the silver ink 1 was replaced with the silver ink shown in Tables 8 and 9.

Example 17

Silver ink was manufactured in the same manner as in Example 1 except that the ink discharging head was set in a hemathermal tank at 50 degrees C. and left undone for one week and the ink was circulated without discharging the ink.

Examples 18 to 32

Silver inks of Examples 18 to 32 were manufactured in the same manner as in Example 17 except that the silver ink 1 was replaced with the silver inks shown in Tables 10 and 11.

Reduction of occurrence of non-discharging nozzle, scratch resistance, gloss, image clarity, and chromaticity (a* value and b* value) were evaluated in the following manner. The results are shown in Tables 8 to 11.

Reduction of Occurrence of Non-Discharging Nozzle

Using the inkjet printing device of Example 1, like the initial filling operation described above with reference to FIGS. 18A and 18B, the ink 902 (silver ink 1) was fed from the ink cartridge 901 to the ink tank 910 to fill the ink tank 910 with the ink 902 (sliver ink 1). Thereafter, the ink 902 was supplied from the ink tank 910 to the head 915 and ejected to the suction cap 282 illustrated in FIG. 2 in an amount equal to the generated negative pressure to operate the initial filling of the silver ink 1. Next, before printing, the circulation mechanism started circulation of the silver ink 1 and the inkjet printing device printed a nozzle check pattern on gloss paper for inkjet ("KASSAI" photofinishing value, manufactured by Fujifilm Corporation). The number of discharging nozzles that had discharged the silver ink 1 was checked to evaluate reduction of occurrence of non-discharging nozzles according to the following evaluation criteria. The results are shown in Tables 8 to 11. The rating 3 and above are allowable in terms of practical use.

Evaluation Criteria

Rating 5: Number of discharging nozzles is 384

Rating 4: Number of discharging nozzles is from 368 to less than 384

Rating 3: Number of discharging nozzles is from 336 to less than 368

Rating 2: Number of discharging nozzles is from 192 to less than 336

Rating 1: Number of discharging nozzles is less than 192

Scratch Resistance

Recorded matter obtained after drying a solid image of 5 cm×5 cm formed by discharging the ink of 30 pL per pixel with 300 dpi×300 dpi was set in Gakushin-Type rubbing tester (AB-301, manufactured by TESTER SANGYO CO. LTD.). The recorded matter was scratched ten times by a friction block to which white cotton cloth (based on JIS LO803 format) was attached to the contact portion. The degree of degradation was visually observed to evaluate scratch resistance according to the following evaluation criteria. The results are shown in Tables 8 to 11. The rating A and above are allowable in terms of practical use.

Evaluation Criteria

S: Number of scratches is less than 5, no substrate observed

A: Number of scratches is from 5 to less than 10, no substrate observed

B: Number of scratches is 10 or more, substrate partially exposed

C: Number of scratches is 10 or more, most of substrate exposed

Degree of Gloss

The degree of gloss at 20 degree of printed matter obtained after drying a solid image of 5 cm×5 cm formed by discharging the ink of 30 pL per pixel with 300 dpi×300 dpi was measured by a glossmeter (micro-tri-gross, manufactured by BYK Gardener) to evaluate the degree of gloss according to the following evaluation criteria. The degree of gloss rated as C was too low to feel metallic luster, not suitable for practical use.

Evaluation Criteria
S: Gloss at 20 degrees is 800 or more
A: Gloss at 20 degrees is from 500 to less than 800
B: Gloss at 20 degrees is from 250 to less than 500
D: Gloss at 20 degrees C. is less than 250

Image Clarity

The image clarity C of recorded matter obtained after drying a solid image of 5 cm×5 cm formed by discharging the ink of 30 pL per pixel with 300 dpi×300 dpi was measured by ICM-1 type, manufactured by Suga Test Instruments Co, Ltd. According to the image clarity measuring method based on JIS-H8686 format, the image clarity was measured with an optical comb width of 2.0 mm and evaluated based on the following evaluation criteria. At the rating C, the image clarity was too low to feel specularity, not suitable for practical use.

Evaluation Criteria
S: Image clarity C: 50 or greater
A: Image clarity C: 30 to less than 50
B: Image clarity C: 5 to less than 30
C: Image clarity C: less than 5

Chromaticity

The CM L*a*b color coordinate of printed matter obtained after drying a solid image of 5 cm×5 cm formed by discharging the ink of 30 pL per pixel with 300 dpi×300 dpi was measured by spectrophotodensitometer (X-Rite 938, manufactured by X-Rite) to evaluate chromaticity {(color vale (a* value) and (color vale (b* value)} based on the following evaluation criteria. Note that the color of silver rated as C is not visually natural, which is not suitable for practical use.

Evaluation Criteria of Color Value (a* Value)
Rating A: $-1.5 \le a^* \le 1.5$
Rating B: $-3.5 \le a^* \le -1.5$ or $1.5 < a^* \le 3.5$
Rating C: $a^* < -3.5$ or $3.5 < a^*$ Evaluation Criteria of Color Value (b* Value)
Rating A: $-1.5 \le b^* \le 1.5$
Rating B: $-3.5 \le b^* \le -1.5$ or $1.5 < b^* \le 3.5$
Rating C: $b^* < -3.5$ or $3.5 < b^*$

TABLE 8

| | | | Example | | | | |
|---|---|---|---|---|---|---|---|
| | | | 1 | 2 | 3 | 4 | 5 |
| Inkjet Printing Device | Ink Discharging Head | Flow-in path and flow-out path | Yes | Yes | Yes | Yes | Yes |
| | | Circulation mechanism | Yes | Yes | Yes | Yes | Yes |
| | | Fine drive mechanism | Yes | Yes | Yes | Yes | Yes |
| | | Inward and outward liquid feeding path in ink tank and ink cartridge | Yes | Yes | Yes | Yes | Yes |
| Silver ink | | Kind | Silver ink 1 | Silver ink 2 | Silver ink 3 | Silver ink 4 | Silver ink 5 |
| | | Amount of silver particle (percent by mass) | 5.0 | 5.0 | 5.0 | 5.0 | 5.0 |
| | | Amount of resin particle (percent by mass) | — | — | — | — | — |
| | | 50 percent cumulative volume particle diameter ($D_{50}$) (nm) | 5 | 50 | 100 | 1,540 | 1,610 |
| | | 90 percent cumulative volume particle diameter ($D_{90}$) (nm) | 30 | 220 | 350 | 3,020 | 1,990 |
| Evaluation Results | Reduction of occurrence of non-discharging nozzle | After ink filling | Rating 5 | Rating 5 | Rating 5 | Rating 4 | Rating 4 |
| | | After being left undone | — | — | — | — | — |
| | | After the period of being left undone, after circulation operation | — | — | — | — | — |
| | Scratch resistance | After ink filling | A | A | A | A | A |
| | | After being left undone | — | — | — | — | — |
| | | After the period of being left undone, after circulation operation | — | — | — | — | — |
| | Gloss | After ink filling | S | S | S | A | A |
| | | After being left undone | — | — | — | — | — |
| | | After the period of being left undone, after circulation operation | — | — | — | — | — |
| | Image clarity | After ink filling | S | S | S | A | A |
| | | After being left undone | — | — | — | — | — |
| | | After the period of being left undone, after circulation operation | — | — | — | — | — |
| | Chromaticity (a* value) | After ink filling | B | B | B | A | A |
| | | After being left undone | — | — | — | — | — |
| | | After the period of being left undone, after circulation operation | — | — | — | — | — |
| | Chromaticity (b* value) | After ink filling | B | B | B | A | A |
| | | After being left undone | — | — | — | — | — |
| | | After the period of being left undone, after circulation operation | — | — | — | — | — |

TABLE 8-continued

|  |  |  | Example | | | |
|---|---|---|---|---|---|---|
|  |  |  | 6 | 7 | 8 | 9 |
| Inkjet Printing Device | Ink Discharging Head | Flow-in path and flow-out path | Yes | Yes | Yes | Yes |
|  |  | Circulation mechanism | Yes | Yes | Yes | Yes |
|  |  | Fine drive mechanism | Yes | Yes | Yes | Yes |
|  |  | Inward and outward liquid feeding path in ink tank and ink cartridge | Yes | Yes | Yes | Yes |
| Silver ink |  | Kind | Silver ink 6 | Silver ink 7 | Silver ink 8 | Silver ink 9 |
|  | Amount of silver particle (percent by mass) |  | 5.0 | 5.0 | 5.0 | 5.0 |
|  | Amount of resin particle (percent by mass) |  | — | — | 5.0 | 5.0 |
|  | 50 percent cumulative volume particle diameter ($D_{50}$) (nm) |  | 2,053 | 2,901 | 5 | 50 |
|  | 90 percent cumulative volume particle diameter ($D_{90}$) (nm) |  | 4,950 | 8,560 | 30 | 220 |
| Evaluation Results | Reduction of occurrence of non-discharging nozzle | After ink filling | Rating 4 | Rating 3 | Rating 5 | Rating 5 |
|  |  | After being left undone | — | — | — | — |
|  |  | After the period of being left undone, after circulation operation | — | — | — | — |
|  | Scratch resistance | After ink filling | A | A | S | S |
|  |  | After being left undone | — | — | — | — |
|  |  | After the period of being left undone, after circulation operation | — | — | — | — |
|  | Gloss | After ink filling | A | B | S | S |
|  |  | After being left undone | — | — | — | — |
|  |  | After the period of being left undone, after circulation operation | — | — | — | — |
|  | Image clarity | After ink filling | A | B | S | S |
|  |  | After being left undone | — | — | — | — |
|  |  | After the period of being left undone, after circulation operation | — | — | — | — |
|  | Chromaticity (a* value) | After ink filling | A | A | B | B |
|  |  | After being left undone | — | — | — | — |
|  |  | After the period of being left undone, after circulation operation | — | — | — | — |
|  | Chromaticity (b* value) | After ink filling | A | A | B | B |
|  |  | After being left undone | — | — | — | — |
|  |  | After the period of being left undone, after circulation operation | — | — | — | — |

TABLE 9

|  |  |  | Example | | | |
|---|---|---|---|---|---|---|
|  |  |  | 10 | 11 | 12 | 13 |
| Inkjet Printing Device | Ink Discharging Head | Flow-in path and flow-out path | Yes | Yes | Yes | Yes |
|  |  | Circulation mechanism | Yes | Yes | Yes | Yes |
|  |  | Fine drive mechanism | Yes | Yes | Yes | Yes |
|  |  | Inward and outward liquid feeding path in ink tank and ink cartridge | Yes | Yes | Yes | Yes |
| Silver ink |  | Kind | Silver ink 10 | Silver ink 11 | Silver ink 12 | Silver ink 13 |
|  | Amount of silver particle (percent by mass) |  | 5.0 | 5.0 | 5.0 | 5.0 |
|  | Amount of resin particle (percent by mass) |  | 5.0 | 5.0 | 5.0 | 5.0 |
|  | 50 percent cumulative volume particle diameter ($D_{50}$) (nm) |  | 100 | 1,540 | 1,610 | 2,053 |
|  | 90 percent cumulative volume particle diameter ($D_{90}$) (nm) |  | 350 | 3,020 | 1,990 | 4,950 |

TABLE 9-continued

| Evaluation Results | Reduction of occurrence of non-discharging nozzle | After ink filling | Rating 5 | Rating 4 | Rating 4 | Rating 4 |
|---|---|---|---|---|---|---|
| | | After being left undone | — | — | — | — |
| | | After the period of being left undone, after circulation operation | — | — | — | — |
| | Scratch resistance | After ink filling | S | S | S | S |
| | | After being left undone | — | — | — | — |
| | | After the period of being left undone, after circulation operation | — | — | — | — |
| | Gloss | After ink filling | S | A | A | A |
| | | After being left undone | — | — | — | — |
| | | After the period of being left undone, after circulation operation | — | — | — | — |
| | Image clarity | After ink filling | S | A | A | A |
| | | After being left undone | — | — | — | — |
| | | After the period of being left undone, after circulation operation | — | — | — | — |
| | Chromaticity (a* value) | After ink filling | B | A | A | A |
| | | After being left undone | — | — | — | — |
| | | After the period of being left undone, after circulation operation | — | — | — | — |
| | Chromaticity (b* value) | After ink filling | B | A | A | A |
| | | After being left undone | — | — | — | — |
| | | After the period of being left undone, after circulation operation | — | — | — | — |

| | | | Example | | |
|---|---|---|---|---|---|
| | | | 14 | 15 | 16 |
| Inkjet Printing Device | Ink Discharging Head | Flow-in path and flow-out path | Yes | Yes | Yes |
| | | Circulation mechanism | Yes | Yes | Yes |
| | | Fine drive mechanism | Yes | Yes | Yes |
| | Inward and outward liquid feeding path in ink tank and ink cartridge | | Yes | Yes | Yes |
| Silver ink | | Kind | Silver ink 14 | Silver ink 16 | Silver ink 17 |
| | | Amount of silver particle (percent by mass) | 5.0 | 1.0 | 15.0 |
| | | Amount of resin particle (percent by mass) | 5.0 | 0.0 | 0.0 |
| | | 50 percent cumulative volume particle diameter ($D_{50}$) (nm) | 2,901 | 5 | 5 |
| | | 90 percent cumulative volume particle diameter ($D_{90}$) (nm) | 8,560 | 30 | 30 |
| Evaluation Results | Reduction of occurrence of non-discharging nozzle | After ink filling | Rating 3 | Rating 5 | Rating 3 |
| | | After being left undone | — | — | — |
| | | After the period of being left undone, after circulation operation | — | — | — |
| | Scratch resistance | After ink filling | S | A | A |
| | | After being left undone | — | — | — |
| | | After the period of being left undone, after circulation operation | — | — | — |
| | Gloss | After ink filling | B | B | S |
| | | After being left undone | — | — | — |
| | | After the period of being left undone, after circulation operation | — | — | — |
| | Image clarity | After ink filling | B | B | S |
| | | After being left undone | — | — | — |
| | | After the period of being left undone, after circulation operation | — | — | — |
| | Chromaticity (a* value) | After ink filling | A | B | B |
| | | After being left undone | — | — | — |
| | | After the period of being left undone, after circulation operation | — | — | — |

TABLE 9-continued

|  |  |  |  |  |
|---|---|---|---|---|
| Chromaticity | After ink filling | A | B | B |
| (b* value) | After being left undone | — | — | — |
|  | After the period of being left undone, after circulation operation | — | — | — |

TABLE 10

|  |  |  | Example | | | |
|---|---|---|---|---|---|---|
|  |  |  | 17 | 18 | 19 | 20 |
| Inkjet Printing Device | Ink Discharging Head | Flow-in path and flow-out path | Yes | Yes | Yes | Yes |
|  |  | Circulation mechanism | Yes | Yes | Yes | Yes |
|  |  | Fine drive mechanism | Yes | Yes | Yes | Yes |
|  | Inward and outward liquid feeding path in ink tank and ink cartridge | | Yes | Yes | Yes | Yes |
| Silver ink |  | Kind | Silver ink 1 | Silver ink 2 | Silver ink 3 | Silver ink 4 |
|  | Amount of silver particle (percent by mass) | | 5.0 | 5.0 | 5.0 | 5.0 |
|  | Amount of resin particle (percent by mass) | | — | — | — | — |
|  | 50 percent cumulative volume particle diameter ($D_{50}$) (nm) | | 5 | 50 | 100 | 1,540 |
|  | 90 percent cumulative volume particle diameter ($D_{90}$) (nm) | | 30 | 220 | 350 | 3,020 |
| Evaluation Results | Reduction of occurrence of non-discharging nozzle | After ink filling | — | — | — | — |
|  |  | After being left undone | — | — | — | — |
|  |  | After the period of being left undone, after circulation operation | Rating 5 | Rating 5 | Rating 5 | Rating 4 |
|  | Scratch resistance | After ink filling | — | — | — | — |
|  |  | After being left undone | — | — | — | — |
|  |  | After the period of being left undone, after circulation operation | A | A | A | A |
|  | Gloss | After ink filling | — | — | — | — |
|  |  | After being left undone | — | — | — | — |
|  |  | After the period of being left undone, after circulation operation | S | S | S | A |
|  | Image clarity | After ink filling | — | — | — | — |
|  |  | After being left undone | — | — | — | — |
|  |  | After the period of being left undone, after circulation operation | S | S | S | A |
|  | Chromaticity (a* value) | After ink filling | — | — | — | — |
|  |  | After being left undone | — | — | — | — |
|  |  | After the period of being left undone, after circulation operation | B | B | B | A |
|  | Chromaticity (b* value) | After ink filling | — | — | — | — |
|  |  | After being left undone | — | — | — | — |
|  |  | After the period of being left undone, after circulation operation | B | B | B | A |

TABLE 10-continued

|  |  |  | Example | | | |
|---|---|---|---|---|---|---|
|  |  |  | 21 | 22 | 23 | 24 |
| Inkjet Printing Device | Ink Discharging Head | Flow-in path and flow-out path | Yes | Yes | Yes | Yes |
|  |  | Circulation mechanism | Yes | Yes | Yes | Yes |
|  |  | Fine drive mechanism | Yes | Yes | Yes | Yes |
|  | Inward and outward liquid feeding path in ink tank and ink cartridge | | Yes | Yes | Yes | Yes |
| Silver ink |  | Kind | Silver ink 5 | Silver ink 6 | Silver ink 7 | Silver ink 8 |
|  | Amount of silver particle (percent by mass) | | 5.0 | 5.0 | 5.0 | 5.0 |
|  | Amount of resin particle (percent by mass) | | — | — | — | 5.0 |
|  | 50 percent cumulative volume particle diameter ($D_{50}$) (nm) | | 1,610 | 2,053 | 2,901 | 5 |
|  | 90 percent cumulative volume particle diameter ($D_{90}$) (nm) | | 1,990 | 4,950 | 8,560 | 30 |
| Evaluation Results | Reduction of occurrence of non-discharging nozzle | After ink filling | — | — | — | — |
|  |  | After being left undone | — | — | — | — |
|  |  | After the period of being left undone, after circulation operation | Rating 4 | Rating 4 | Rating 3 | Rating 5 |
|  | Scratch resistance | After ink filling | — | — | — | — |
|  |  | After being left undone | — | — | — | — |
|  |  | After the period of being left undone, after circulation operation | A | A | A | S |
|  | Gloss | After ink filling | — | — | — | — |
|  |  | After being left undone | — | — | — | — |
|  |  | After the period of being left undone, after circulation operation | A | A | B | S |
|  | Image clarity | After ink filling | — | — | — | — |
|  |  | After being left undone | — | — | — | — |
|  |  | After the period of being left undone, after circulation operation | A | A | B | S |
|  | Chromaticity (a* value) | After ink filling | — | — | — | — |
|  |  | After being left undone | — | — | — | — |
|  |  | After the period of being left undone, after circulation operation | A | A | A | B |
|  | Chromaticity (b* value) | After ink filling | — | — | — | — |
|  |  | After being left undone | — | — | — | — |
|  |  | After the period of being left undone, after circulation operation | A | A | A | B |

TABLE 11

|  |  |  | Example | | | |
|---|---|---|---|---|---|---|
|  |  |  | 25 | 26 | 27 | 28 |
| Inkjet Printing Device | Ink Discharging Head | Flow-in path and flow-out path | Yes | Yes | Yes | Yes |
|  |  | Circulation mechanism | Yes | Yes | Yes | Yes |
|  |  | Fine drive mechanism | Yes | Yes | Yes | Yes |
|  | Inward and outward liquid feeding path in ink tank and ink cartridge | | Yes | Yes | Yes | Yes |

TABLE 11-continued

| Silver ink | | Kind | Silver ink 9 | Silver ink 10 | Silver ink 11 | Silver ink 12 |
|---|---|---|---|---|---|---|
| | | Amount of silver particle (percent by mass) | 5.0 | 5.0 | 5.0 | 5.0 |
| | | Amount of resin particle (percent by mass) | 5.0 | 5.0 | 5.0 | 5.0 |
| | | 50 percent cumulative volume particle diameter ($D_{50}$) (nm) | 50 | 100 | 1,540 | 1,610 |
| | | 90 percent cumulative volume particle diameter ($D_{90}$) (nm) | 220 | 350 | 3,020 | 1,990 |
| Evaluation Results | Reduction of occurrence of non-discharging nozzle | After ink filling | — | — | — | — |
| | | After being left undone | — | — | — | — |
| | | After the period of being left undone, after circulation operation | Rating 5 | Rating 5 | Rating 4 | Rating 4 |
| | Scratch resistance | After ink filling | — | — | — | — |
| | | After being left undone | — | — | — | — |
| | | After the period of being left undone, after circulation operation | S | S | S | S |
| | Gloss | After ink filling | — | — | — | — |
| | | After being left undone | — | — | — | — |
| | | After the period of being left undone, after circulation operation | S | S | A | A |
| | Image clarity | After ink filling | — | — | — | — |
| | | After being left undone | — | — | — | — |
| | | After the period of being left undone, after circulation operation | S | S | A | A |
| | Chromaticity (a* value) | After ink filling | — | — | — | — |
| | | After being left undone | — | — | — | — |
| | | After the period of being left undone, after circulation operation | B | B | A | A |
| | Chromaticity (b* value) | After ink filling | — | — | — | — |
| | | After being left undone | — | — | — | — |
| | | After the period of being left undone, after circulation operation | B | B | A | A |

| | | | Example | | | |
|---|---|---|---|---|---|---|
| | | | 29 | 30 | 31 | 32 |
| Inkjet Printing Device | Ink Discharging Head | Flow-in path and flow-out path | Yes | Yes | Yes | Yes |
| | | Circulation mechanism | Yes | Yes | Yes | Yes |
| | | Fine drive mechanism | Yes | Yes | Yes | Yes |
| | Inward and outward liquid feeding path in ink tank and ink cartridge | | Yes | Yes | Yes | Yes |
| Silver ink | | Kind | Silver ink 13 | Silver ink 14 | Silver ink 16 | Silver ink 17 |
| | | Amount of silver particle (percent by mass) | 5.0 | 5.0 | 1.0 | 15.0 |
| | | Amount of resin particle (percent by mass) | 5.0 | 5.0 | — | — |
| | | 50 percent cumulative volume particle diameter ($D_{50}$) (nm) | 2,053 | 2,901 | 5 | 5 |
| | | 90 percent cumulative volume particle diameter ($D_{90}$) (nm) | 4,950 | 8,560 | 30 | 30 |
| Evaluation Results | Reduction of occurrence of non-discharging nozzle | After ink filling | — | — | — | — |
| | | After being left undone | — | — | — | — |
| | | After the period of being left undone, after circulation operation | Rating 4 | Rating 3 | Rating 5 | Rating 3 |
| | Scratch resistance | After ink filling | — | — | — | — |
| | | After being left undone | — | — | — | — |
| | | After the period of being left undone, after circulation operation | S | S | A | A |
| | Gloss | After ink filling | — | — | — | — |
| | | After being left undone | — | — | — | — |
| | | After the period of being left undone, after circulation operation | A | B | B | S |

TABLE 11-continued

| | | | | | |
|---|---|---|---|---|---|
| Image clarity | After ink filling | — | — | — | — |
| | After being left undone | — | — | — | — |
| | After the period of being left undone, after circulation operation | A | B | B | S |
| Chromaticity (a* value) | After ink filling | — | — | — | — |
| | After being left undone | — | — | — | — |
| | After the period of being left undone, after circulation operation | A | A | B | B |
| Chromaticity (b* value) | After ink filling | — | — | — | — |
| | After being left undone | — | — | — | — |
| | After the period of being left undone, after circulation operation | A | A | B | B |

Comparative Example 1

Manufacturing of Inkjet Printing Device

The silver ink 6 was used for an inkjet printer (IPSiO SG-3100, manufactured by Ricoh Company Ltd.) available on the market having none of the circulation mechanism, the fine drive mechanism, and the liquid feeding path of the inward path and the outward path. In the initial filling operation, the ink was supplied from the ink cartridge to the ink tank to fill the ink tank with the ink. Thereafter, the ink was supplied from the ink tank to the head and ejected to the suction cap in an amount equal to the generated negative pressure to operate the filling. After the initial filling operation, reduction of occurrence of non-discharging nozzle, scratch resistance, degree of gloss, image clarity, and chromaticity were evaluated. The results are shown in Table 12.

Comparative Example 2

Ink of Comparative Example 2 was manufactured and evaluated in the same manner as in Comparative Example 1 except that the inkjet printer was placed in a hemathermal tank at 50 degrees C. and left undone for one week. Next, evaluation was made in the same manner as in Comparative Example 1. The results are shown in Table 12.

Comparative Example 3

Ink of Comparative Example 3 was manufactured in the same manner as in Comparative Example 1 except that the silver ink 6 was replaced with the ink 1 of scale-like aluminum. Next, evaluation was made in the same manner as in Comparative Example 1. The results are shown in Table 12.

Comparative Example 4

Ink of Comparative Example 4 was manufactured and evaluated in the same manner as in Comparative Example 3 except that the inkjet printer was placed in a hemathermal tank at 50 degrees C. and left undone for one week. Next, evaluation was made in the same manner as in Comparative Example 1. The results are shown in Table 12.

Note that, in Comparative Example 4, hydrogen gas was produced after the inkjet printer was placed in a hemathermal tank at 50 degrees C. and left undone for one week. Therefore, the ink spilling out of the ink discharging head overflowed in the suction cap, which swelled the ink tank. Air bubbles stayed in the ink bag in the ink cartridge. Therefore, the ink bag swelled immediately after the filling of the ink. Unlike Comparative Example 4, there was no such ink overflow in Examples 1 to 32, so that the ink tank or the ink bag did not swell.

Comparative Example 5

Ink of Comparative Example 5 was manufactured in the same manner as in Example 1 except that the silver ink 1 was replaced with the ink 1 of scale-like aluminum. Next, the ink was evaluated in the same manner as in Comparative Example 1. The results are shown in Table 12.

Comparative Example 6

Ink of Comparative Example 6 was manufactured in the same manner as in Example 17 except that the silver ink 1 was replaced with the ink 1 of scale-like aluminum. Next, evaluation was made in the same manner as in Comparative Example 1. The results are shown in Table 12.

Comparative Example 7

Ink of Comparative Example 7 was manufactured in the same manner as in Comparative Example 1 except that the silver ink 6 was replaced with the ink 2 of scale-like aluminum. Next, evaluation was made in the same manner as in Comparative Example 1. The results are shown in Table 13.

Comparative Example 8

Ink of Comparative Example 8 was evaluated in the same manner as in Comparative Example 1 except that the inkjet printer was placed in a hemathermal tank at 50 degrees C. and left undone for one week in Comparative Example 7. The results are shown in Table 13.

Note that, in Comparative Example 8, hydrogen gas was produced after the inkjet printer was placed in a hemathermal tank at 50 degrees C. and left undone for one week. Therefore, the ink spilling out of the ink discharging head overflowed in the suction cap, which swelled the ink tank. Air bubbles stayed in the ink bag in the ink cartridge. Therefore, the ink bag swelled immediately after the filling of the ink. Unlike Comparative Example 8, there was no such ink overflow in Examples 1 to 32, so that the ink tank or the ink bag did not swell.

Comparative Example 9

Ink of Comparative Example 9 was manufactured in the same manner as in Example 1 except that the silver ink 1 was replaced with the ink 2 of scale-like aluminum. Next, evaluation was made in the same manner as in Comparative Example 1. The results are shown in Table 13.

Comparative Example 10

Ink of Comparative Example 10 was manufactured in the same manner as in Example 17 except that the silver ink 1 was replaced with the ink 2 of scale-like aluminum. Next, evaluation was made in the same manner as in Comparative Example 1. The results are shown in Table 13.

Comparative Example 11

Ink of Comparative Example 11 was manufactured in the same manner as in Comparative Example 1 except that the silver ink 6 was replaced with the silver ink 15. Next, evaluation was made in the same manner as in Comparative Example 1. The results are shown in Table 13.

Comparative Example 12

Ink of Comparative Example 12 was evaluated in the same manner as in Comparative Example 1 except that the inkjet printer was placed in a hemathermal tank at 50 degrees C. and left undone for one week in Comparative Example 11. The results are shown in Table 13.

Comparative Example 13

Ink of Comparative Example 13 was manufactured in the same manner as in Example 1 except that the silver ink 1 was replaced with the silver ink 15. Next, evaluation was made in the same manner as in Comparative Example 1. The results are shown in Table 14.

Comparative Example 14

Ink of Comparative Example 14 was manufactured in the same manner as in Example 17 except that the silver ink 1 was replaced with the silver ink 15. Next, evaluation was made in the same manner as in Comparative Example 1. The results are shown in Table 14.

Comparative Example 15

Ink of Comparative Example 15 was manufactured in the same manner as in Comparative Example 1 except that the silver ink 6 was replaced with the silver ink 18. Next, evaluation was made in the same manner as in Comparative Example 1. The results are shown in Table 14.

Comparative Example 16

Ink of Comparative Example 14 was evaluated in the same manner as in Comparative Example 1 except that the inkjet printer was placed in a hemathermal tank at 50 degrees C. and left undone for one week in Comparative Example 14. The results are shown in Table 14.

Comparative Example 17

Ink of Comparative Example 17 was manufactured in the same manner as in Example 1 except that the silver ink 1 was replaced with the silver ink 18. Next, evaluation was made in the same manner as in Comparative Example 1. The results are shown in Table 14.

Comparative Example 18

Ink of Comparative Example 18 was manufactured in the same manner as in Example 17 except that the silver ink 1 was replaced with the silver ink 18. Next, evaluation was made in the same manner as in Comparative Example 1. The results are shown in Table 14.

TABLE 12

| | | | Comparative Example | | | |
|---|---|---|---|---|---|---|
| | | | 1 | 2 | 3 | 4 |
| Inkjet Printing Device | Ink Discharging Head | Flow-in path and flow-out path | None | None | None | None |
| | | Circulation mechanism | None | None | None | None |
| | | Fine drive mechanism | None | None | None | None |
| | | Inward and outward liquid feeding path in ink tank and ink cartridge | None | None | None | None |
| Silver ink | | Kind | Silver ink 6 | Silver ink 6 | Ink 1 of scale-like aluminum | |
| | | Amount of silver particle or scale-like aluminum (percent by mass) | 5.0 | 5.0 | 5.0 | |
| | | Amount of resin particle (percent by mass) | — | — | 1.6 | |
| | | 50 percent cumulative volume particle diameter ($D_{50}$) (nm) | 2,053 | | 1,645 | |
| | | 90 percent cumulative volume particle diameter ($D_{90}$) (nm) | 4,950 | | 1,976 | |
| Evaluation Results | Reduction of occurrence of non-discharging nozzle | After ink filling | Rating 2 | — | Rating 2 | — |
| | | After being left undone | — | Rating 1 | — | Rating 1 |
| | | After the period of being left undone, after circulation operation | — | — | — | — |
| | Scratch resistance | After ink filling | A | — | C | — |
| | | After being left undone | — | A | — | C |
| | | After the period of being left undone, after circulation operation | — | — | — | — |

TABLE 12-continued

| | | | | | | |
|---|---|---|---|---|---|---|
| Gloss | After ink filling | B | — | B | — |
| | After being left undone | — | C | — | C |
| | After the period of being left undone, after circulation operation | — | — | — | — |
| Image clarity | After ink filling | S | — | B | — |
| | After being left undone | — | C | — | C |
| | After the period of being left undone, after circulation operation | — | — | — | — |
| Chromaticity (a* value) | After ink filling | A | — | A | — |
| | After being left undone | — | B | — | A |
| | After the period of being left undone, after circulation operation | — | — | — | — |
| Chromaticity (b* value) | After ink filling | C | — | A | — |
| | After being left undone | — | C | — | A |
| | After the period of being left undone, after circulation operation | — | — | — | — |

| | | | Comparative Example | |
|---|---|---|---|---|
| | | | 5 | 6 |
| Inkjet Printing Device | Ink Discharging Head | Flow-in path and flow-out path | Yes | Yes |
| | | Circulation mechanism | Yes | Yes |
| | | Fine drive mechanism | Yes | Yes |
| | Inward and outward liquid feeding path in ink tank and ink cartridge | | Yes | Yes |
| Silver ink | | Kind | Ink 1 of scale-like aluminum | |
| | Amount of silver particle or scale-like aluminum (percent by mass) | | 5.0 | |
| | Amount of resin particle (percent by mass) | | 1.6 | |
| | 50 percent cumulative volume particle diameter ($D_{50}$) (nm) | | 1,645 | |
| | 90 percent cumulative volume particle diameter ($D_{90}$) (nm) | | 1,976 | |
| Evaluation Results | Reduction of occurrence of non-discharging nozzle | After ink filling | Rating 2 | — |
| | | After being left undone | — | — |
| | | After the period of being left undone, after circulation operation | — | Rating 2 |
| | Scratch resistance | After ink filling | C | — |
| | | After being left undone | — | — |
| | | After the period of being left undone, after circulation operation | — | C |
| | Gloss | After ink filling | B | — |
| | | After being left undone | — | — |
| | | After the period of being left undone, after circulation operation | — | B |
| | Image clarity | After ink filling | B | — |
| | | After being left undone | — | — |
| | | After the period of being left undone, after circulation operation | — | B |
| | Chromaticity (a* value) | After ink filling | A | — |
| | | After being left undone | — | — |
| | | After the period of being left undone, after circulation operation | — | A |
| | Chromaticity (b* value) | After ink filling | A | — |
| | | After being left undone | — | — |
| | | After the period of being left undone, after circulation operation | — | A |

TABLE 13

| | | | Comparative Example | | | | | |
|---|---|---|---|---|---|---|---|---|
| | | | 7 | 8 | 9 | 10 | 11 | 12 |
| Inkjet Printing Device | Ink Discharging Head | Flow-in path and flow-out path | None | None | Yes | Yes | None | None |
| | | Circulation mechanism | None | None | Yes | Yes | None | None |
| | | Fine drive mechanism | None | None | Yes | Yes | None | None |
| | Inward and outward liquid feeding path in ink tank and ink cartridge | | None | None | Yes | Yes | None | None |
| Silver ink | Kind | | Ink 2 of scale-like aluminum | Ink 2 of scale-like aluminum | Ink 2 of scale-like aluminum | Ink 2 of scale-like aluminum | Silver ink 15 | Silver ink 15 |
| | Amount of silver particle or scale-like aluminum (percent by mass) | | 5.0 | | 5.0 | | 0.8 | |
| | Amount of resin particle (percent by mass) | | 5.0 | | 5.0 | | 5.0 | |
| | 50 percent cumulative volume particle diameter ($D_{50}$) (nm) | | 16,458 | | 16,458 | | 5 | |
| | 90 percent cumulative volume particle diameter ($D_{90}$) (nm) | | 19,860 | | 19,860 | | 30 | |
| Evaluation Results | Reduction of occurrence of non-discharging nozzle | After ink filling | Rating 1 | — | Rating 1 | — | Rating 5 | — |
| | | After being left undone | — | Rating 1 | — | — | — | Rating 3 |
| | | After the period of being left undone, after circulation operation | — | — | — | Rating 1 | — | — |
| | Scratch resistance | After ink filling | C | — | C | — | C | — |
| | | After being left undone | — | C | — | — | — | C |
| | | After the period of being left undone, after circulation operation | — | — | — | C | — | — |
| | Gloss | After ink filling | C | — | C | — | C | — |
| | | After being left undone | — | C | — | — | — | C |
| | | After the period of being left undone, after circulation operation | — | — | — | C | — | — |
| | Image clarity | After ink filling | C | — | C | — | C | — |
| | | After being left undone | — | C | — | — | — | C |
| | | After the period of being left undone, after circulation operation | — | — | — | C | — | — |
| | Chromaticity (a* value) | After ink filling | A | — | A | — | C | — |
| | | After being left undone | — | A | — | — | — | C |
| | | After the period of being left undone, after circulation operation | — | — | — | A | — | — |

TABLE 13-continued

|  |  | Comparative Example | | | | | |
|---|---|---|---|---|---|---|---|
|  |  | 7 | 8 | 9 | 10 | 11 | 12 |
| Chromaticity (b* value) | After ink filling | A | — | A | — | C | — |
|  | After being left undone | — | A | — | — | — | C |
|  | After the period of being left undone, after circulation operation | — | — | — | A | — | — |

TABLE 14

|  |  |  | Comparative Example | | | | | |
|---|---|---|---|---|---|---|---|---|
|  |  |  | 13 | 14 | 15 | 16 | 17 | 18 |
| Inkjet Printing Device | Ink Discharging Head | Flow-in path and flow-out path | Yes | Yes | None | None | Yes | Yes |
|  |  | Circulation mechanism | Yes | Yes | None | None | Yes | Yes |
|  |  | Fine drive mechanism | Yes | Yes | None | None | Yes | Yes |
|  | Inward and outward liquid feeding path in ink tank and ink cartridge | | Yes | Yes | None | None | Yes | Yes |
| Silver ink |  | Kind | Silver ink 15 | | Silver ink 18 | | Silver ink 18 | |
|  | Amount of silver particle (percent by mass) | | 0.8 | | 15.5 | | 15.5 | |
|  | Amount of resin particle (percent by mass) | | 5.0 | | 5.0 | | 5.0 | |
|  | 50 percent cumulative volume particle diameter ($D_{50}$) (nm) | | 5 | | 5 | | 5 | |
|  | 90 percent cumulative volume particle diameter ($D_{90}$) (nm) | | 30 | | 30 | | 30 | |
| Evaluation Results | Reduction of occurrence of non-discharging nozzle | After ink filling | Rating 5 | — | Rating 1 | — | Rating 1 | — |
|  |  | After being left undone | — | — | — | Rating 1 | — | — |
|  |  | After the period of being left undone, after circulation operation | — | Rating 5 | — | — | — | Rating 1 |
|  | Scratch resistance | After ink filling | B | — | A | — | A | — |
|  |  | After being left undone | — | — | — | C | — | — |
|  |  | After the period of being left undone, after circulation operation | — | B | — | — | — | A |
|  | Gloss | After ink filling | C | — | S | — | S | — |
|  |  | After being left undone | — | — | — | C | — | — |
|  |  | After the period of being left undone, after circulation operation | — | C | — | — | — | A |
|  | Image clarity | After ink filling | C | — | S | — | S | — |
|  |  | After being left undone | — | — | — | C | — | — |
|  |  | After the period of being left undone, after circulation operation | — | C | — | — | — | A |

TABLE 14-continued

|  |  | Comparative Example | | | | | |
|---|---|---|---|---|---|---|---|
|  |  | 13 | 14 | 15 | 16 | 17 | 18 |
| Chromaticity (a* value) | After ink filling | C | — | C | — | C | — |
|  | After being left undone | — | — | — | C | — | — |
|  | After the period of being left undone, after circulation operation | — | C | — | — | — | C |
| Chromaticity (b* value) | After ink filling | C | — | B | — | B | — |
|  | After being left undone | — | — | — | C | — | — |
|  | After the period of being left undone, after circulation operation | — | C | — | — | — | C |

Example 33

Manufacturing of Inkjet Printing Device

The inkjet printing device of Example 33 was manufactured which includes the ink discharging head including the circulation mechanism illustrated in FIGS. 3 to 11, the ink supply unit including the ink tank and the ink cartridge and the head illustrated in FIG. 18A, the silver ink 9 provided to the ink cartridge illustrated in FIG. 18A, another ink discharging head including the circulation mechanism illustrated in FIGS. 3 to 11, and the color ink 1 provided to the ink cartridge illustrated in FIG. 18A. The ink cartridges were separately filled with silver ink 9 and the color ink 1.

Manufacturing of Image

Using the inkjet printing device of Example 33, according to the initial filling operation described above with reference to FIGS. 18A and 18B, the ink 902 (silver ink 1) was fed from the ink cartridge 901 to the ink tank 910 to fill the ink tank 910 with the ink 902. Thereafter, the ink 902 was supplied from the ink tank 910 to the head 915 and ejected to the suction cap 282 illustrated in FIG. 2 in an amount equal to the generated negative pressure to operate the initial filling of the silver ink 1. This initial filling operation was repeated to supply the color ink 1 as well as the ink 902. Next, before starting printing, the circulation mechanism initiated circulating the silver ink 1 and the color ink 1 and the silver ink 1 was discharged first on the gloss sheet for inkjet ("KASSAI" photofinishing value, manufactured by Fujifilm Corporation) with 300 dpi×300 dpi and 30 pL per pixel and thereafter the color ink 1 was discharged thereon with 300 dpi×300 dpi and 30 pL per pixel to form a solid image of 5 cm×5 cm.

Examples 34 to 44

The inkjet printing devices of Examples 34 to 44 were manufactured in the same manner as in Example 33 except that the silver ink 9 and the color ink 1 were replaced with the silver inks and the color inks shown in Tables 15 and 16. Next, images were printed in the same manner as in Example 33. The formulations were shown in Tables 15 and 16.

Examples 45 to 56

The inkjet printing devices of Examples 45 to 56 were manufactured in the same manner as in Example 33 except that the silver ink 9 and the color ink 1 were replaced with the silver inks and the color inks shown in Tables 15 and 16. In addition, images of Examples 45 to 56 were formed in the same manner as in Embodiment 33 except that the color ink was discharged first and thereafter the silver ink was discharged. The formulation was shown in Tables 17 and 18.

Gloss

The printed matter obtained by drying the thus-obtained solid image of 5 cm×5 cm was visually checked to evaluate gloss based on the following evaluation criteria. The degree of gloss rated as C or below was too low to feel metallic luster, not suitable for practical use. The results are shown in Tables 15 to 18.

Evaluation Criteria

A: Metallic luster is good
B: Metallic luster slightly deteriorates
C: Metallic luster deteriorates and whitened portion stands out
D: No metallic luster and whitened

TABLE 15

|  |  |  | Example | | | | | |
|---|---|---|---|---|---|---|---|---|
|  |  |  | 33 | 34 | 35 | 36 | 37 | 38 |
| Inkjet Printing Device | Ink Discharging Head | Flow-in path and flow-out path | Yes | Yes | Yes | Yes | Yes | Yes |
|  |  | Circulation mechanism | Yes | Yes | Yes | Yes | Yes | Yes |
|  |  | Fine drive mechanism | Yes | Yes | Yes | Yes | Yes | Yes |

TABLE 15-continued

|  |  | Example | | | | | |
|---|---|---|---|---|---|---|---|
|  |  | 33 | 34 | 35 | 36 | 37 | 38 |
|  | Inward and outward liquid feeding path in ink tank and ink cartridge | Yes | Yes | Yes | Yes | Yes | Yes |
| Ink to be applied first | Kind of ink | Silver ink 9 | Silver ink 9 | Silver ink 9 | Silver ink 9 | Silver ink 9 | Silver ink 9 |
| Ink to be applied first | Kind of ink | Color Ink 1 | Color Ink 2 | Color Ink 3 | Color Ink 4 | Color Ink 5 | Color Ink 6 |
|  | Gloss | S | S | S | S | S | S |

15

TABLE 16

|  |  |  | Example | | | | | |
|---|---|---|---|---|---|---|---|---|
|  |  |  | 39 | 40 | 41 | 42 | 43 | 44 |
| Inkjet Printing Device | Ink Discharging Head | Flow-in path and flow-out path | Yes | Yes | Yes | Yes | Yes | Yes |
|  |  | Circulation mechanism | Yes | Yes | Yes | Yes | Yes | Yes |
|  |  | Fine drive mechanism | Yes | Yes | Yes | Yes | Yes | Yes |
|  | Inward and outward liquid feeding path in ink tank and ink cartridge | | Yes | Yes | Yes | Yes | Yes | Yes |
| Ink to be applied first | Kind of ink | | Silver ink 9 | Silver ink 9 | Silver ink 9 | Silver ink 9 | Silver ink 9 | Silver ink 9 |
| Ink to be applied second | Kind of ink | | Color Ink 7 | Color Ink 8 | Color Ink 9 | Color Ink 10 | Color Ink 11 | Color Ink 12 |
|  | Gloss | | S | S | S | S | S | S |

TABLE 17

|  |  |  | Example | | | | | |
|---|---|---|---|---|---|---|---|---|
|  |  |  | 45 | 46 | 47 | 48 | 49 | 50 |
| Inkjet Printing Device | Ink Discharging Head | Flow-in path and flow-out path | Yes | Yes | Yes | Yes | Yes | Yes |
|  |  | Circulation mechanism | Yes | Yes | Yes | Yes | Yes | Yes |
|  |  | Fine drive mechanism | Yes | Yes | Yes | Yes | Yes | Yes |
|  | Inward and outward liquid feeding path in ink tank and ink cartridge | | Yes | Yes | Yes | Yes | Yes | Yes |
| Ink to be applied first | Kind of ink | | Color Ink 1 | Color Ink 2 | Color Ink 3 | Color Ink 4 | Color Ink 5 | Color Ink 6 |
| Ink to be applied second | Kind of ink | | Silver ink 9 | Silver ink 9 | Silver ink 9 | Silver ink 9 | Silver ink 9 | Silver ink 9 |
|  | Gloss | | A | A | A | A | A | A |

TABLE 18

|  |  |  | Example | | | | | |
| --- | --- | --- | --- | --- | --- | --- | --- | --- |
|  |  |  | 51 | 52 | 53 | 54 | 55 | 56 |
| Inkjet Printing Device | Ink Discharging Head | Flow-in path and flow-out path | Yes | Yes | Yes | Yes | Yes | Yes |
|  |  | Circulation mechanism | Yes | Yes | Yes | Yes | Yes | Yes |
|  |  | Fine drive mechanism | Yes | Yes | Yes | Yes | Yes | Yes |
|  | Inward and outward liquid feeding path in ink tank and ink cartridge | | Yes | Yes | Yes | Yes | Yes | Yes |
| Ink to be applied first | Kind of ink | | Silver ink 9 | Silver ink 9 | Silver ink 9 | Silver ink 9 | Silver ink 9 | Silver ink 9 |
| Ink to be applied second | Kind of ink | | Color Ink 7 | Color Ink 8 | Color Ink 9 | Color Ink 10 | Color Ink 11 | Color Ink 12 |
|  | Gloss | | A | A | A | A | A | A |

Aspects of the present disclosure are, for example, as follows.

1. An inkjet printing device includes an ink containing a silver particle and water and an ink discharging head including multiple nozzles configured to discharge the ink, individual liquid chambers communicating with the multiple nozzles, a common liquid chamber to supply the ink to the individual liquid chambers, a circulating flow path communicating with the individual liquid chambers, a common circulating liquid chamber communicating with the circulating flow path, and a pressure generator to apply a pressure to the ink in the individual liquid chambers, wherein the proportion of the silver particle to the ink is from 1 to 15 percent by mass.

2. The inkjet printing device according to 1 mentioned above, wherein the silver particle has a 50 percent cumulative volume particle diameter of from 5 to 2,200 nm and 90 percent cumulative volume particle diameter of 5,000 nm or less, as measured by dynamic light scattering.

3. The ink according to 1 or 1 mentioned above further includes a resin particle, whose proportion to the ink is from 0.1 to less than 9 percent by mass.

4. The inkjet printing device according to any one of 1 to 3, further contains a coloring material and a solvent and includes a color ink accommodation unit to accommodate the color ink.

5. An inkjet printing method includes applying a thermal energy or a kinetic energy to ink and discharging the ink with an ink discharging head including multiple nozzles to discharge the ink, individual liquid chambers communicating with the multiple nozzles, a common liquid chamber to supply the ink to the individual liquid chambers, a circulating flow path communicating with the individual liquid chambers, a common circulating liquid chamber communicating with the circulating flow path, and a pressure generator to apply a pressure to the ink in the individual liquid chambers, wherein the ink contains a silver particle and water, and the amount of the silver particle to the ink is from 1 to 15 percent by mass.

6. The inkjet printing method according to 5 mentioned above, wherein the ink is discharged being circulated.

7. The inkjet printing method according to 6 mentioned above, further includes suspending circulation of the ink and circulating the ink before discharging the ink.

8. The inkjet printing method according to 6 or 7 mentioned above, further includes applying a pressure to the ink with a strength such that the ink is not discharged while discharging the ink.

9. The inkjet printing method according to any one of 5 to 8, further includes applying a color ink containing a coloring material and a solvent to a print medium.

10. The inkjet printing method according to any one of 5 to 9, wherein the silver particle has a 50 percent cumulative volume particle diameter of from 5 to 2,200 nm and 90 percent cumulative volume particle diameter of 5,000 nm or less, as measured by dynamic light scattering.

11. The inkjet printing method according to any one of 5 to 10, further contains a resin particle, whose proportion to the ink is from 0.1 to less than 9 percent by mass.

12. An ink contains a silver particle and water, wherein an inkjet printing device discharges the ink, the inkjet printing device including an ink discharging head including multiple nozzles configured to discharge ink, individual liquid chambers communicating with the multiple nozzles, a common liquid chamber configured to supply the ink to the individual liquid chambers, a circulating flow path communicating with the individual liquid chambers, a common circulating liquid chamber communicating with the circulating flow path, and a pressure generator to apply a pressure to the ink in the individual liquid chambers, wherein the proportion of the silver particle to the ink is from 1 to 15 percent by mass.

13. The ink according to 12 mentioned above, wherein the silver particle has a 50 percent cumulative volume particle diameter of from 5 to 2,200 nm and 90 percent cumulative volume particle diameter of 5,000 nm or less, as measured by dynamic light scattering.

14. The ink according to 12 or 13 mentioned above, further contains a resin particle, whose proportion to the ink is from 0.1 to less than 9 percent by mass.

According to the present disclosure, an inkjet printing device is provided, which is capable of securing discharging stability over time, being free of occurrence of non-discharging, representing natural color of silver, and demonstrating high level of metallic luster and specularity (image clarity).

Having now fully described embodiments of the present invention, it will be apparent to one of ordinary skill in the art that many changes and modifications can be made thereto without departing from the spirit and scope of embodiments of the invention as set forth herein.

What is claimed is:

1. An inkjet printing device comprising:
an ink comprising a silver particle and water; and
an ink discharging head comprising multiple nozzles configured to discharge the ink, individual liquid chambers communicating with the multiple nozzles, a common liquid chamber configured to supply the ink to the individual liquid chambers, a circulating flow path communicating with the individual liquid chambers, a common circulating liquid chamber communicating with the circulating flow path, and a pressure generator configured to apply a pressure to the ink in the individual liquid chambers,
wherein the ink comprises the silver particle in an amount of from 1 to 15 percent by mass.

2. The inkjet printing device according to claim 1, wherein the silver particle has a 50 percent cumulative volume particle diameter of from 5 to 2,200 nm as measured by dynamic light scattering and 90 percent cumulative volume particle diameter of 5,000 nm or less.

3. The inkjet printing device according to claim 1, wherein the ink further comprises a resin particle in an amount of from 0.1 to less than 9 percent.

4. The inkjet printing device according to claim 3, wherein the ink comprises the water in an amount of from 20 to 75 percent by mass.

5. The inkjet printing device according to claim 1, further comprising a color ink comprising a coloring material and a solvent, and a color ink accommodation unit accommodating the color ink.

6. The inkjet printing device according to claim 1, wherein the ink comprises the water in an amount of from 20 to 75 percent by mass.

7. An inkjet printing method comprising:
applying a thermal energy or a kinetic energy to ink; and
discharging the ink for printing with an ink discharging head including multiple nozzles configured to discharge the ink, individual liquid chambers communicating with the multiple nozzles, a common liquid chamber configured to supply the ink to the individual liquid chambers, a circulating flow path communicating with the individual liquid chambers, a common circulating liquid chamber communicating with the circulating flow path, and a pressure generator configured to apply a pressure to the ink in the individual liquid chambers,
wherein the ink comprises a silver particle and water, and the ink comprises the silver particle in an amount of from 1 to 15 percent by mass.

8. The inkjet printing method according to claim 7, further comprising circulating the ink in the ink discharging head with a pressure.

9. The inkjet printing method according to claim 8, wherein the circulating the ink and the discharging the ink are conducted concurrently.

10. The inkjet printing method according to claim 8, further comprising suspending the circulating the ink and re-circulating the ink before discharging the ink.

11. The inkjet printing method according to claim 8, wherein the circulating the ink includes circulating the ink with a pressure such that the ink is not discharged.

12. The inkjet printing method according to claim 7, further comprising discharging a color ink comprising a coloring material and a solvent to a print medium.

13. An ink comprising:
a silver particle; and
water,
wherein an inkjet printing device discharges the ink, the inkjet printing device including an ink discharging head including multiple nozzles configured to discharge ink, individual liquid chambers communicating with the multiple nozzles, a common liquid chamber configured to supply the ink to the individual liquid chambers, a circulating flow path communicating with the individual liquid chambers, a common circulating liquid chamber communicating with the circulating flow path, and a pressure generator configured to apply a pressure to the ink in the individual liquid chambers,
wherein the ink comprises the silver particle in an amount of from 1 to 15 percent by mass.

14. The ink according to claim 13, wherein the silver particle has a 50 percent cumulative volume particle diameter of from 5 to 2,200 nm as measured by dynamic light scattering and 90 percent cumulative volume particle diameter of 5,000 nm or less.

15. The ink according to claim 13, further comprising a resin particle in an amount of from 0.1 to less than 9 percent by mass.

* * * * *